US012656532B2

(12) United States Patent
Gonta et al.

(10) Patent No.: US 12,656,532 B2
(45) Date of Patent: Jun. 16, 2026

(54) COATED ARTICLES AND SYSTEMS FOR CAMERA LENS AND SENSOR PROTECTION WITH HIGH VISIBLE TRANSMISSION AND LOW IR TRANSMISSION

(71) Applicant: CORNING INCORPORATED, Corning, NY (US)

(72) Inventors: Casey James Gonta, Painted Post, NY (US); Shandon Dee Hart, Elmira, NY (US); Carlo Anthony Kosik Williams, Painted Post, NY (US); Lin Lin, Painted Post, NY (US); James Joseph Price, Corning, NY (US); Fred Douglas Woodall, II, Elmira, NY (US); Wenlei Zhang, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 252 days.

(21) Appl. No.: 18/733,266

(22) Filed: Jun. 4, 2024

(65) Prior Publication Data

US 2024/0377556 A1 Nov. 14, 2024

Related U.S. Application Data

(63) Continuation of application No. PCT/US2024/028151, filed on May 7, 2024.

(Continued)

(51) Int. Cl.
*G02B 1/11* (2015.01)

(52) U.S. Cl.
CPC ..................................... *G02B 1/11* (2013.01)

(58) Field of Classification Search
None
See application file for complete search history.

(56) References Cited

U.S. PATENT DOCUMENTS 8,312,739 B2 11/2012 Lee et al.
8,561,429 B2 10/2013 Allan et al.
(Continued)

FOREIGN PATENT DOCUMENTS

CN 109547679 A 3/2019
CN 212658853 U 3/2021
(Continued)

OTHER PUBLICATIONS

International Search Report and Written Opinion of the International Searching Authority; PCT/US2024/028151 ; dated Sep. 23, 2024; 14 pages; US Patent Office.
(Continued)

*Primary Examiner* — Robert E. Tallman
(74) *Attorney, Agent, or Firm* — Travis B. Gasa

(57) ABSTRACT

A cover glass article is described herein comprising at least one substrate with opposing outer and inner primary surfaces, and at least one of an outer optical film structure and an inner optical disposed on the outer and inner primary surfaces, respectively. The outer and inner film structures comprise alternating high and low refractive index layers, in which at least a portion of the high refractive index layers independently is an oxide, a nitride, and/or an oxynitride, and at least a portion of the low refractive index layers independently is an oxide, a nitride, an oxynitride, and/or a metal fluoride. The cover glass article exhibits high visible light transmittance and low infrared light transmittance, being useful in applications including lenses, sensors, sensor assemblies, light sources, smartwatches, a smartphones, smart glasses, vehicle camera systems, displays, and cameras.

20 Claims, 24 Drawing Sheets

Related U.S. Application Data

(60) Provisional application No. 63/466,097, filed on May 12, 2023.

(56) References Cited

U.S. PATENT DOCUMENTS

| | | |
|---|---|---|
| 8,854,623 B2 | 10/2014 | Fontaine et al. |
| 9,586,858 B2 | 3/2017 | Bellman et al. |
| 10,436,945 B2 | 10/2019 | Hart et al. |
| 10,611,675 B2 | 4/2020 | Beall et al. |
| 11,242,280 B2 | 2/2022 | Hart et al. |
| 11,434,166 B2 | 9/2022 | Decker et al. |
| 11,440,837 B2 | 9/2022 | Decker et al. |
| 11,479,501 B2 | 10/2022 | Decker et al. |
| 11,927,722 B2 | 3/2024 | Amin et al. |
| 2014/0113083 A1 | 4/2014 | Lee et al. |
| 2014/0334006 A1 | 11/2014 | Adib et al. |
| 2018/0029929 A1 | 2/2018 | Paulson |
| 2020/0057177 A1 | 2/2020 | Hart et al. |
| 2020/0148591 A1 | 5/2020 | Andrews et al. |
| 2020/0223744 A1 | 7/2020 | Beall et al. |
| 2020/0231491 A1 | 7/2020 | Beall et al. |
| 2020/0341168 A1 | 10/2020 | Kester et al. |
| 2022/0317353 A1 | 10/2022 | Hart et al. |
| 2024/0036236 A1 | 2/2024 | Fahey et al. |

FOREIGN PATENT DOCUMENTS

| | | |
|---|---|---|
| WO | 2018/125676 A1 | 7/2018 |
| WO | 2023/069262 A1 | 4/2023 |
| WO | 2023/091305 A1 | 5/2023 |

OTHER PUBLICATIONS

Liang, et al. "Preparation of High-Performance Metal-Free UV/Near Infrared-Shielding Films for Human Skin Protection" Nanomaterials, vol. 11. 2021, 20 pages.

Corning Inc., "Information Related to Coatings on Commercially Available Tablet Devices—Supplying data related to the Apple ipad Air 2 (released Oct. 2014), Apple ipad Pro 2nd Generation (released Jun. 2017), and Apple ipad Air 4th Generation (released Oct. 2020)" 28 pages. This document has not been published in a book, magazine, journal, etc.

Invitation to Pay Additional Fees and, Where Applicable, Protest Fee; PCT/US2024/028151; dated Jul. 16, 2024, 2 pages; Commissioner for Patents.

Liu et al., "Detectability of active triangulation range finder: a solar irradiance approach." Optics Express 24.13 (2016): 14851, 6 pages.

Oliver et al., "An improved technique for determining hardness and elastic modulus using load and displacement sensing indentation experiments", J. Mater. Res., vol. 7, No. 6, 1992, pp. 1564-1583.

Oliver et al., "Measurement of Hardness and Elastic Modulus by Instrument Indentation: Advances in Understanding and Refinements to Methodology", J. Mater. Res., vol. 19, No. 1, 2004, pp. 3-20.

240, 250, 260

200

100

202

100b

100a 210, 220, 230

240, 250, 260

2-Surface Transmittance

2-Surface Transmitted D65 Color (0°-90°)

2-Surface Transmittance

2-Surface Transmitted D65 Color (0°-90°)

2-Surface Reflectance

2-Surface Reflected D65 Color (0°-90°)

2-Surface Transmittance

2-Surface Transmitted D65 Color (0°-90°)

2-Surface Reflectance

2-Surface Reflected D65 Color (0°-90°)

2-Surface Transmittance

2-Surface Transmitted D65 Color (0°-90°)

2-Surface Reflectance

2-Surface Reflected D65 Color (0°-90°)

2-surface Reflectance

2-Surface Reflected D65 Color (0°-90°)

COATED ARTICLES AND SYSTEMS FOR CAMERA LENS AND SENSOR PROTECTION WITH HIGH VISIBLE TRANSMISSION AND LOW IR TRANSMISSION

CROSS-REFERENCE TO RELATED APPLICATIONS

This application is a continuation of International Application No. PCT/US2024/028151 filed May 7, 2024, which claims priority to U.S. Provisional Patent Application No. 63/466,097, filed on May 12, 2023, the content of each of which is relied upon and incorporated herein by reference in its entirety.

FIELD

This disclosure relates to cover glass articles for camera lens and sensor protection, particularly cover glass articles having at least one substrate with outer and/or inner optical film structures disposed thereon that exhibits high visible light transmittance and low infrared transmittance.

BACKGROUND

Cover glass articles are often used to protect critical devices and components within electronic products and systems, such as mobile devices, smart phones, computer tablets, hand-held devices, vehicular displays and other electronic devices with displays, cameras, light sources and/or sensors. These cover glass articles can also be employed in architectural articles, transportation articles (e.g., articles used in automotive applications, trains, aircraft, sea craft, etc.), appliance articles, or any article that requires some transparency, scratch resistance, abrasion resistance, or a combination thereof. These articles may, for example, include cameras and infrared sensors that are placed in an automobile for driver-assist, autonomous driving, or security applications. Stationary security cameras may also require a protective housing including a strengthened cover glass that is resistant to breakage, scratches, or other types of damage.

These applications for cover glass articles often demand a combination of mechanical and environmental durability, breakage resistance, damage resistance, scratch resistance and strong optical performance characteristics. For example, the cover glass articles may be required to exhibit (1) high light transmittance and low reflectance in the visible spectrum, (2) low light transmittance and high reflectance in the infrared spectrum, and (2) other light transmittance and reflectance parameters in other wavelength ranges depending on the components covered or otherwise protected by these articles. In some applications, the cover glass articles are required to cover cameras, sensors and/or light sources that operate in one spectrum, e.g., the visible spectrum. In many emerging applications, however, single cover glass articles are required to cover multiple cameras, sensors and light sources that operate in various spectra. Further, in other emerging applications, multiple cover glass articles are required to independently cover multiple cameras, sensors and light sources that operate in various spectra.

Accordingly, there is a need for improved cover glass articles for camera lens and sensor protection, particularly cover glass articles that exhibit a combination of high transmittance in the visible spectrum and low transmittance in the IR spectrum. This need and other needs are addressed by the present disclosure.

SUMMARY

In some aspects, disclosed is a cover glass article comprising at least one substrate with opposing outer and inner primary surfaces, and at least one of an outer optical film structure and an inner optical disposed on the outer and inner primary surfaces, respectively. In some aspects, the outer and inner film structures comprise alternating high and low refractive index layers, in which at least a portion of the high refractive index layers independently is an oxide, a nitride, and/or an oxynitride, and at least a portion of the low refractive index layers independently is an oxide, a nitride, an oxynitride, and/or a metal fluoride. In some aspects, the cover glass article exhibits high visible light transmittance and low infrared light transmittance, being useful in applications including lenses, sensors, sensor assemblies, light sources, smartwatches, a smartphones, smart glasses, vehicle camera systems, displays, and cameras.

A cover glass article, comprising:

at least one substrate comprising an outer primary surface and an inner primary surface opposite the outer primary surface; and at least one of:

an outer optical film structure disposed on the outer primary surface, the outer optical film structure comprising a first plurality of alternating high refractive index and low refractive index layers; and an inner optical film structure disposed on the inner primary surface, the inner optical film structure comprising a second plurality of alternating high refractive index and low refractive index layers;

wherein at least a portion of the high refractive index layers of the first and second pluralities, if present, independently is an oxide, a nitride, an oxynitride, or any combination thereof;

wherein at least a portion of the low refractive index layers of the first and second pluralities, if present, independently is an oxide, a nitride, an oxynitride, a metal fluoride, or any combination thereof;

wherein each high refractive index layer of the first and second pluralities, if present, can be the same or different, and each low refractive index layer of the first and second pluralities, if present, can be the same or different;

wherein the cover glass article exhibits:

(1) an average transmittance of at least 92%, as measured from 400-700 nm at one or more incident angles (e.g., at all incident angles) from 0 to 30 degrees; and (2) at least one of:

an average transmittance of less than 50%, as measured from 930-950 nm at an incident angle of 0 degrees or at one or more incident angles (e.g., at all incident angles) from 0 to 10 degrees; and an average transmittance of less than 50%, as measured from 900-1200 nm at an incident angle of 0 degrees or at one or more incident angles (e.g., at all incident angles) from 0 to 10 degrees;

wherein each transmittance is measured through the outer and inner primary surfaces of the at least one substrate and the inner and outer optical film structures, if present.

A cover glass article, comprising:

at least one substrate comprising an outer primary surface and an inner primary surface opposite the outer primary surface; and

at least one of:

an outer optical film structure disposed on the outer primary surface, the outer optical film structure comprising a first plurality of alternating high refractive index and low refractive index layers; and an inner optical film structure disposed on the inner primary surface, the inner optical film structure comprising a second plurality of alternating high refractive index and low refractive index layers;

wherein at least a portion of the high refractive index layers of the first and second pluralities, if present, independently is an oxide, a nitride, an oxynitride, or any combination thereof;

wherein at least a portion of the low refractive index layers of the first and second pluralities, if present, independently is an oxide, a nitride, an oxynitride, a metal fluoride, or any combination thereof;

wherein each high refractive index layer of the first and second pluralities, if present, can be the same or different, and each low refractive index layer of the first and second pluralities, if present, can be the same or different;

wherein the cover glass article exhibits:

(1) an average transmittance of at least 94%, as measured from 400-700 nm at one or more incident angles (e.g., at all incident angles) from 0 to 20 degrees; and (2) at least one of:

an average transmittance of less than 42%, as measured from 930-950 nm at one or more incident angles (e.g., at all incident angles) from 0 to 50 degrees; and an average transmittance of less than 40%, as measured from 900-1200 nm at an incident angle of 0 degrees or at one or more incident angles (e.g., at all incident angles) from 0 to 10 degrees;

wherein each transmittance is measured through the outer and inner primary surfaces of the at least one substrate and the inner and outer optical film structures, if present.

A cover glass article, comprising:

at least one substrate comprising an outer primary surface and an inner primary surface opposite the outer primary surface; and at least one of:

an outer optical film structure disposed on the outer primary surface, the outer optical film structure comprising a first plurality of alternating high refractive index and low refractive index layers; and an inner optical film structure disposed on the inner primary surface, the inner optical film structure comprising a second plurality of alternating high refractive index and low refractive index layers;

wherein at least a portion of the high refractive index layers of the first and second pluralities, if present, independently is an oxide, a nitride, an oxynitride, or any combination thereof;

wherein at least a portion of the low refractive index layers of the first and second pluralities, if present, independently is an oxide, a nitride, an oxynitride, a metal fluoride, or any combination thereof;

wherein each high refractive index layer of the first and second pluralities, if present, can be the same or different, and each low refractive index layer of the first and second pluralities, if present, can be the same or different;

wherein the cover glass article exhibits:

(1) an average transmittance of at least 97%, as measured from 400-700 nm at one or more incident angles (e.g., at all incident angles) from 0 to 20 degrees; and (2) at least one of:

an average transmittance of less than 8%, as measured from 930-950 nm at an incident angle of 0 degrees or at one or more incident angles (e.g., at all incident angles) from 0 to 10 degrees; and an average transmittance of less than 12%, as measured from 900-1200 nm at an incident angle of 0 degrees or at one or more incident angles (e.g., at all incident angles) from 0 to 10 degrees;

wherein each transmittance is measured through the outer and inner primary surfaces of the at least one substrate and the inner and outer optical film structures, if present.

An apparatus, comprising:

a housing;

at least one of a lens, a sensor, and a light source, each configured within the housing; and a cover glass article disposed over the at least one of a lens, a sensor, and a light source.

A method for making a cover glass article, the method comprising:

a first disposing step, comprising disposing the outer optical film structure on an outer primary surface of a substrate; and/or a second disposing step, comprising disposing the inner optical film structure on an inner primary surface of a substrate.

A cover glass article, comprising:

at least one substrate comprising an outer primary surface and an inner primary surface opposite the outer primary surface;

an outer optical film structure disposed on the outer primary surface, the outer optical film structure comprising a first plurality of alternating high refractive index and low refractive index layers; and an inner optical film structure disposed on the inner primary surface, the inner optical film structure comprising a second plurality of alternating high refractive index and low refractive index layers;

wherein the outer optical film structure has an average compressive stress $\sigma_a$ and an average thickness $h_a$ resulting in a stress×thickness value $ST_a$ of at least 100 Pa·m;

wherein the inner optical film structure has an average compressive stress $\sigma_b$ and an average thickness $h_b$ resulting in a stress×thickness value $ST_b$ of at least 100 Pa·m; and wherein an absolute value of a difference between $ST_a$ and $ST_b$, calculated as $|ST_a-ST_b|$, is less than or equal to 500 Pa·m.

A method for making a cover glass article, the method comprising:

a first disposing step, comprising disposing an outer optical film structure on the outer primary surface of a substrate, such that the outer optical film structure has a stress×thickness value $ST_a$ of at least 100 Pa·m; and a second disposing step, comprising disposing an inner optical film structure on the inner primary surface of a substrate, such that the inner optical film structure has a stress×thickness value $ST_b$ of at least 100 Pa·m.

Additional features and advantages will be set forth in the detailed description which follows, and in part will be readily apparent to those skilled in the art from that description or recognized by practicing the aspects as described herein, including the detailed description which follows, the claims, as well as the appended drawings.

BRIEF DESCRIPTION OF THE DRAWINGS

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more aspects, and together with the description serve to explain principles and operation of the various aspects.

DETAILED DESCRIPTION

Figure 1A:
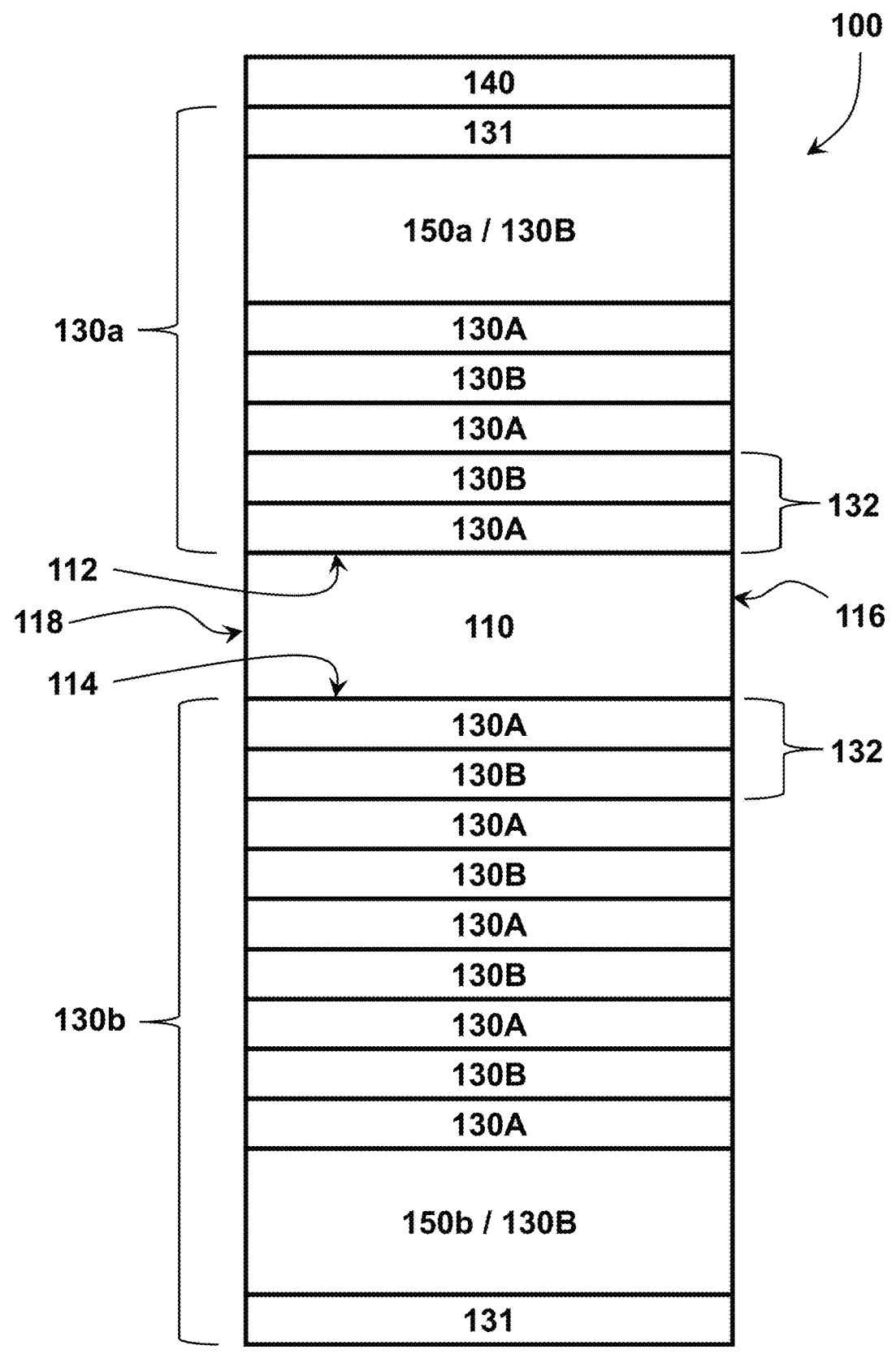
FIG. 1A is a cross-sectional side view of a cover glass article (e.g., for a camera, sensor, etc.), according to an aspect of the disclosure.

In the following detailed description, for purposes of explanation and not limitation, example aspects disclosing specific details are set forth to provide a thorough understanding of various principles of the present disclosure. However, it will be apparent to one having ordinary skill in the art, having had the benefit of the present disclosure, that the present disclosure may be practiced in other aspects that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Directional terms as used herein—for example "up," "down," "right," "left," "front," "back," "top," "bottom"— are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of aspects described in the specification; and so forth.

As used herein, the singular forms "a," "an" and "the" include plural referents unless the context clearly dictates otherwise. Thus, for example, reference to a "component" includes aspects having two or more such components, unless the context clearly indicates otherwise.

As used herein, the term "alternating high refractive index and low refractive index layers" and similar terminology includes arrangements of high refractive index ("H") and low refractive index ("L") layers as follows: (1) a structure comprising L/H/L/H in which each layer is in direct contact; (2) a structure comprising L/L/H/L/H or H/H/L/H/L in which each layer is in direct contact where there are repeat L/L or H/H layers but there nevertheless is an alternation of high and low index layers considering all layers present in an optical film structure; and (3) any aforementioned structure further comprising one or more intervening (I) layers, such as an organic or other type of layer, such as H/L/I/L/H/L/H or H/L/I/H/H/H/L/I/H/L in which there is nevertheless an alternation of high and low index layers considering all layers present in an optical film structure. By way of further example, alternating H and L layers can include the following arrangements: (a) H/L/H/L/H, (b) L/H/H/L/H/L, (c) H/L/L/H/H/H/L/H/L, (d) H/L/I/H/L/H, and (e) L/H/I/H/H/L/H/L, in which "I" is an intervening layer. However, in some aspects, as will be clear from context, the optical film structures disclosed herein may be defined to be limited to a particular type of alternating structure, such as only those with a strict alternation of H and L layers without any repeat layers abutting one another (such as H/H or L/L) and/or such as only those that exclude any intervening layers like organic layers.

As used herein, the term "dispose" includes coating, depositing, and/or forming a material onto a surface using any known or to be developed method in the art. The disposed material may constitute a layer, as defined herein. As used herein, the phrase "disposed on" includes forming a material onto a surface such that the material is in direct contact with the surface and aspects where the material is formed on a surface with one or more intervening material(s) (e.g., organic layer(s) and/or other layers that may or may not be high or low index layers) disposed between material and the surface. The intervening material(s) may constitute a layer, as defined herein, such that the inventing material is an intervening layer.

As used herein, the terms "low refractive index layer" and "high refractive index layer" refer to the relative values of the refractive index ("RI") of layers of an optical film structure of a cover glass article according to the disclosure (i.e., low RI layer<high RI layer). Hence, low RI layers have refractive index values that are less than the refractive index values of high RI layers. Further, as used herein, "low RI layer," "low refractive index layer," and "low index layer" are interchangeable with the same meaning. Likewise, "high RI layer," "high refractive index layer," and "high index layer" are interchangeable with the same meaning.

As used herein, the term "strengthened substrate" refers to a substrate that may be employed in a cover glass article of the disclosure that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

As used herein, "optical film structure," "optical coating." and "coating" are used interchangeably herein with no difference in meaning intended.

Unless otherwise specified, "thickness" herein refers to "physical thickness."

As used herein, the "Berkovich Indenter Hardness Test" and "Berkovich Hardness Test" are used interchangeably to refer to a test for measuring the hardness of a material on a surface thereof by indenting the surface with a diamond Berkovich indenter. The Berkovich Indenter Hardness Test includes indenting the outermost surface (e.g., an exposed surface) of an outer or inner optical film structure of a cover glass article of the disclosure with the diamond Berkovich indenter to form an indent to an indentation depth in the range from about 50 nm to about 1000 nm (or the entire thickness of the outer or inner optical film structure, whichever is less) and measuring the maximum hardness from this indentation along the entire indentation depth range or a segment of this indentation depth (e.g., in the range from about 100 nm to about 600 nm), generally using the methods set forth in Oliver, W. C.; Pharr, G. M. An improved technique for determining hardness and elastic modulus using load and displacement sensing indentation experiments. J. Mater. Res., Vol. 7, No. 6, 1992, 1564-1583; and Oliver, W. C.; Pharr, G. M. Measurement of Hardness and Elastic Modulus by Instrument Indentation: Advances in Understanding and Refinements to Methodology. J. Mater. Res., Vol. 19, No. 1, 2004, 3-20. As used herein, each of "hardness" and "maximum hardness" interchangeably refers to a maximum hardness as measured along a range of indentation depths, and not an average hardness.

As used herein, the term "transmittance" is defined as the percentage of incident optical power within a given wavelength range transmitted through a material (e.g., the article, the substrate or the optical film or portions thereof). The terms "transmittance" and "transmission" are used interchangeably herein with no difference in meaning intended unless otherwise clear from context. The term "reflectance" is similarly defined as the percentage of incident optical power within a given wavelength range that is reflected from a material (e.g., the article, the substrate, or the optical film or portions thereof). Transmittance and reflectance are measured using a specific linewidth. As used herein, an "average transmittance" refers to the average amount of incident optical power transmitted through a material over a defined wavelength regime. As used herein, an "average reflectance" refers to the average amount of incident optical power reflected by the material. "Average transmittance" is calculated by summing the transmittance at each individual whole number (integer) wavelength within a specified wavelength range and at a specified incidence angle and dividing that sum by the total number of transmittances that were summed. "Average reflectance" is calculated similarly using reflectance values. "Average transmittance" and "average reflectance" can be determined over the visible spectrum or other wavelength ranges, according to measurement principles understood by those skilled in the field of the disclosure, e.g., in the infrared spectrum from 930 nm to 950 nm, from 800 to 1300 nm, etc.

As used herein, "photopic reflectance" mimics the response of the human eye by weighting the reflectance or transmittance, respectively, versus wavelength spectrum according to the human eye's sensitivity. Photopic reflectance may also be defined as the luminance, or tristimulus Y value of reflected light, according to known conventions such as CIE color space conventions. The "average photopic reflectance", as used herein, for a wavelength range from 380 nm to 720 nm is defined in the below equation as the spectral reflectance, $R(\lambda)$ multiplied by the illuminant spectrum, $I(\lambda)$ and the CIE's color matching function $\bar{y}(\lambda)$, related to the eye's spectral response:

$$\langle R_p \rangle = \int_{380\ nm}^{720\ nm} R(\lambda) \times I(\lambda) \times \bar{y}(\lambda) d\lambda$$

Camera system usability can be related to the total amount of reflectance in the camera system. Photopic reflectance is particularly important for visible light camera systems. Lower reflectance in a camera system or cover glass over a camera lens can reduce multiple-bounce reflections in the camera system that can generate 'ghost images'. Thus, reflectance has an important relationship to image quality in camera systems.

As used herein, "photopic transmittance" is defined in the below equation as the spectral transmittance, $T(\lambda)$ multiplied by the illuminant spectrum, $I(\lambda)$ and the CIE's color matching function $\bar{y}(\lambda)$, related to the eye's spectral response:

$$\langle T_p \rangle = \int_{380\ nm}^{720\ nm} T(\lambda) \times I(\lambda) \times \bar{y}(\lambda) d\lambda$$

Unless otherwise noted, all transmittance and reflectance values reported or otherwise referenced in this disclosure are associated with testing through both the outer and inner primary surfaces of the at least one substrate and the inner and outer optical film structures (and organic layer(s) or other intervening layer(s)), if present, over a specified incident angle range (e.g., a "two-surface" average transmittance or reflectance).

As used herein, "transmitted color" and "reflected color" refer to the color transmitted or reflected, respectively, through the cover glass articles of the disclosure with regard to color in the CIE L*, a*, b* colorimetry system under a D65 illuminant. More specifically, the "transmitted color" and "reflected color" are given by $\sqrt{(a^{*2}+b^{*2})}$, as these color coordinates are measured through transmittance or reflectance of a D65 illuminant through both the outer and inner primary surfaces of the at least one substrate and the inner and outer optical film structures (and organic layer(s)), if present, over a specified incident angle range, e.g., from 0 degrees to 10 degrees, 0 degrees to 40 degrees, and so forth.

As used herein, the term "substantially" is utilized herein to represent an inherent degree of uncertainty that attributable to any quantitative comparison, value, measurement, or other representation. For example, when a cover glass article is "substantially planar" or "substantially flat," it means that the cover glass article nominally has a long range flatness or planarity; in other words, there is nominally little to no long range warp or bend in a macroscale dimension of the cover glass article, and one of ordinary skill in the art would consider such a "substantially flat" or "substantially planar" article to be "flat" or "planar" even if there is a measurable bend or non-planarity in the microscale dimension The term "substantially" is also utilized herein to represent the degree by which a quantitative representation may vary from a stated reference without resulting in a change in the basic function of the subject matter at issue. Thus, for example, a glass that is "substantially free" of any specific component (e.g., $Al_2O_3$, $MgO$, or any other component) is one in which the component is not actively added or batched into the glass, but may be present in small amounts as a contaminant (e.g., less than 1000, 500, 400, 300, 200, or 100 ppm), or, if actively added or batched, is present in an amount less than 1 wt. % (e.g., or can be specified to be less than 0.5 wt. %, 0.1 wt. %, or 0.05 wt. %), based on total amount of the glass (moles or mass for ppm, and mass for wt. %).

Generally, the disclosure is directed to cover glass articles that employ outer and/or inner optical film structures for substrates, including strengthened glass substrates (e.g., Corning® Gorilla Glass® products). In some aspects, these cover glass articles have high hardness and scratch resistance, and low optical reflectance. Scratches and reflections are both detrimental to camera, sensor, and light source performance, leading to signal loss, image distortion, and related artifacts. The optical film structures of the disclosure are indicative of new multilayer film structures, and the cover glass articles of the disclosure reflect new system-level designs which optimize the visible and IR transmittances for lens, sensor, and/or light source protective glass, such as for use in cameras.

Infrared (IR) sensors are increasingly being deployed in consumer electronic applications, for example in LIDAR or time-of-flight infrared sensing for applications such as distance sensing for camera focus and facial recognition. These IR sensors (which may include IR cameras) typically operate at wavelengths where semiconductor IR components have historically been developed, driven by semiconductor bandgap considerations (e.g. emission and absorption wavelengths for silicon, which is typically used in visible light cameras as well as IR detectors, gallium arsenide (GaAs), germanium, indium phosphide (InP), InGaAs, GaInAsP, AlGaInAs, (Ga)InAs+quantum dot, and GaInNAs(Sb)), emission wavelengths for rare earth and other emitting elements and compounds (e.g. erbium, ytterbium, neodymium-doped yttrium aluminum garnet), telecom (e.g. silica optical fiber) transparency window considerations, and wavelength division multiplexing telecom applications operating in a wavelength window from about 1260-1675 nm. Typical exemplary wavelengths include those at or near (e.g. within 50 nm from) wavelengths centered around 850 nm, 940 nm, 1060 nm, 1260 nm, 1310 nm, and 1550 nm.

Common solid state camera sensors (CCD or CMOS) are sensitive to IR light. To faithfully reproduce what the human eye sees, IR cut-off filters are generally used in camera systems to block IR transmission. This can be especially important in modern cameras or smartphones that may use IR LED's or lasers for range-finding, facial recognition, temperature and health monitoring, and other sensing methods. As these IR sources proliferate, it becomes more important to filter out these IR light sources from visible light camera imagery, otherwise the camera images may contain extraneous IR light spots or general glare which distort or wash out the captured images, and do not represent what the human eye sees (which is the intention of general visible light photography).

As the number of cameras, sensors and light sources increase in electronic devices and the need for imaging and sensing continues to grow, the need for protective cover glass articles with optimized scratch and damage resistance, along with tailored optical transmission across a wide spectrum, likewise continues to grow. The cover glass articles of the disclosure address these developing needs with new optical film structures and system-level designs.

In some aspects, the disclosed cover glass articles with one or more optical film structure have high visible transmittance and low IR transmittance, thus reducing or eliminating the need for an extra IR cut-off filter component, while maintaining high hardness and scratch resistance of the exterior surface of the lens cover to preserve high image quality over time in mechanically demanding consumer applications.

In some aspects, disclosed cover glass articles may be used on or as protective cover glasses or lenses in visible light camera systems. In some aspects, the disclosed cover glass articles and optical coatings are particularly designed to have high transmission for visible light while having low transmission for IR wavelengths near 940 nm, in the range from 800-1300 nm, in the range from 850-1250 nm, in the range from 900-1200 nm, and in the range from 900-1100 nm.

In some aspects, one or more cameras and cover glass articles may thus be combined into a larger system (e.g. a smartwatch, smartphone, augmented reality smart glasses, autonomous vehicle camera system, etc.) that combine multiple components, including one or more of: 1) a visible light image detector forming a camera, which may also comprise lenses and/or a protective cover glass article comprising the disclosed optical film structure(s); 2) an infrared light source operating in the wavelength range of 800-1300 nm; and 3) an infrared detector operating in the wavelength range of 800-1300 nm that is not protected or shielded by the optical film structure(s) disclosed herein, but may be protected by a separate lens or cover glass that has high infrared transmittance and either high or low visible transmittance, as desired.

The cover glass articles of the disclosure can be employed for camera lens, sensor and light source protection, along with protection of other components (e.g., buttons, speakers, microphones, etc.). These cover glass articles employ outer and/or inner optical film structures that exhibit a combination of desirable optical properties, including high visible transmittance and low infrared transmittance, and, in some aspects, may also exhibit high hardness. The cover glass articles can include a scratch-resistant layer within one or both of the outer and inner optical film structures, if present. Further, the optical film structures of these articles can include a plurality of alternating high and low refractive index layers. In some aspects, at least a portion of the high refractive index layers independently is an oxide, a nitride, an oxynitride, or any combination thereof. In some aspects, at least a portion of the low refractive index layers independently is an oxide, a nitride, an oxynitride, a metal fluoride, or any combination thereof. In some aspects, at least one organic layer (also termed an organic buffer layer or crack mitigation layer herein) may be employed, typically but not necessarily between a primary surface of a substrate and a high or low index layer. In some aspects, one or more organic layers is disposed between (and optionally in direct contact with) the inner primary surface and the inner optical film structure. Alternatively or additionally, in some aspects, one or more organic layers is disposed between (and optionally in direct contact with) the outer primary surface and the outer optical film structure. Such organic layer(s) may provide improved flexural strength to the cover glass article. In some aspects, the organic layer comprises a polyimide, a silicone, a siloxane, or any combination thereof. In some aspects, the organic layer comprises a polyimide, a silicone, a siloxane, polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI), epoxy, styrenic, phenolic, melamine, silicone resins, blends thereof, or any copolymers thereof. In some aspects, in addition to one or more of these polymers, the organic layer may also comprise one or more alkoxysilanes or aminoalkoxysilanes, such as 3-aminopropyltrimethoxysilane, which may facilitate anchoring of the organic layer to a glass substrate and/or RI layers. In some aspects, the organic layer may further comprise pitch carbon. In some aspects, the organic layer may be formed from one or more prepolymers, such as a urethane prepolymer, to result in an organic layer comprising one or more polymers, such as polyurethane. In some aspects, the organic comprises pitch carbon, polyurethane, and 3-aminopropyltrimethoxysilane (and/or a material resulting from reaction of 3-aminopropyltrimethoxysilane with the other components present, such as a substrate and/or RI layers). In some aspects, the organic layer is derived from pitch carbon, urethane prepolymer, and 3-aminopropyltrimethoxysilane. Other organic layers suitable for use in the cover glass articles and optical film structures disclosed herein is disclosed in U.S. Pat. No. 11,440,837, titled "Articles having retained strength," U.S. Pat. No. 11,479,501, titled "Articles with a low-elastic modulus layer and retained strength," U.S. Pat. No. 11,434,166, titled "Articles with a low-elastic modulus layer and retained strength," and U.S. Pat. No. 9,586,858, titled "Laminate articles with moderate adhesion and retained strength," each of which is hereby incorporated herein by reference in its entirety.

In some aspects, an organic layer has any suitable physical thickness, such as a physical thickness (nm) of 1-300, 1-275, 1-250, 1-225, 1-200, 1-175, 1-150, 1-125, 1-100, 1-75, 1-50, 1-25, 25-300, 25-275, 25-250, 25-225, 25-200, 25-175, 25-150, 25-125, 25-100, 25-75, 25-50, 50-300, 50-275, 50-250, 50-225, 50-200, 50-175, 50-150, 50-125, 50-100, 50-75, 75-300, 75-275, 75-250, 75-225, 75-200, 75-175, 75-150, 75-125, 75-100, 100-300, 100-275, 100-250, 100-225, 100-200, 100-175, 100-150, 100-125, 125-300, 125-275, 125-250, 125-225, 125-200, 125-175, 125-150, 150-300, 150-275, 150-250, 150-225, 150-200, 150-175, 175-300, 175-275, 175-250, 175-225, 175-200, 200-300, 200-275, 200-250, 200-225, 225-300, 225-275, 225-250, 250-300, 250-275, or 275-300. In some aspects, the physical thickness (nm) of the organic layer is 1-100, 25-100, 25-125, or 25-75. When more than one organic layer is employed, each organic layer can be described by any of the aforementioned physical thicknesses.

With regard to mechanical properties, the cover glass articles (e.g., containing an outer optical film structure, an inner optical film structure, or both) can exhibit a maximum hardness of 8 GPa or greater, 9 GPa or greater, or 10 GPa or greater, as measured by a Berkovich Hardness Test over an indentation depth range from 100 nm to about 500 nm in at least one of the outer optical film structure and the inner optical film structure. Such hardness properties facilitate use of the cover glass articles in applications that can benefit from high scratch resistance in intended applications, such as, for example, consumer electronics or vehicle sensing systems (or any other application disclosed herein).

In terms of optical properties, the cover glass articles (e.g., containing an outer optical film structure, an inner optical film structure, or both, optionally with one or more intervening layers and/or organic layers) can exhibit at least one of: (a) an average transmittance of at least 92% (e.g., at least 93%, at least 94%, at least 95%, at least 96%, at least 97%, or at least 98%), as measured from 400-700 nm at one or more incident angles (e.g., at all incident angles) from 0 to 30 degrees; (b) an average transmittance of at least 80% (e.g., at least 81%, at least 82%, at least 83%, at least 84%, at least 85%, at least 86%, at least 87%, at least 88%, or at least 89%), as measured from 400-700 nm at one or more incident angles (e.g., at all incident angles) from 0 to 60 degrees; (c) a visible photopic average transmittance of at least 92% (e.g., at least 93%, at least 94%, at least 95%, at least 96%, at least 97%, or at least 98%), as measured at an incident angle of 0 degrees or at one or more incident angles (e.g., at all incident angles) from 0 to 10 degrees; (d) an average transmittance of at least 92% (e.g., at least 93%, at least 94%, at least 95%, at least 96%, at least 97%, or at least 98%), as measured from 400-700 nm at an incident angle of 0 degrees or at one or more incident angles (e.g., at all incident angles) from 0 to 10 degrees; (e) an average transmittance of less than 50% (e.g., less than 45%, less than 40%, less than 35%, less than 30%, less than 25%, less than 20%, less than 15%, less than 10%, less than 9%, less than 8%, less than 7%, less than 6%, less than 5%, less than 4%, less than 3%, less than 2%, or less than 1%), as measured from 930-950 nm at one or more incident angles (e.g., at all incident angles) from 0 to 30 degrees; (f) an average transmittance of less than 50% (e.g., less than 45%, less than 40%, less than 35%, less than 30%, less than 25%, less than 20%, less than 15%, less than 10%, less than 9%, less than 8%, or less than 7%), as measured from 930-950 nm at one or more incident angles (e.g., at all incident angles) from 0 to 60 degrees; (g) an average transmittance of less than 50% (e.g., less than 45%, less than 40%, less than 35%, less than 30%, less than 25%, less than 20%, less than 15%, less than 10%, less than 9%, less than 8%, less than 7%, or less than 6%, or less than 5%), as measured from 930-950 nm at an incident angle of 0 degrees or at one or more incident angles (e.g., at all incident angles) from 0 to 10 degrees; (h) an average transmittance of less than 60% (e.g., less than 55%, less than 50%, less than 45%, less than 40%, less than 35%, less than 30%, less than 25%, less than 20%, or less than 15%), as measured from 800-1300 nm at an incident angle of 0 degrees or at one or more incident angles (e.g., at all incident angles) from 0 to 10 degrees; (i) an average transmittance of less than 60% (e.g., less than 55%, less than 50%, less than 45%, less than 40%, less than 35%, less than 30%, less than 25%, less than 20%, less than 15%, or less than 10%), as measured from 850-1250 nm at an incident angle of 0 degrees or at one or more incident angles (e.g., at all incident angles) from 0 to 10 degrees; (j) an average transmittance of less than 50% (e.g., less than 45%, less than 40%, less than 35%, less than 30%, less than 25%, less than 20%, less than 15%, less than 10%, less than 9%, less than 8%, less than 7%, or less than 6%, or less than 5%), as measured from 900-1200 nm at an incident angle of 0 degrees or at one or more incident angles (e.g., at all incident angles) from 0 to 10 degrees; (k) an average transmittance of less than 50% (e.g., less than 45%, less than 40%, less than 35%, less than 30%, less than 25%, less than 20%, less than 15%, less than 10%, less than 9%, less than 8%, less than 7%, or less than 6%, or less than 5%, less than 4%, less than 3%, or less than 2%), as measured from 900-1100 nm at an incident angle of 0 degrees or at one or more incident angles (e.g., at all incident angles) from 0 to 10 degrees. Each transmittance is measured through the outer and inner primary surfaces of the at least one substrate and the inner and outer optical film structures (and any organic and/or intervening layers), if present.

In some aspects, the cover glass articles (e.g., containing an outer optical film structure, an inner optical film structure, or both) may exhibit low transmitted color, $\sqrt{(a*^2+b*^2)}$, of at least one of: (a) less than 2 at incidence angles from 0 to 40 degrees; (b) less than 2 at incidence angles from 0 to 50 degrees; (c) less than 1.1 at incidence angles from 0 to 50 degrees; (d) less than 0.5 at incidence angles from 0 to 20 degrees; and (e) less than 0.2 at incidence angles from 0 to 10 degrees. Each transmitted color is measured through the outer and inner primary surfaces of the at least one substrate and the inner and outer optical film structures (and any organic and/or intervening layers), if present.

In some aspects, the cover glass articles (e.g., containing an outer optical film structure, an inner optical film structure, or both) may exhibit an average reflectance of less than 8% (e.g., less than 7%, less than 6%, less than 5%, less than 4%, less than 3%, less than 2%, or less than 1.5%), as measured from 400-700 nm at an incident angle of 0 degrees or at one or more incident angles (e.g., at all incident angles) from 0 to 10 degrees. Each reflectance is measured through the outer and inner primary surfaces of the at least one substrate and the inner and outer optical film structures (and any organic and/or intervening layers), if present.

In some aspects, the cover glass articles can be employed with a camera and/or sensor assembly as a camera/sensor system. For example, the system can include: 1) a sensor, which may be an imaging sensor, an infrared (IR) sensor, or any type of light sensor; 2) a lens, multiple lenses, or a lens-like system, to focus, collimate, or shape incoming light; 3) a light source; and 4) one or more of the one- or two-sided cover glass articles of the disclosure. In some aspects of these systems, a single cover glass article with outer and/or inner optical film structures is employed as a protective cover for multiple sensors, lenses and/or light sources. These multiple sensors can also include one or more cameras combined with one or more infrared sensors, such as IR time-of-flight or light detection and ranging (LIDAR) sensors. In other related aspects, multiple cover glass articles with outer and/or inner optical film structures are employed to independently protect multiple sensors, lenses and/or light sources. In further related aspects, cover glass articles with one or more portions defined by outer and/or inner optical film structures, as configured according to the disclosure, can be employed to protect one or more sensors, lenses and/or light sources.

Furthermore, in some aspects, the cover glass articles of the disclosure can be optimized for improving and protecting performance of a camera or IR system. The outer and/or inner optical film structure on each primary surface of the substrate reduces reflectance, which reduces the presence of ghost images, image flare, image bloom, and other artifacts in the camera/sensor system. In some aspects, the outer optical film structure is present and provide high hardness, including high resistance to scratches and other forms of mechanical damage, which tend to degrade the performance of the camera or sensor system over time, for example, creating image artifacts, haze, or reduced IR sensor efficacy. These camera/sensor systems are becoming widespread in applications such as front and rear assemblies of smartphones and vehicle camera and sensor systems.

In some aspects, the disclosed cover glass articles comprise an inner optical film structure or an outer optical film structure, either of which is termed a "1-side" (or "one-side") coating herein. In some aspects, the disclosed cover glass articles comprise an outer optical film structure and an inner optical film structure, which is termed "2-side" (or "two-side") coating herein. In some aspects, the 2-side or 1-side coating on a disclosed cover glass reduces reflectance in the visible wavelength range, which reduces the presence of ghost images, image flare, image bloom and other artifacts in the camera/sensor system. In some aspects, the 2-side or 1-side coating on the cover glass blocks the transmission in the IR wavelength range, thus reducing the need for an extra IR cut-off filter component. In some aspects, the external coating of the 2-side or 1-side designs has high hardness, which provides a high resistance to scratches and other forms of mechanical damage. Generally, in some aspects, the outer optical film structure has a high hardness to provide protection against scratches and impacts; however, in some aspects, the inner optical film structure may have a high hardness.

Figure 1B:
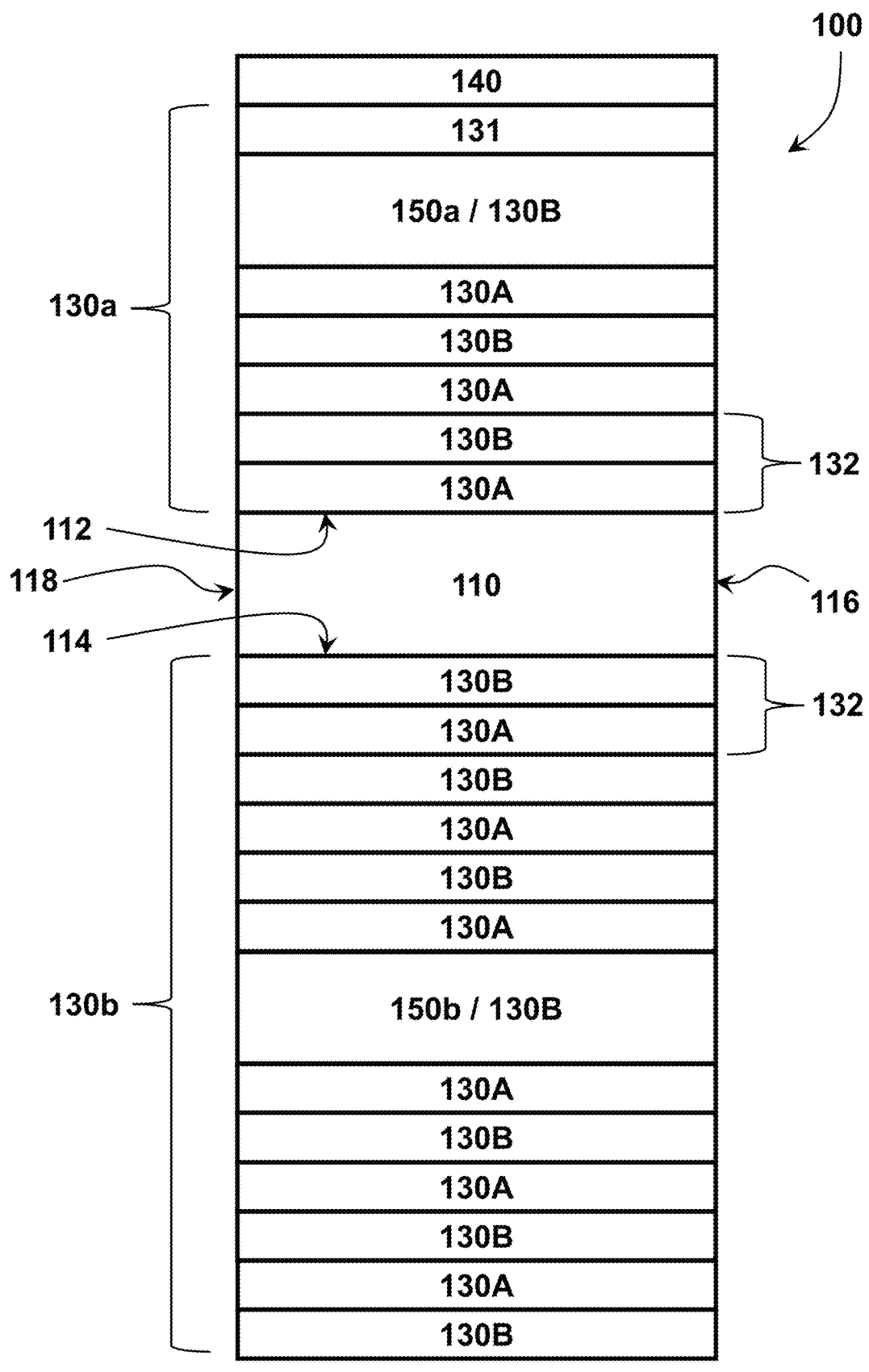
FIG. 1B is a cross-sectional side view of a cover glass article, according to an aspect of the disclosure.

Referring to FIGS. 1A and 1B, a cover glass article 100 according to one or more aspects may include a substrate 110, and an outer optical film structure 130a and an inner optical film structure 130b disposed on the substrate 110. The substrate 110 includes an outer primary surface 112 and an inner primary surface 114 that opposes the outer primary surface 112. Opposing secondary surfaces 116, 118 are also present. The outer optical film structure 130a is shown in FIGS. 1A and 1B as disposed on the outer primary surface 112, and the inner optical film structure 130b is disposed on the inner primary surface 114. Although not depicted in FIGS. 1A and 1B, an optional organic layer can be included between the outer optical film structure 130a and the substrate 110, and/or an optional organic layer can be included between the inner optical film structure 130b and the substrate 110. Further, in some aspects, one or more of the outer and inner optical films structures 130a and 130b can additionally be disposed on one or both of the opposing secondary surfaces 116, 118, according to some aspects. Although FIGS. 1A and 1B (and 1C discussed below) all depict a cover glass article containing both inner and outer optical film structures, it is contemplated that some aspects include (1) the inner optical film structure but not the outer optical film structure, or (2) the outer optical film structure but not the inner optical film structure. In some aspects, although not shown in the figures, the cover glass article comprises one or more ink layers around the perimeter of the inner optical film structure, the outer optical film structure, or both. Each of the one or more ink layers can be black, white, red, organic, yellow, green, blue, indigo, violet, or any combination thereof.

In some aspects, the cover glass article comprises the outer optical film structure. In some aspects, the cover glass article comprises only the outer optical film structure and does not include an inner optical film structure. In some aspects, the cover glass article comprises the inner optical film structure. In some aspects, the cover glass article comprises only the inner optical film structure and does not include the outer optical film structure. In some aspects, the cover glass article comprises both the outer optical film structure and the inner optical film structure. In some aspects, the cover glass article includes, in this order, an outer optical film structure, at least one substrate, one or more interior optical film structures, at least one substrate, and an inner optical film structure. It is contemplated that any number of substrates and optical film structures, in any order, can be combined to produce a cover glass article.

Figure 1C:
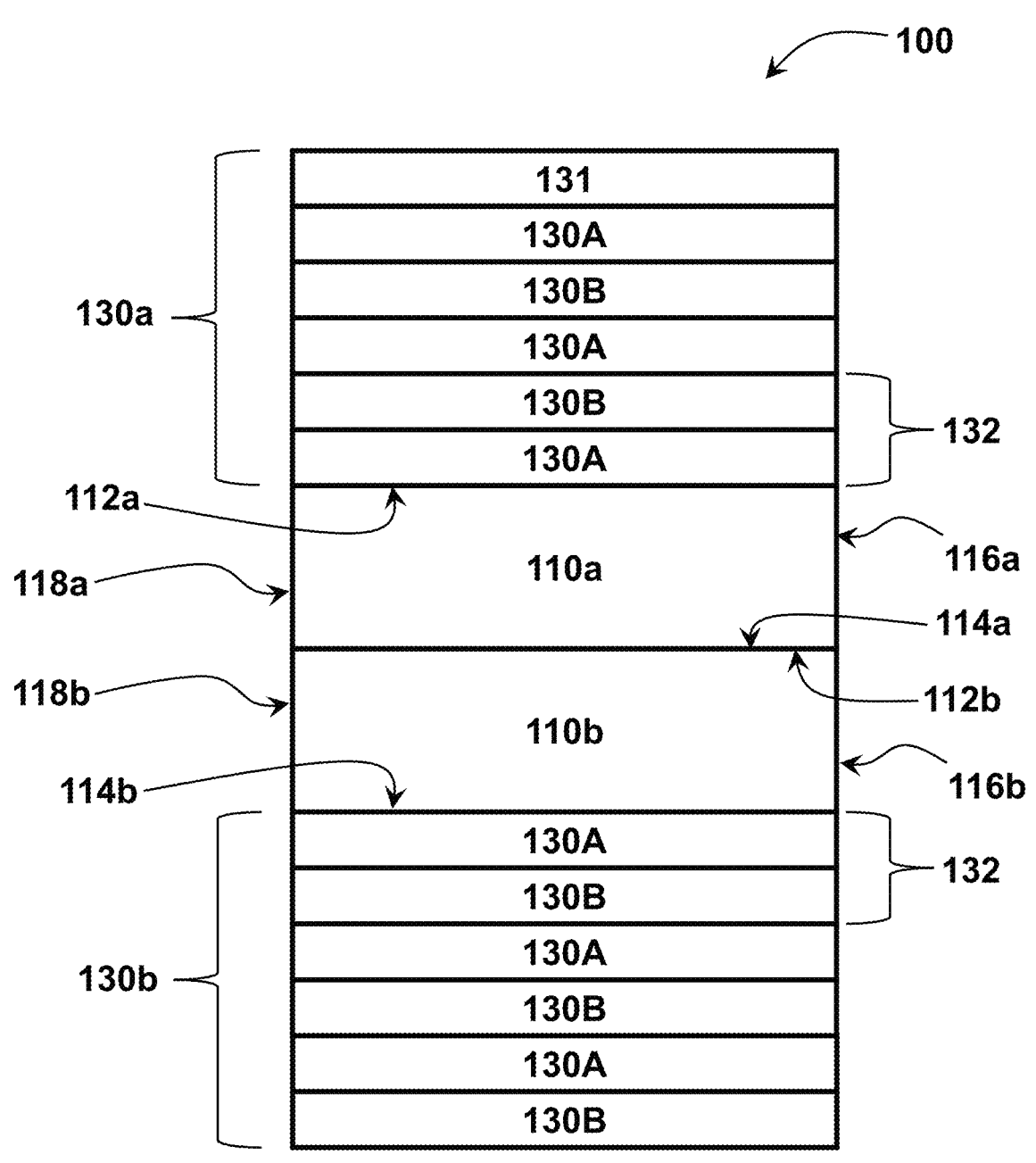
FIG. 1C is a cross-sectional side view of a cover glass article, according to an aspect of the disclosure.

FIG. 1C is similar to FIGS. 1A and 1B, but FIG. 1C illustrates an aspect in which two substrates 110 and 110b are present. In FIG. 1C, a cover glass article 100 according to one or more aspects may include at least one substrate, in which the at least one substrate comprises substrate 110a with outer primary surface 112, and substrate 110b with inner primary surface 114b. The cover glass article 100 comprises an outer optical film structure 130a disposed on the outer primary surface 112a, and an inner optical film structure 130b disposed on the inner primary surface 114b. The substrate 110a also includes an inner primary surface 114a, and substrate 110b also includes an outer primary surface 112b. Thus, in this aspect, the "at least one substrate" comprises two substrates 110a. 110b that collectively have an outer primary surface 112a and an inner primary surface 114b opposite the outer primary surface 112a in which at least one of an outer optical film structure 130a is disposed on the outer primary surface 112a and an inner optical film structure 130b disposed on the inner primary surface 114b. In this aspect, substrates 110a and 110b are joined together via the inner primary surface 114a of substrate 110a and the outer primary surface 112b of substrate 110b. Such joining can be accomplished in any suitable manner known in the art, such as via an organic layer, an adhesive layer, an adhesion layer, melting, and so forth. Such joining additionally or alternatively can also include a high index layer, a low index layer, or alternating high and low index layers as disclosed herein. Opposing secondary surfaces 116a, 118a are present in substrate 110a, and opposing secondary surfaces 116b, 118b are present in substrate 110b. Although not depicted in FIG. 1C, an optional organic layer can be included between the outer optical film structure 130a and the substrate 110a, and/or an optional organic layer can be included between the inner optical film structure 130b and the substrate 110b. Further, in some aspects, one or more of the outer and inner optical films structures 130a and 130b can additionally be disposed on one or more of the opposing secondary surfaces 116a, 118a, 116b, 118b, according to some aspects.

Figure 1D:
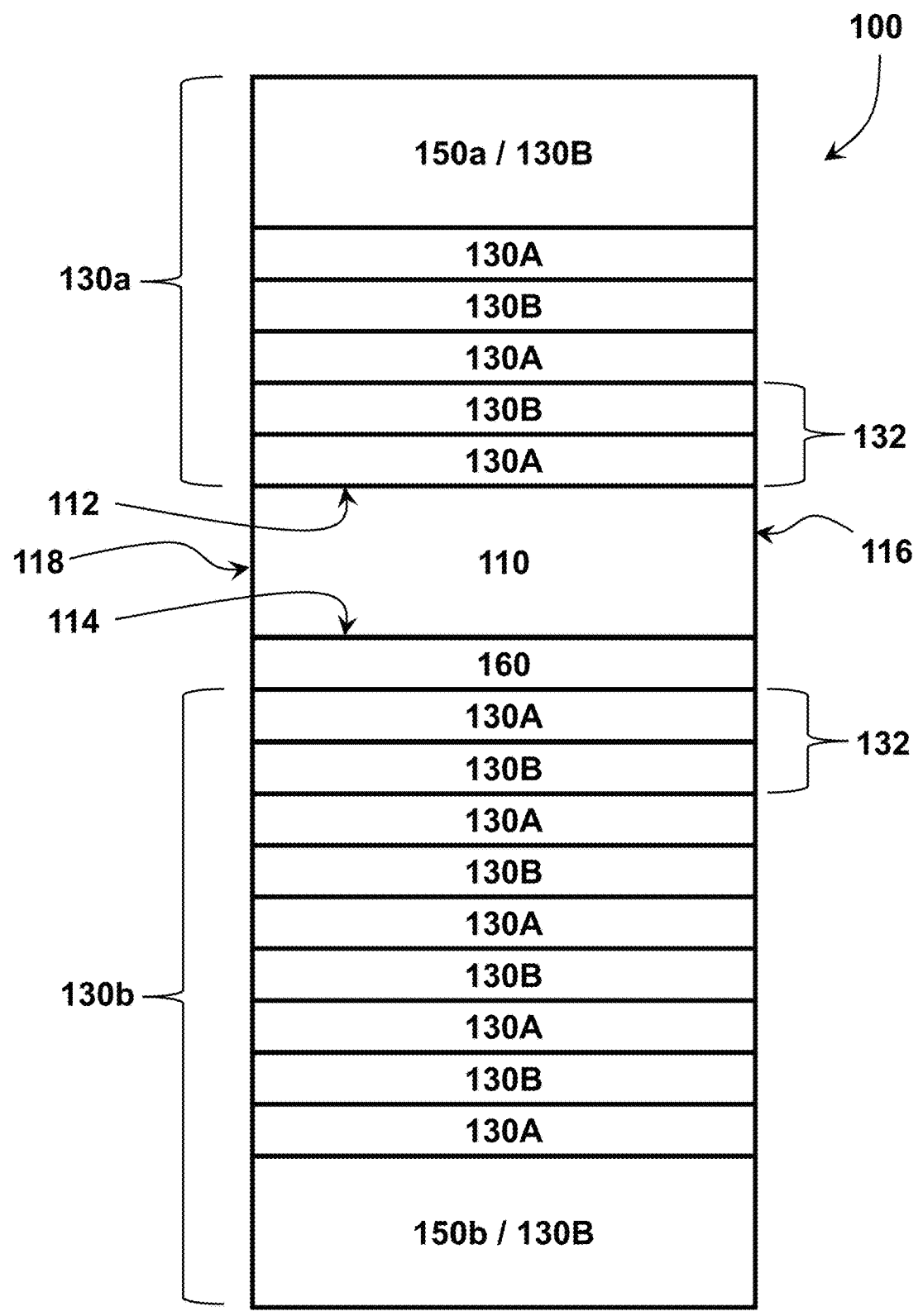
FIG. 1D is a cross-sectional side view of a cover glass article, according to an aspect of the disclosure.

FIG. 1D is effectively the same as FIG. 1A, but with a few differences. FIG. 1D does not contain a top coating 140 or capping layers 131, even though the top coating 140 and capping layers 131 as shown in FIG. 1A could be included in the cover glass article 100 of FIG. 1D, if desired. FIG. 1D further includes an organic buffer layer 160 positioned between the substrate 110 and the inner optical film structure 130b. If desired, an organic buffer layer 160 can additionally or alternatively be positioned between the substrate 110 and the outer optical film structure 130a, if desired.

In some aspects, the outer and/or inner optical film structures are present. When present, each of the outer and inner optical film structures 130a and 130b include at least one layer of material. As used herein, the term "layer" may include a single layer or may include one or more sub-layers. Such sub-layers may be in direct contact with one another. The sub-layers may be formed from the same material or two or more different materials. In one or more alternative aspects, such sub-layers may have intervening layers of different materials disposed therebetween. In one or more aspects, a layer may include one or more contiguous and uninterrupted layers and/or one or more discontinuous and interrupted layers (i.e., a layer having different materials formed adjacent to one another). A layer or sub-layer may be formed by any known method in the art, including discrete deposition or continuous deposition processes. In one or more aspects, the layer may be formed using only continuous deposition processes, or, alternatively, only discrete deposition processes.

In one or more aspects, a single layer or multiple layers of each of the outer and inner optical film structures 130a and 130b may be deposited onto the substrate 110 (or 110a or 110b) by a vacuum deposition technique such as, for example, chemical vapor deposition (e.g., plasma enhanced chemical vapor deposition (PECVD), low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation, atomic layer deposition, or any combination thereof. Liquid-based methods may additionally or alternatively be used, such as spraying, dipping, spin coating, slot coating (e.g., using sol-gel materials), or any combination thereof. Generally, vapor deposition techniques may include a variety of vacuum deposition methods which can be used to produce thin films. For example, physical vapor deposition uses a physical process (such as heating or sputtering) to produce a vapor of material, which is then deposited on the object which is coated. In some aspects, a preferred method of fabricating the outer and inner optical film structures 130a and 130b includes reactive sputtering, metal-mode reactive sputtering, thermal evaporation, e-beam evaporation, ion-beam-enhanced evaporation, PECVD processes, or any combination thereof.

Each of the outer and inner optical film structures 130a and 130b independently may have a thickness of from about 100 nm to about 10 microns (i.e., 10,000 nm). For example, each of the optical film structures 130a and 130b independently may have a thickness of greater than or equal to about 200 nm, 300 nm, 325 nm, 350 nm, 375 nm, 400 nm, 500 nm, 600 nm, 700 nm, 800 nm, 900 nm, 1 micron, 2 microns, 3 microns, 4 microns, 5 microns, 6 microns, 7 microns, or even 8 microns, and less than or equal to about 10 microns. In some aspects, each of the optical film structures 130a and 130b independently may have a thickness (nm) of 200-10000, 200-9000, 200-8000, 200-7000, 200-6000, 200-5000, 200-4000, 200-3000, 200-2000, 200-1000, 200-900, 200-800, 200-700, 200-600, 200-500, 200-400, 200-300, 300-10000, 300-9000, 300-8000, 300-7000, 300-6000, 300-5000, 300-4000, 300-3000, 300-2000, 300-1000, 300-900, 300-800, 300-700, 300-600, 300-500, 300-400, 400-10000, 400-9000, 400-8000, 400-7000, 400-6000, 400-5000, 400-4000, 400-3000, 400-2000, 400-1000, 400-900, 400-800, 400-700, 400-600, 400-500, 500-10000, 500-9000, 500-8000, 500-7000, 500-6000, 500-5000, 500-4000, 500-3000, 500-2000, 500-1000, 500-900, 500-800, 500-700, 500-600, 600-10000, 600-9000, 600-8000, 600-7000, 600-6000, 600-5000, 600-4000, 600-3000, 600-2000, 600-1000, 600-900, 600-800, 600-700, 700-10000, 700-9000, 700-8000, 700-7000, 700-6000, 700-5000, 700-4000, 700-3000, 700-2000, 700-1000, 700-900, 700-800, 800-10000, 800-9000, 800-8000, 800-7000, 800-6000, 800-5000, 800-4000, 800-3000, 800-2000, 800-1000, 800-900, 900-10000, 900-9000, 900-8000, 900-7000, 900-6000, 900-5000, 900-4000, 900-3000, 900-2000, 900-1000, 1000-10000, 1000-9000, 1000-8000, 1000-7000, 1000-6000, 1000-5000, 1000-4000, 1000-3000, 1000-2000, 2000-10000, 2000-9000, 2000-8000, 2000-7000, 2000-6000, 2000-5000, 2000-4000, 2000-3000, 3000-10000, 3000-9000, 3000-8000, 3000-7000, 3000-6000, 3000-5000, 3000-4000, 4000-10000, 4000-9000, 4000-8000, 4000-7000, 4000-6000, 4000-5000, 5000-10000, 5000-9000, 5000-8000, 5000-7000, 5000-6000, 6000-10000, 6000-9000, 6000-8000, 6000-7000, 7000-10000, 7000-9000, 7000-8000, 8000-10000, 8000-9000, or 9000-10000, The outer and inner optical film structures 130a and 130b, if both are present, may have the same thicknesses or different thicknesses.

In one or more aspects, the outer and inner optical film structures 130a and 130b may include, or consist of, first and second scratch-resistant layers 150a and 150b, respectively, as shown in FIGS. 1A and 1B. For example, the cover glass article 100 is depicted in FIGS. 1A and 1B, which includes a scratch-resistant layer 150a disposed over a primary surface 112 and scratch-resistant layer 150b disposed over a primary surface 114. According to one aspect, the scratch-resistant layers 150a and 150b may comprise one or more materials chosen from $Si_uAl_vO_xN_y$, $Ta_2O_5$, $Nb_2O_5$, $AlN$, $AlN_x$, $SiAl_xN_y$, $AlN_x/SiAl_xN_y$, $Si_3N_4$, $AlO_xN_y$, $SiO_x$ $N_y$, $SiN_x$, $SiN_x:H_y$, $HfO_2$, $TiO_2$, $ZrO_2$, $Y_2O_3$, $Al_2O_3$, $MoO_3$, diamond-like carbon, or any combination thereof. Exemplary materials used in the scratch-resistant layers 150a, 150b may include an inorganic carbide, nitride, oxide, diamond-like material, or any combination thereof. Examples of suitable materials for the scratch-resistant layers 150a, 150b include metal oxides, metal nitrides, metal oxynitride, metal carbides, metal oxycarbides, or any combination thereof. Exemplary metals include B, Al, Si, Ti, V, Cr, Y, Zr, Nb, Mo, Sn, Hf, Ta, W, or any combination thereof. Specific examples of materials that may be utilized in the scratch-resistant layers 150a, 150b may include $Al_2O_3$, $AlN$, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$, or any combination thereof. In some aspects, the scratch-resistant layers 150a, 150b may include $Ta_2O_5$, $Nb_2O_5$, $SiN_x$, $Al_2O_3$, $SiO_xN_y$, $AlN_x$, $SiAl_xN_y$, or any combination thereof. In some aspects, one or more of the scratch-resistant layers 150a, 150b may be a super-lattice of nano-layered $AlN_x/SiAl_xN_y$, as detailed in U.S. Patent Application Publication No. 2018/0029929, published on Feb. 1, 2018, entitled "Optical Structures and Articles with Multilayer Stacks Having High Hardness and Methods for Making the Same." the salient portions of which are hereby incorporated by reference in this disclosure. In some aspects, each of the scratch-resistant layers 150a, 150b exhibits a fracture toughness value greater than about 1 MPa√m and simultaneously exhibits a hardness value greater than about 8 GPa (or any other value disclosed herein), as measured by a Berkovich Hardness Test. Although FIGS. 1A and 1B depicted scratch-resistant layers in both the inner and outer optical film structures, the scratch-resistant layers may be included in only one of the inner or outer optical films structures, or not at all.

In one or more aspects, disclosed is an article that comprises a glass or glass-ceramic substrate having a multilayer coating on both surfaces of the substrate designed to either control the warp to a predetermined level, or to mitigate warp entirely such that the article is nominally flat. Specifically, the warp may be controlled by controlling the thickness and stress in the B-side coating relative to the A-side coating. As used herein, "A-side" refers to the side of an article that faces a user and typically is the outer optical coating (also called Front Coating herein) and "B-side"

refers to the side of an article that faces the display (i.e., the display over which the article is disposed) and typically is the inner optical coating (also called Rear Coating herein). Stress here refers to any stress in the coating due to the deposition process, thermal mismatch stress, or any other source(s) of stress which are generally controlled to be compressive in nature to benefit the fracture strength of the article.

According to the convention normally used in the art, compression or compressive stress is expressed as a negative (<0) stress and tension or tensile stress is expressed as a positive (>0) stress. Throughout this description, however, CS is expressed as a positive or absolute value—i.e., as recited herein, CS=|CS|.

In one or more aspects, one or both of the outer and inner optical film structures 130*a* and 130*b* may possess an intrinsic stress coating, controlled through film deposition process conditions, which may preferably be a compressive stress. These stress values may comprise an average or effective compressive stress for the optical film structures of greater than 100 MPa, 200 MPa, 300 MPa, 400 MPa, 500 MPa, 600 MPa, 700 MPa, 800 MPa, 900 MPa, 1000 MPa, 1100 MPa, or even greater than 1200 MPa. The compressive stress of the optical film structures may also lie in a range between any of the above mentioned values, such as from 100-1200 MPa, 200-1000 MPa, 400-1000 MPa, 600-1000 MPa, or 700-1200 MPa, or any other range formed between any of the aforementioned values. The average or effective modulus of the optical film structures may also be controlled through layer stack design, material choice, and process control to lie in a range from 100-220 GPa, from 120-200 GPa, from 120-180 GPa, from 100-180 GPa, from 100-160 GPa, or from 140-200 GPa. Controlled combinations of film stress and modulus have been shown to advantageously lead to improved flexural strength of coated glasses and coated glass-ceramics (which may be thermally or chemically strengthened), as measured by ring-on-ring strength testing, and as further described in U.S. Pat. No. 11,927,722, incorporated herein by reference. The average or characteristic flexural strength values of the coated articles described herein, as measured by ring-on-ring testing, may be at least 400 MPa, at least 500 MPa, at least 600 MPa, at least 700 MPa, at least 750 MPa, at least 800 MPa, or any range formed from any two of the foregoing numbers, such as 400-800 MPa, 500-600 MPa, 500-700 MPa, and so forth.

When high compressive stress is created in either the inner or outer optical film structures of the present invention, it may be preferable to create both a similar average modulus and a similar average stress in both the inner and outer optical film structures. This balanced construction allows for the minimization or elimination of warpage of the article. The simplest balanced construction is one where the inner and outer optical film structures are identical or substantially identical, as in Example 7 described elsewhere herein. However, it should also be noted that the inner and outer optical film structures can be different, as long as the effective bending moments imparted by the inner and outer optical film structures are similar (the effective applied bending moment will be a function of average coating stress, average coating modulus, and coating thickness). In some aspects, the inner and outer optical film structures may have different optical properties, such as different reflectance values in air, while both inner and outer optical film structures have similar bending moments and high compressive stress values such as those described above. In aspects where the inner and outer optical film structures have high compressive stress and similar effective bending moments, the inner optical film structure may be designed to be optically impedance matched to an adhesive layer that is bonded to the inner optical film structure (i.e. designed to have low reflectance when bonded to an adhesive), while the outer optical film structure is designed to have low reflectance in air. In other cases, the inner and outer optical film structures having high compressive stress and similar bending moments may both be designed to have low reflectance in air, but the inner and outer optical film structures may comprise different thicknesses, different materials, different average modulus, or different average stress levels.

A theoretical explanation of intrinsic stress coatings is set forth below. Assume that the thickness of the A-side coating, comprised of $N_a$ layers, is $h_a$ and the thickness of the B-side coating, comprised of $N_b$ layers, is $h_b$, and the stress in individual layers of thickness $h_i$ of the coating may be given by $\sigma_i$. Then average stresses in the A-side and B-side coating $\sigma_a$ and $\sigma_b$ may be defined as:

$$\sigma_a = \frac{1}{h_a}\sum_{i=1}^{N_a}\sigma_i h_i$$

$$\sigma_b = \frac{1}{h_b}\sum_{i=1}^{N_b}\sigma_i h_i$$

Based on these average stresses, a moment caused by each of the coatings may be defined as $$M_a = \frac{\sigma_a h_a t}{2}$$

and $$M_b = \frac{\sigma_b h_b t}{2}$$

where t is the thickness of the substrate. The net moment is given by $M=M_a-M_b$ (assuming the average coating stresses on both the A-side and the B-side are compressive). Another useful value for comparison is the product of stress×thickness, defined here as ST, for the A-side ("$ST_a$") and the B-side ("$ST_b$") coatings. This simplifies the calculation for a two-side coated article with a single substrate, whose thickness t becomes a constant in this scenario. For example, the value of stress×thickness (ST) for a coating with a $100×10^6$ Pa (100 MPa) stress and a $500×10^9$ m (500 nm) thickness is 50 Pascal·meters (Pa·m). Desirable values of stress×thickness may be in a range from 20 Pa·m to 5000 Pa·m, as described elsewhere herein. The moment imbalance that may be caused by unequal moments $M_a$ and $M_b$ will lead to the substrate warping, where the out of plane displacement can be given by:

$$w = \frac{M}{2D(1+v)}(x^2 + y^2)$$

where D is the plate stiffness or flexural rigidity given by:

$$D = \frac{Et^3}{12(1-v^2)}$$

Assuming that the A-side coating stress has been optimized for some desired performance attributes (scratch, strength etc.), then the B-side average coating stress and thickness can be designed such that the net warp can either be controlled to some pre-determined amount or to be nominally flat (zero warp), which can be described by the following equation:

$$\sigma_b h_b = \sigma_a h_a - \frac{4wD(1+v)}{r\left(x^2 + y^2\right)}$$

If the net warp is desired to be zero (w=0), $\sigma_b h_b = \sigma_a h_a$. If a desired level of coating stress Ob on the B-side is needed to protect from overstress failures, or a maximum achievable level of stress on the B-side is known a-priori, then the thickness of the B-side can be designed such that the net warp after coating is zero, as defined by:

$$h_b = \frac{\sigma_a h_a}{\sigma_b}$$

For example, the table below shows the thickness of B-side coating needed (in μm) to achieve zero net warp for the case of a 2.5 μm thick A-side coating, with varying amounts of compressive stress in the range of 100-1000 MPa on the A-side and the B-side.

| | | Compressive stress in a 2.5 μm A-side coating | | | | | | | | | |
|---|---|---|---|---|---|---|---|---|---|---|---|
| | | 100 | 200 | 300 | 400 | 500 | 600 | 700 | 800 | 900 | 1000 |
| Compressive | 100 | 2.50 | 5.00 | 7.50 | 10.00 | 12.50 | 15.00 | 17.50 | 20.00 | 22.50 | 25.00 |
| stress in the | 200 | 1.25 | 2.50 | 3.75 | 5.00 | 6.25 | 7.50 | 8.75 | 10.00 | 11.25 | 12.50 |
| B-side | 300 | 0.83 | 1.67 | 2.50 | 3.33 | 4.17 | 5.00 | 5.83 | 6.67 | 7.50 | 8.33 |
| coating | 400 | 0.63 | 1.25 | 1.88 | 2.50 | 3.13 | 3.75 | 4.38 | 5.00 | 5.63 | 6.25 |
| | 500 | 0.50 | 1.00 | 1.50 | 2.00 | 2.50 | 3.00 | 3.50 | 4.00 | 4.50 | 5.00 |
| | 600 | 0.42 | 0.83 | 1.25 | 1.67 | 2.08 | 2.50 | 2.92 | 3.33 | 3.75 | 4.17 |
| | 700 | 0.36 | 0.71 | 1.07 | 1.43 | 1.79 | 2.14 | 2.50 | 2.86 | 3.21 | 3.57 |
| | 800 | 0.31 | 0.63 | 0.94 | 1.25 | 1.56 | 1.88 | 2.19 | 2.50 | 2.81 | 3.13 |
| | 900 | 0.28 | 0.56 | 0.83 | 1.11 | 1.39 | 1.67 | 1.94 | 2.22 | 2.50 | 2.78 |
| | 1000 | 0.25 | 0.50 | 0.75 | 1.00 | 1.25 | 1.50 | 1.75 | 2.00 | 2.25 | 2.50 |

In some aspects, the stress×thickness (ST in Pam) for a coating (e.g., outer optical coating, inner optical coating, or both) can be any suitable value. As discussed elsewhere herein, ST=σ×h, where σ is the average compressive stress of a coating, and h is the average thickness of the coating. For example, in some aspects, ST (Pa·m) for a coating can be at least 20, at least 50, at least 100, at least 200, at least 300, at least 400, at least 500, at least 600, at least 700, at least 800, at least 900, at least 1000, at least 1100, at least 1200, at least 1300, at least 1400, at least 1500, at least 1600, at least 1700, at least 1800, at least 1900, at least 2000, at least 2100, at least 2200, at least 2300, at least 2400, at least 2500, at least 2600, at least 2700, at least 2800, at least 2900, at least 3000, at least 3200, at least 3400, at least 3600, at least 3800, at least 4000, at least 4200, at least 4400, at least 4600, at least 4800, at least 5000, 5000 or less, 4800 or less, 4600 or less, 4400 or less, 4200 or less, 4000 or less, 3800 or less, 3600 or less, 3400 or less, 3200 or less, 3000 or less, 2900 or less, 2800 or less, 2700 or less, 2600 or less, 2500 or less, 2400 or less, 2300 or less, 2200 or less, 2100 or less, 2000 or less, 1900 or less, 1800 or less, 1700 or less, 1600 or less, 1500 or less, 1400 or less, 1300 or less, 1200 or less, 1100 or less, 1000 or less, 900 or less, 800 or less, 700 or less, 600 or less, 500 or less, 400 or less, 300 or less, 200 or less, 100 or less, 50 or less, 20 or less, or any range formed from any two of the foregoing endpoints. For example, in some aspects, the ST (Pa·m) of a coating can be 20-5000, 20-4600, 20-4000, 20-3400, 20-2000, 20-1500, 20-1200, 20-1000, 20-800, 20-400, 20-200, 20-50, 100-5000, 100-4000, 100-3000, 100-2800, 100-2200, 100-1800, 100-1500, 100-1300, 100-900, 100-400, 100-200, 200-5000, 200-4000, 200-2000, 200-1000, 200-500, 200-300, 500-5000, 500-3000, 500-1000, 500-800, 700-5000, 700-2000, 700-1000, 700-900, 900-5000, 900-3000, 900-1500, 1000-5000, 1000-4000, 1000-2000, 1000-1600, 1200-5000, 1200-3000, 1200-2000, 1500-5000, 1500-3000, 1500-2000, 2000-5000, 2000-4000, 2000-3000, 2000-2500, 3000-5000, 3000-4000, 3000-3500, or 4000-5000. In some aspects, ST of a coating can be, for example, 50 Pa·m to 3000 Pa·m, from 100 Pa·m to 3000 Pa·m, from 200 to 3000 Pa·m, from 300 to 3000 Pa·m, from 300 to 2500 Pa·m, from 500 to 2500 Pa·m, and from 1000 to 2500 Pa·m. The ST values herein can be in reference to an outer optical coating ($ST_a$), an inner optical coating ($ST_b$), or both.

In some aspects, an absolute value of a difference between $ST_a$ and $ST_b$, calculated as $|ST_a - ST_b|$, can be any suitable value. The absolute value $|ST_a - ST_b|$ is a measure of the stress difference between two coatings (e.g., between the A-side coating (also called outer optical coating), and the B-side coating (also called inner optical coating)). For example, in some aspects, the absolute value $|ST_a - ST_b|$ can be 0, greater than 0 (i.e., ">0"), at least 5, at least 10, at least 20, at least 30, at least 40, at least 50, at least 100, at least 150, at least 200, at least 250, at least 300, at least 350, at least 400, at least 450, at least 500, 500 or less, 450 or less, 400 or less, 350 or less, 300 or less, 250 or less, 200 or less, 150 or less, 100 or less, 50 or less, 40 or less, 30 or less, 20 or less, 10 or less, 5 or less, or any range formed from any two of the foregoing endpoints. For example, in some aspects, the absolute value $|ST_a - ST_b|$ can be 0-500, 0-450, 0-400, 0-350, 0-300, 0-250, 0-200, 0-150, 0-100, 0-50, 0-40, 0-30, 0-20, 0-10, 0-5, >0-500, >0-450, >0-400, >0-350, >0-300, >0-250, >0-200, >0-150, >0-100, >0-50, >0-40, >0-30, >0-20, >0-10, >0-5, 5-500, 5-450, 5-400, 5-350, 5-300, 5-250, 5-200, 5-150, 5-100, 5-50, 5-40, 5-30, 5-20, 5-10, 10-500, 10-450, 10-400, 10-350, 10-300, 10-250, 10-200, 10-150, 10-100, 10-50, 10-40, 10-30, 10-20, 20-500, 20-450, 20-400, 20-350, 20-300, 20-250, 20-200, 20-150, 20-100, 20-50, 20-40, 20-30, 30-500, 30-450, 30-400, 30-350, 30-300, 30-250, 30-200, 30-150, 30-100, 30-50, 30-40, 40-500, 40-450, 40-400, 40-350, 40-300, 40-250, 40-200, 40-150, 40-100, 40-50, 50-500, 50-450, 50-400, 50-350, 50-300, 50-250, 50-200, 50-150, 50-100, 100-500, 100-450, 100-400, 100-350, 100-300, 100-250, 100-200, 100-150, 150-500, 150-450, 150-400, 150-350, 150-300, 150-250, 150-200, 200-500, 200-450, 200-400, 200-350, 200-300, 200-250, 250-500, 250-450, 250-400, 250-350, 250-300, 300-500, 300-450, 300-400, 300-350, 350-500, 350-450, 350-400, 400-500, 400-450, or 450-500.

In some aspects, the average compressive stress σ of a coating (e.g., the A-side coating (also called outer optical coating), the B-side coating (also called inner optical coating), or both) can be any suitable value. The average compressive stress of the A-side coating is termed $\sigma_a$, and the average compressive stress of the B-side coating is termed $\sigma_a$. Such concepts are described in more detail elsewhere herein. In some aspects, the average compressive stress σ (MPa) of a coating can be at least 50, at least 100, at least 200, at least 300, at least 400, at least 500, at least 600, at least 800, at least 1000, at least 1200, at least 1400, at least 1600, at least 1800, at least 2000, 2000 or less, 1800 or less, 1600 or less, 1400 or less, 1200 or less, 1000 or less, 800 or less, 600 or less, 500 or less, 400 or less, 300 or less, 200 or less, 100 or less, 50 or less, or a range formed from any two of the foregoing values. For example, in some aspects, the average compressive stress σ (MPa) of a coating can be 50-2000, 50-1800, 50-1600, 50-1400, 50-1200, 50-1000, 50-800, 50-600, 50-500, 50-400, 50-300, 50-200, 50-100, 100-2000, 100-1800, 100-1600, 100-1400, 100-1200, 100-1000, 100-800, 100-600, 100-500, 100-400, 100-300, 100-200, 200-2000, 200-1800, 200-1600, 200-1400, 200-1200, 200-1000, 200-800, 200-600, 200-500, 200-400, 200-300, 300-2000, 300-1800, 300-1600, 300-1400, 300-1200, 300-1000, 300-800, 300-600, 300-500, 300-400, 400-2000, 400-1800, 400-1600, 400-1400, 400-1200, 400-1000, 400-800, 400-600, 400-500, 500-2000, 500-1800, 500-1600, 500-1400, 500-1200, 500-1000, 500-800, 500-600, 600-2000, 600-1800, 600-1600, 600-1400, 600-1200, 600-1000, 600-800, 800-2000, 800-1800, 800-1600, 800-1400, 800-1200, 800-1000, 1000-2000, 1000-1800, 1000-1600, 1000-1400, 1000-1200, 1200-2000, 1200-1800, 1200-1600, 1200-1400, 1400-2000, 1400-1800, 1400-1600, 1600-2000, 1600-1800, or 1800-2000. In some aspects, the cover glass article has any suitable ring-on-ring (ROR) strength as described elsewhere herein, and such ROR values can be combined with any average compressive stress values described herein. For example, in some aspects, the ROR strength is 600 MPa or greater, and the average compressive stress σ (e.g., $\sigma_a$, $\sigma_b$, or both) is at least 500 MPa.

In some aspects, an individual layer in the first plurality (i.e., outer optical coating or A-side coating), in the second plurality (i.e., inner optical coating or B-side coating), or both, can have any suitable thickness $h_i$. For example, in some aspects, a thickness $h_i$ (nm) of an individual layer can be at least 20, at least 40, at least 60, at least 80, at least 100, at least 200, at least 300, at least 400, at least 500, at least 600, at least 700, at least 800, at least 900, at least 1000, at least 1200, at least 1400, at least 1600, at least 1800, at least 2000, at least 2200, at least 2400, at least 2600, at least 2800, at least 3000, 3000 or less, 2800 or less, 2600 or less, 2400 or less, 2200 or less, 2000 or less, 1800 or less, 1600 or less, 1400 or less, 1200 or less, 1000 or less, 900 or less, 800 or less, 700 or less, 600 or less, 500 or less, 400 or less, 300 or less, 200 or less, 100 or less, 80 or less, 60 or less, 40 or less, 20 or less, or any range formed from any two of the foregoing endpoints. For example, in some aspects, a thickness $h_i$ (nm) of an individual layer can be 20-3000, 20-2400, 20-2000, 20-1600, 20-1200, 20-1000, 20-800, 20-500, 20-300, 20-200, 100-3000, 100-2200, 100-1800, 100-1400, 100-1000, 100-800, 100-400, 100-300, 200-3000, 200-2400, 200-2200, 200-1800, 200-1400, 200-1000, 200-800, 200-

400, 500-3000, 500-2400, 500-2200, 500-2000, 500-1800, 500-1400, 500-1200, 500-900, 800-3000, 800-2600, 800-2200, 800-1800, 800-1600, 800-1200, 1000-3000, 1000-2600, 1000-2200, 1000-2000, 1000-1600, 1000-1400, 1200-3000, 1200-2800, 1200-2200, 1200-2000, 1200-1600, 1600-3000, 1600-2600, 1600-2200, 1600-2000, 1800-3000, 1800-2600, 1800-2200, 2000-3000, 2000-2800, 2000-2600, 2000-2400, 2000-2200, 2200-3000, 2200-2800, 2200-2600, 2200-2400, 2400-3000, 2400-2800, 2400-2600, or 2600-3000.

In some aspects, the cover glass article has any suitable shape. For example, in some aspects, the cover glass article has a substantially planar, or substantially flat, shape. In some aspects, the cover glass article has such substantially planar (or substantially flat) shape, even when the outer optical film structure has a positive average compressive stress $\sigma_a$ (e.g., at least 100 MPa) and the inner optical film structure has a positive average compressive stress $\sigma_b$ (e.g., at least 100 MPa). Without wishing to be bound by theory, it is believed that engineering compressive stress into each side of the cover glass article strengthens the inner and outer optical coatings (e.g., providing a strengthened cover glass article), and if the magnitude of such stresses is generally balanced in terms of ST, then the cover glass article has a substantially planar shape.

In some aspects, the inner and outer optical film structures can be the same or different. For example, in some aspects, the inner optical film structure is the same as the outer optical film structure. In some aspects, the inner optical film structure is different than the outer optical film structure. In some aspects, whether the inner and outer optical film structures are the same or different, in some aspects the outer and inner optical film structures have stress×thickness values $ST_a$ and $ST_b$ that roughly balance (e.g., $|ST_a-ST_b|$ is less than or equal to 500 Pa·m or any other value described elsewhere herein).

In some aspects, cover glass article having outer and inner optical film structures with positive average compressive stress values that roughly balance (e.g., $|ST_a-ST_b|$ is less than or equal to 500 Pa·m or any other value described elsewhere herein) can be made of any suitable materials and have any suitable structure. In some aspects, at least a portion of the high refractive index layers of the first and second pluralities independently is $SiAl_xO_yN_z$, $Ta_2O_5$, $Nb_2O_5$, $AlN$, $AlN_x$, $SiAl_xN_y$, $AlN_x/SiAl_xN_y$, $Si_3N_4$, $AlO_xN_y$, $SiO_xN_y$, $SiN_x$, $SiN_x:H_y$, $HfO_2$, $TiO_2$, $ZrO_2$, $Y_2O_3$, $Al_2O_3$, $MoO_3$, diamond-like carbon, or any combination thereof. In some aspects, at least a portion of the low refractive index layers of the first and second pluralities independently is $SiO_2$, doped $SiO_2$, $Al_2O_3$, $SiAl_xO_y$, $GeO_2$, $SiO$, $AlO_xN_y$, $SiO_xN_y$, $SiAl_xO_yN_z$, $MgO$, $MgAl_xO_y$, $MgF_2$, $BaF_2$, $CaF_2$, $DyF_3$, $YbF_3$, $YF_3$, $CeF_3$, or any combination thereof. In some aspects, at least a portion of the high refractive index layers in the first and second pluralities comprise $SiN_x$, $SiO_xN_y$, or any combination thereof, and wherein at least a portion of the low refractive index layers in the first and second pluralities comprise $SiO_2$, $TiO_2$, $Nb_2O_5$, $MgF_2$, or any combination thereof. In some aspects, at least a portion of the high refractive index layers in the first and second pluralities comprise $SiN_x$, and at least a portion of the low refractive index layers in the first and second pluralities comprise $SiO_2$.

In some aspects, disclosed is a method for making a cover glass article having outer and inner optical film structures with positive average compressive stress values that roughly balance (e.g., $|ST_a-ST_b|$ is less than or equal to 500 Pa·m or any other value described elsewhere herein). Any suitable method can be employed to make such cover glass articles, including any method disclosed elsewhere herein for making cover glass articles (e.g., vacuum deposition, liquid-based deposition, or a combination thereof, as well as all variations thereof, such as chemical vapor deposition, physical vapor deposition, thermal evaporation, e-beam evaporation, atomic layer deposition, reactive sputtering, metal-mode reactive sputtering, thermal evaporation, e-beam evaporation, ion-beam enhanced evaporation, plasma-enhanced chemical vapor deposition (PECVD), spraying, dipping, spin coating, slot coating, or any combination thereof). For example, in some aspects, the method comprises a first disposing step, comprising disposing an outer optical film structure on the outer primary surface, such that the outer optical film structure has a stress×thickness value $ST_a$ of at least 100 Pa·m (e.g., or any other vale disclosed elsewhere herein), In some aspects, the method comprises a second disposing step, comprising disposing an inner optical film structure on the inner primary surface, such that the inner optical film structure has a stress×thickness value $ST_b$ of at least 100 Pa·m (e.g., or any other vale disclosed elsewhere herein). In some aspects, the $ST_a$ and $ST_b$ values result from at least one of (1) thermal mismatch between any two layers of the first and second pluralities, (2) thermal mismatch between the at least one substrate and any layer of the first and secondary pluralities, (3) an intrinsic characteristic of the first or second disposing step, or (4) any combination thereof.

In one or more aspects, each of the scratch-resistant layers 150a. 150b independently may comprise a compositional gradient. For example, each of scratch-resistant layers 150a, 150b independently may include a compositional gradient of $Si_uAl_vO_xN_y$, where the concentration of any one or more of Si, Al, O and N are varied to increase or decrease the refractive index. The refractive index gradient may also be formed using porosity. Such gradients are more fully described in U.S. Patent Application Publication No. 2014/0334006A1, published on Nov. 13, 2014, entitled "Scratch-Resistant Articles with a Gradient Layer", which is hereby incorporated by reference in its entirety. Additional compositional and/or refractive index gradients are also described in U.S. Pat. No. 11,242,280, titled "Coated articles with optical coatings having residual compressive stress," which is hereby incorporated by reference in its entirety. In some aspects, one or more layers having a compositional and/or refractive index gradient may be used in place of one or more low RI layers 130A and/or high RI layers 130B.

Each of the scratch-resistant layers 150a, 150b, as shown in exemplary form in the cover article 100 depicted in FIGS. 1A and 1B, independently may be relatively thick as compared with other layers (e.g., low RI layers 130A, high RI layers 130B, capping layer 131, etc.) such as greater than or equal to about 50 nm, 75 nm, 100 nm, 150 nm, 200 nm, 250 nm, 300 nm, 325 nm, 350 nm, 375 nm, 400 nm, 425 nm, 450 nm, 475 nm, 500 nm, 525 nm, 550 nm, 575 nm, 600 nm, 700 nm, 800 nm, 900 nm, 1 micron, 2 microns, 3 microns, 4 microns, 5 microns, 6 microns, 7 microns, or even 8 microns. For example, a scratch-resistant layer 150a, 150b may have a thickness from about 50 nm to about 10 microns, from about 100 nm to about 10 microns, from about 150 nm to about 10 microns, and all thickness levels and ranges between the foregoing ranges.

As shown in FIGS. 1A, 1B, and 1C, and outlined elsewhere herein, the cover glass articles 100 of the disclosure include at least one of an outer optical film structure 130a and an inner optical film structure 130b. Each of the optical film structures 130a, 130b, if present, includes a plurality of alternating low and high refractive index (RI) layers, 130A and 130B, respectively. In some aspects, each of the optical film structures 130a and 130b, if present, includes a period 132 of two or more layers, such as the low RI layer 130A and high RI layer 130B. Further, each of the optical film structures 130a and 130b, if present, independently may include one period 132, or may include a plurality of two or more periods 132, such as 2 to 50 periods, 3 to 40 periods, 5 to 25 periods, 2 to 35 periods, and any and all periods within the foregoing and/or following ranges. In some aspects, the one period 132, or the plurality of periods 132, can be any of the following number of periods: 1-50, 1-48, 1-46, 1-44, 1-42, 1-40, 1-38, 1-36, 1-34, 1-32, 1-30, 1-30, 1-30, 1-28, 1-26, 1-24, 1-22, 1-20, 1-18, 1-16, 1-14, 1-12, 1-10, 1-8, 1-6, 1-4, 1-2, 2-50, 2-48, 2-46, 2-44, 2-42, 2-40, 2-38, 2-36, 2-34, 2-32, 2-30, 2-28, 2-26, 2-24, 2-22, 2-20, 2-18, 2-16, 2-14, 2-12, 2-10, 2-8, 2-6, 2-4, 3-50, 3-48, 3-46, 3-44, 3-42, 3-40, 3-38, 3-36, 3-34, 3-32, 3-30, 3-28, 3-26, 3-24, 3-22, 3-20, 3-18, 3-16, 3-14, 3-12, 3-10, 3-8, 3-6, 3-4, 4-50, 4-48, 4-46, 4-44, 4-42, 4-40, 4-38, 4-36, 4-34, 4-32, 4-30, 4-28, 4-26, 4-24, 4-22, 4-20, 4-18, 4-16, 4-14, 4-12, 4-10, 4-8, 4-6, 6-50, 6-48, 6-46, 6-44, 6-42, 6-40, 6-38, 6-36, 6-34, 6-32, 6-30, 6-28, 6-26, 6-24, 6-22, 6-20, 6-18, 6-16, 6-14, 6-12, 6-10, 6-8, 8-50, 8-48, 8-46, 8-44, 8-42, 8-40, 8-38, 8-36, 8-34, 8-32, 8-30, 8-28, 8-26, 8-24, 8-22, 8-20, 8-18, 8-16, 8-14, 8-12, 8-10, 8-50, 8-48, 8-46, 8-44, 8-42, 8-40, 8-38, 8-36, 8-34, 8-32, 10-50, 10-48, 10-46, 10-44, 10-42, 10-40, 10-38, 10-36, 10-34, 10-32, 10-30, 10-28, 10-26, 10-24, 10-22, 10-20, 10-18, 10-16, 10-14, 10-12, 12-50, 12-48, 12-46, 12-44, 12-42, 12-40, 12-38, 12-36, 12-34, 12-32, 12-30, 12-28, 12-26, 12-24, 12-22, 12-20, 12-18, 12-16, 12-14, 14-50, 14-48, 14-46, 14-44, 14-42, 14-40, 14-38, 14-36, 14-34, 14-32, 14-30, 14-28, 14-26, 14-24, 14-22, 14-20, 14-18, 14-16, 16-50, 16-48, 16-46, 16-44, 16-42, 16-40, 16-38, 16-36, 16-34, 16-32, 16-30, 16-28, 16-26, 16-24, 16-22, 16-20, 16-18, 18-50, 18-48, 18-46, 18-44, 18-42, 18-40, 18-38, 18-36, 18-34, 18-32, 18-30, 18-28, 18-26, 18-24, 18-22, 18-20, 20-50, 20-48, 20-46, 20-44, 20-42, 20-40, 20-38, 20-36, 20-34, 20-32, 20-30, 20-28, 20-26, 20-24, 20-22, 22-50, 22-48, 22-46, 22-44, 22-42, 22-40, 22-38, 22-36, 22-34, 22-32, 22-30, 22-28, 22-26, 22-24, 24-50, 24-48, 24-46, 24-44, 24-42, 24-40, 24-38, 24-36, 24-34, 24-32, 24-30, 24-28, 24-26, 26-50, 26-48, 26-46, 26-44, 26-42, 26-40, 26-38, 26-36, 26-34, 26-32, 26-30, 26-28, 28-50, 28-48, 28-46, 28-44, 28-42, 28-40, 28-38, 28-36, 28-34, 28-32, 28-30, 30-50, 30-45, 30-40, 30-35, 35-50, 35-45, 35-40, 40-50, 40-45, or 45-50. In addition, the number of periods 132 and/or the number of layers of the optical film structures 130a and 130b can differ. Further, in some preferred implementations, the number of periods 132 in each of the optical film structures 130a and 130b, if present, can be configured such that each of the structures 130a and 130b includes at least five layers, e.g., alternating low and high RI layers 130A and 130B totaling at least five layers (e.g., two periods 132 and an additional capping layer 131, low RI layer 130A, or high RI layer 130B). In some aspects, the period 132 can be a single period with three layers such as a low RI layer 130A, a medium RI layer (not shown in FIG. 1A, 1B, or 1C), and a high RI layer 130B, with the medium RI layer having a refractive index between the low RI layer 130A and the high RI layer 130B. In some aspects, any of the number of periods can be combined with one or more additional layers (e.g., one or more capping layer 131, low RI layer 130A, high RI layer 130B, or any combination thereof). In some aspects, the number of layers (e.g., one or more of low RI layer and high RI layer) in a period is at least 2, at least 3, at least 4, at least 5, at least 6, 2, 3, 4, 5, 6, 2-6, 2-5, 2-4, 2-3, 3-6, 3-5, 3-4, 4-6, 4-5, or 5-6.

In some aspects, the inner and/or outer optical film structures can have any suitable arrangement of high index ("H") and low index ("L") layers. In some aspects, the inner and/or outer optical film structures have a strict alternating arrangement such as $[H/L]_x$ without any intervening layers or abutting layers of the same RI (e.g., L/L, H/H, or both), in which x is a period having any of the values or ranges disclosed herein for the plurality of periods. In some aspects, the inner and/or outer optical film structures have an alternating arrangement such as $[H/L]_x$, but in which one or more intervening layers (such as an organic layer) are present at one or more positions in the optical film structure, or in which one or more abutting layers of the same RI (e.g., L/L, H/H, or both)) are present at one or more positions in the optical film structure.

In some aspects, at least one of the first and second pluralities (in the outer and inner optical film structures, respectively) has a sum total of the high refractive index and low refractive index layers of at least 5, at least 6, at least 7, at least 8, at least 9, at least 10, at least 12, at least 14, at least 16, at least 18, at least 20, at least 22, at least 24, at least 26, at least 28, at least 30, at least 35, at least 40, at least 45, at least 50, at least 55, at least 60, at least 65, at least 70, at least 75, at least 80, at least 85, at least 90, at least 95, or at least 100 layers (e.g., alternatively or additionally less than 200 layers, less than 175 layers, less than 150 layers, less than 125 layers, or less than 100 layers). In some aspects, at least one of the first and second pluralities has a sum total of the high refractive index and low refractive index layers of 5-110, 5-100, 5-95, 5-90, 5-85, 5-80, 5-75, 5-70, 5-65, 5-60, 5-55, 5-50, 5-45, 5-40, 5-35, 5-30, 5-25, 5-20, 5-15, 5-10, 10-110, 10-100, 10-95, 10-90, 10-85, 10-80, 10-75, 10-70, 10-65, 10-60, 10-55, 10-50, 10-45, 10-40, 10-35, 10-30, 10-25, 10-20, 10-15, 15-110, 15-100, 15-95, 15-90, 15-85, 15-80, 15-75, 15-0, 15-65, 15-60, 15-55, 15-50, 15-45, 15-40, 15-35, 15-30, 15-25, 15-20, 20-110, 20-100, 20-95, 20-90, 20-85, 20-80, 20-75, 20-70, 20-65, 20-60, 20-55, 20-50, 20-45, 20-40, 20-35, 20-30, 20-25, 25-110, 25-100, 25-95, 25-90, 25-85, 25-80, 25-75, 25-70, 25-65, 25-60, 25-55, 25-50, 25-45, 25-40, 25-35, 25-30, 30-110, 30-100, 30-95, 30-90, 30-85, 30-80, 30-75, 30-70, 30-65, 30-60, 30-55, 30-50, 30-45, 30-40, 30-35, 35-110, 35-100, 35-95, 35-90, 35-85, 35-80, 35-75, 35-70, 35-65, 35-60, 35-55, 35-50, 35-45, 35-40, 40-110, 40-100, 40-95, 40-90, 40-85, 40-80, 40-75, 40-70, 40-65, 40-60, 40-55, 40-50, 40-45, 45-110, 45-100, 45-95, 45-90, 45-85, 45-80, 45-75, 45-70, 45-65, 45-60, 45-55, 45-50, 50-110, 50-100, 50-95, 50-90, 50-85, 50-80, 50-75, 50-70, 50-65, 50-60, 50-55, 55-110, 55-100, 55-95, 55-90, 55-85, 55-80, 55-75, 55-70, 55-65, 55-60, 60-110, 60-100, 60-95, 60-90, 60-85, 60-80, 60-75, 60-70, 60-65, 65-110, 65-100, 65-95, 65-90, 65-85, 65-80, 65-75, 65-70, 70-110, 70-100, 70-95, 70-90, 70-85, 70-80, 70-75, 75-110, 75-100, 75-95, 75-90, 75-85, 75-80, 80-110, 80-100, 80-95, 80-90, 80-85, 85-110, 85-100, 85-95, 85-90, 90-110, 90-100, 90-95, 95-110, 95-100, or 100-110 layers. In some aspects, both the outer optical film structure (with first plurality) and inner optical film structure (with second plurality) are present and have a different number of layers.

In some aspects of the cover glass articles 100 depicted in FIGS. 1A, 1B, and 1C, the outer optical film structure 130a includes a first plurality of alternating high index and low index layers, 130B and 130A, respectively, with the outermost low index layer 130A exposed (e.g., to the air). In some aspects, the outermost low index layer is a capping layer 131, which serves as the outermost layer of the outer optical film structure 130a with the same composition and refractive index range of a low RI layer 130A. According to some aspects, the outermost layer 130A/131 of the outer optical film structure 130a may not be exposed but instead have a top coating 140 disposed thereon (see FIGS. 1A and 1B). In some implementations, each high RI layer 130B of the outer optical film structure 130a comprises a nitride (e.g., $SiN_x$) or an oxynitride (e.g., $SiO_xN_y$). In some aspects (as shown in exemplary form in FIGS. 1A, 1B, and 1C), the first plurality of alternating high index and low index layers, 130B and 130A, respectively, further includes a low index layer 130A in contact with the outer primary surface 112 (or 112a) of the substrate 110 (or 110a); however, in some aspects it may be desirable to include a high index layer 130B in contact with the outer primary surface 112 of substrate 110. In addition, some aspects of the cover glass article 100 can be configured such that the first plurality of alternating high and low index layers further includes a first scratch-resistant layer 150a with the same composition as a high RI layer 130B and a physical thickness of at least 50 nm.

According to some aspects of the cover glass articles 100 depicted in FIGS. 1A, 1B, and 1C, the inner optical film structure 130b, if present, includes a second plurality of alternating high index and low index layers, 130B and 130A, respectively. Further, the second plurality includes a low index layer 130A or a high index layer 130B disposed on the inner primary surface 114 (or 114b) of the substrate 110 (or 110b) and an innermost (i.e., toward the bottom of the article 100 depicted in FIGS. 1A, 1B, and 1C) low index layer 130A or high index layer 130B. In some instances, the innermost low index layer 130A or high index layer 130B is exposed (e.g., to air or gas, such as nitrogen and/or argon). According to some aspects, the innermost layer 130A or 130B of the second plurality of the inner optical film structure 130b can serve as an innermost capping layer 131, which serves as the innermost layer of the inner optical film structure 130b with the same composition and refractive index range of a low RI layer 130A or a high RI layer 130B (see FIGS. 1A, 1B, and 1C). In some aspects, the innermost layer can be an easy-to-clean coating. In some aspects, the outermost layer can be an easy-to-clean coating. In some implementations, each high RI layer 130B of the inner optical film structure 130b comprises an oxide (e.g., $Nb_2O_5$ or $TiO_2$) or a nitride (e.g., $SiN_x$). In another implementation, the second plurality of alternating high index and low index layers, 130B and 130A, respectively, further includes a low index layer 130A (as shown in exemplary form in FIGS. 1A and 1C) or a high index layer 130B (as shown in exemplary form in FIG. 1B) in contact with the inner primary surface 114 (or 114b) of the substrate 110 (or 110b). In addition, aspects of the cover glass article 100 can be configured such that the second plurality of alternating high and low index layers 130B and 130A further includes a second scratch-resistant layer 150b with the same composition as a high RI layer 130B and a physical thickness of at least 50 nm.

In one or more aspects of the cover glass article 100 depicted in FIGS. 1A, 1B, and 1C, the term "low RI", when used with the low RI layers 130A and/or capping layer 131, includes a range from about 1.3 to about 1.75, such as 1.3-1.75, 1.3-1.7, 1.3-1.65, 1.3-1.6, 1.3-1.55, 1.3-1.5, 1.3-1.45, 1.3-1.4, 1.3-1.35, 1.35-1.75, 1.35-1.7, 1.35-1.65, 1.35-1.5, 1.35-1.55, 1.35-1.5, 1.35-1.45, 1.35-1.4, 1.4-1.75, 1.4-1.7, 1.4-1.65, 1.4-1.6, 1.4-1.55, 1.4-1.5, 1.4-1.45, 1.45-1.75, 1.45-1.7, 1.45-1.65, 1.45-1.6, 1.45-1.55, 1.45-1.5, 1.5-1.75, 1.5-1.7, 1.5-1.65, 1.5-1.6, 1.5-1.55, 1.55-1.75, 1.55-1.7, 1.55-1.65, 1.55-1.6, 1.6-1.75, 1.6-1.7, 1.6-1.65, 1.65-1.75, 1.65-1.7, or 1.7-1.75. In some aspects, the low RI includes a range of less than 1.75, less than 1.7, less than 1.65, less than 1.6, less than 1.55, less than 1.45, less than 1.4, or less than 1.35. In one or more aspects, the term "high RI", when used with the high RI layers 130B and/or scratch-resistant layers 150a, 150b, includes a range from about 1.7 to about 2.6, such as 1.7-2.6, 1.7-2.5, 1.7-2.4, 1.7-2.3, 1.7-2.2, 1.7-2.1, 1.7-2, 1.7-1.8, 1.8-2.6, 1.8-2.5, 1.8-2.4, 1.8-2.3, 1.8-2.2, 1.8-2.1, 1.8-2, 1.8-1.9, 1.9-2.6, 1.9-2.5, 1.9-2.4, 1.9-2.3, 1.9-2.2, 1.9-2.1, 1.9-2, 2-2.6, 2-2.5, 2-2.4, 2-2.3, 2-2.2, 2-2.1, 2.1-2.6, 2.1-2.5, 2.1-2.4, 2.1-2.3, 2.1-2.2, 2.2-2.6, 2.2-2.5, 2.2-2.4, 2.2-2.3, 2.3-2.6, 2.3-2.5, 2.3-2.4, 2.4-2.6, 2.4-2.5, or 2.5-2.6. In some aspects, the high RI includes a range of at least 1.7, at least 1.8, at least 1.9, at least 2, at least 2.1, at least 2.2, at least 2.3, at least 2.4, at least 2.5 or at least 2.6. In one or more aspects, the term "medium RI", when used with a third layer of a period 132, includes a range from about 1.55 to about 1.8, such as 1.55-1.8, 1.55-1.75, 1.55-1.7, 1.55-1.65, 1.55-1.6, 1.6-1.8, 1.6-1.75, 1.6-1.7, 1.6-1.65, 1.65-1.8, 1.65-1.75, 1.65-1.7, 1.7-1.8, 1.7-1.75, or 1.75-1.8. In some aspects, the ranges for low RI, high RI, and/or medium RI may overlap; however, in most instances, the layers of each of the outer and inner optical film structures 130a and 130b have the general relationship regarding RI of: low RI<medium RI<high RI (where "medium RI" is applicable in the case of a three layer period). In one or more aspects, the difference in the refractive index of each of the low RI layers 130A (and/or capping layer 131) and the high RI layers 130B (and/or scratch-resistant layers 150a, 150b) may be at least 0.01, at least 0.05, at least 0.1, at least 0.2, at least 0.3, at least 0.4, at least 0.5, at least 0.6, at least 0.7, at least 0.8, at least 0.9, or at least 1; alternatively, or additionally, the difference may be 1.1 or less, 1 or less, 0.9 or less, 0.8 or less, 0.7 or less, 0.6 or less, 0.5 or less, 0.4 or less, 0.3 or less, 0.2 or less, 0.1 or less, or 0.05 or less; or any range formed from any two of the foregoing open-ended ranges.

As an example, in FIGS. 1A, 1B, and 1C the period 132 of the outer and/or inner optical film structures 130a, 130b each may independently include a low RI layer 130A and a high RI layer 130B. When a plurality of periods is included in either or both of the outer and inner optical film structures 130a and 130b, the low RI layers 130A (designated as "L") and the high RI layers 130B (designated as "H") can alternate in the following sequence of layers: L/H/L/H . . . or H/L/H/L . . . , such that the low RI layers 130A and the high RI layers 130B alternate along the physical thickness of the optical film structures 130a, 130b. In the aspect depicted in FIG. 1A, the outer optical film structure 130a includes three periods 132 with a capping layer 131, where each period 132 includes a low RI layer 130A and a high RI layer 130B. Also in the aspect depicted in FIG. 1A, the inner optical film structure 130b includes five periods 132 with a capping layer 131, where each period 132 includes a low RI layer 130A and a high RI layer 130B. In the aspect depicted in FIG. 1B, the outer optical film structure 130a includes three periods 132 with a capping layer 131, where each period 132 includes a low RI layer 130A and a high RI layer 130B. Also in the aspect depicted in FIG. 1B, the inner optical film structure 130b includes six periods 132 and an additional high RI layer 130B as the innermost layer, where each period 132 includes a high RI layer 130B and a low RI layer 130A. In the aspect depicted in FIG. 1C, the outer optical film structure 130a includes two periods 132 with a capping layer 131, where each period 132 includes a low RI layer 130A and a high RI layer 130B. Also in the aspect depicted in FIG. 1C, the inner optical film structure 130b includes three periods 132 with a high RI layer 130B as the innermost layer, where each period 132 includes a high RI layer 130B and a low RI layer 130A. In some aspects, as noted elsewhere herein, each of the optical film structures 130a, 130b may include up to 30 periods 132, perhaps with one or more additional layers (e.g., a capping and/or intervening layer).

Example materials suitable for use in the outer and/or inner optical film structures 130a and 130b of the cover glass article 100 depicted in FIGS. 1A, 1B, and 1C independently include, without limitation, $SiO_2$, doped $SiO_2$, $Al_2O_3$, $SiAl_xO_y$, $GeO_2$, $SiO$, $AlO_xN_y$, $AlN$, $AlN_x$, $SiAl_xN_y$, $SiN_x$, $SiO_xN_y$, $SiAl_xO_yN_z$, $Ta_2O_5$, $Nb_2O_5$, $TiO_2$, $ZrO_2$, $TiN$, $MgO$, $MgF_2$, $BaF_2$, $CaF_2$, $SnO_2$, $HfO_2$, $Y_2O_3$, $MoO_3$, $DyF_3$, $YbF_3$, $YF_3$, $CeF_3$, diamond-like carbon, or any combination thereof. Some examples of suitable materials for use in a low RI layer 130A include, without limitation, $SiO_2$, doped $SiO_2$, $Al_2O_3$, $SiAl_xO_y$, $GeO_2$, $SiO$, $AlO_xN_y$, $SiO_xN_y$, $SiAl_xO_yN_z$, $MgO$, $MgAl_xO_y$, $MgF_2$, $BaF_2$, $CaF_2$, $DyF_3$, $YbF_3$, $YF_3$, or $CeF_3$. In some implementations of the cover glass article 100, each of its low RI layers 130A includes $SiO_2$ or $MgF_2$. In some aspects, the nitrogen content of the materials for use in a low RI layer 130A may be minimized (e.g., in materials such as $Al_2O_3$ and $MgAl_xO_y$). Some examples of suitable materials for use in a high RI layer 130B include, without limitation, $SiAl_xO_yN_z$, $Ta_2O_5$, $Nb_2O_5$, $AlN$, $AlN_x$, $SiAl_xN_y$, $AlN/SiAl_xN_y$, $Si_3N_4$, $AlO_xN_y$, $SiO_xN_y$, $SiN_x$, $SiN_x{:}H_y$, $HfO_2$, $TiO_2$, $ZrO_2$, $Y_2O_3$, $Al_2O_3$, $MoO_3$, or diamond-like carbon. According to some implementations, each high RI layer 130B of the outer film structure 130a of the cover article 100 includes $SiN_x$, $SiO_xN_y$, $AlN_x$, $SiAl_xN_y$, or $SiAl_xO_yN_z$. In further implementations, one or more of the high RI layers 130B may be a super-lattice of nano-layered $AlN_x/SiAl_xN_y$. Further, some aspects of the cover article 100 are configured such that the inner optical film structure 130b includes $SiN_x$, $Nb_2O_5$, $Ta_2O_5$, $TiO_2$, $Al_2O_3$, or any combination thereof. In one or more aspects, the high RI layer 130B may have high hardness (e.g., hardness of greater than 8 GPa), and the high RI materials listed above may comprise high hardness and/or scratch resistance.

Suitable oxides for any high or low RI layer herein include, for example, $SiO_2$, $SiO$, $GeO_2$, $TiO_2$, $Ta_2O_5$, $Nb_2O_5$, $Al_2O_3$, $HfO_2$, $ZrO_2$, $Y_2O_3$, $MoO_3$, $SnO_2$, $MgO$, $MgAl_xO_y$, any combination thereof, or any other oxide disclosed herein. Suitable nitrides for any high or low RI layer herein include, for example, $AlN$, $AlN_x$, $SiAl_xN_y$, $AlN_x/SiAl_xN_y$, $Si_3N_4$, $SiN_x$, $SiN_x{:}H_y$, any combination thereof, or any other nitride disclosed herein. Suitable oxynitrides for any high or low RI layer herein include, for example, $AlO_xN_y$, $SiO_xN_y$, $Si_wAl_xO_yN_z$, $SiAl_xO_yN_z$, $TiO_xN_y$, any combination thereof, or any other oxynitrides disclosed herein. Suitable metal fluorides for any high or low RI layer herein include, for example, $MgF_2$, $BaF_2$, $CaF_2$, $DyF_3$, $YbF_3$, $YF_3$, $CeF_3$, any combination thereof, or any other metal fluoride disclosed herein.

In some aspects, the oxygen content of the materials for the high RI layer 130B may be minimized, especially in $SiN_x$ or $AlN_x$ materials. $AlO_xN_y$ materials may be considered to be oxygen-doped $AlN_x$ (i.e., they may have an $AlN_x$ crystal structure (e.g., wurtzite) and need not have an AlON crystal structure). Exemplary $AlO_xN_y$ or $SiO_xN_y$ high RI materials may comprise from about 0 atom % to about 20 atom % oxygen, or from about 5 atom % to about 15 atom % oxygen, while including 30 atom % to about 50 atom % nitrogen. Exemplary $SiAl_xO_yN_z$ high RI materials may comprise from about 10 atom % to about 30 atom % or from about 15 atom % to about 25 atom % silicon, from about 20 atom % to about 40 atom % or from about 25 atom % to about 35 atom % aluminum, from about 0 atom % to about 20 atom % or from about 1 atom % to about 20 atom % oxygen, and from about 30 atom % to about 50 atom % nitrogen. The foregoing materials may be hydrogenated up to about 30% by weight. Where a material having a medium refractive index is desired as a medium RI layer, some aspects may utilize AlN and/or $SiO_xN_y$. It should be understood that a first or second scratch-resistant layer 150a, 150b may comprise any of the materials disclosed as suitable for use in a high RI layer 130B.

In some aspects of the cover glass articles 100 depicted in FIGS. 1A, 1B, and 1C, outer and/or inner optical film structures 130a, 130b that primarily comprise combinations of $TiO_2$, $SiO_2$, $Nb_2O_5$, $MgF_2$, $Si_3N_4$, $SiN_x$, $SiO_xN_y$, or any combination thereof are advantageous for some applications due to their combination of high hardness, optical transparency, and chemical and environmental durability. In some aspects, the outer optical film structure is present and at least a portion of the first plurality is $SiO_2$, $SiN_x$, $SiO_xN_y$, or any combination thereof. In some aspects, the inner optical film structure is present and at least a portion of the second plurality is $SiO_2$, $TiO_2$, $Nb_2O_5$, $MgF_2$, or any combination thereof.

In one or more aspects of the cover article 100, such as depicted in FIGS. 1A and 1B, the outer and/or inner optical film structure 130a. 130b may include a scratch-resistant layer 150a, 150b that is integrated as a high RI layer 130B, and one or more low RI layers 130A, high RI layers 130B, and/or a capping layer 131 may be positioned over the scratch-resistant layer 150a, 150b. Also, with regard to the first scratch-resistant layer 150a, as shown in FIGS. 1A and 1B, an optional top coating 140 may also be positioned over the layer 150a. The scratch-resistant layer 150a, 150b may be alternately defined as the thickest high RI layer 130B in the overall outer and/or inner optical film structure 130a, 130b or in the overall cover glass article 100, Without being bound by theory, it is believed that the cover glass article 100 may exhibit increased hardness at indentation depths when a relatively thin amount of material is deposited over the scratch-resistant layer 150a, 150b. However, the inclusion of low RI and/or high RI layers 130A, 130B over the scratch-resistant layer 150a, 150b may enhance the optical properties of the cover glass article 100, In some aspects, relatively few layers (e.g., only 1, 2, 3, 4, or 5 layers) may be positioned over the scratch-resistant layer 150a, 150b and these layers may each be relatively thin (e.g., less than 100 nm, less than 75 nm, less than 50 nm, or even less than 25 nm).

In one or more aspects, the cover article 100 depicted in FIGS. 1A and 1B (and FIG. 1C though not depicted therein) may include one or more additional top coatings 140 disposed on the outer optical film structure 130a. In one or more aspects, the additional top coating 140 may include an easy-to-clean coating. An example of a suitable an easy-to-clean coating is described in U.S. Application Publication No. 2014/0113083, published on Apr. 24, 2014, entitled "Process for Making of Glass Articles with Optical and Easy-to-Clean Coatings", which is incorporated herein in its entirety by reference. The easy-to-clean coating may have a thickness in the range from about 5 nm to about 50 nm and may include known materials such as fluorinated silanes. The easy-to-clean coating may alternately or additionally comprise a low-friction coating or surface treatment. Exemplary low-friction coating materials may include diamond-like carbon, silanes (e.g., fluorosilanes), phosphonates, alkenes, alkynes, or any combination thereof. In some aspects, the easy-to-clean coating of the top coating 140 may have a thickness in the range from about 1 nm to about 40 nm, from about 1 nm to about 30 nm, from about 1 nm to about 25 nm, from about 1 nm to about 20 nm, from about 1 nm to about 15 nm, from about 1 nm to about 10 nm, from about 5 nm to about 50 nm, from about 10 nm to about 50 nm, from about 15 nm to about 50 nm, from about 7 nm to about 20 nm, from about 7 nm to about 15 nm, from about 7 nm to about 12 nm, from about 7 nm to about 10 nm, from about 1 nm to about 90 nm, from about 5 nm to about 90 nm, from about 10 nm to about 90 nm, or from about 5 nm to about 100 nm, and all ranges and sub-ranges therebetween.

The top coating 140 may include a scratch-resistant layer or layers 150a, 150b which comprise any of the materials disclosed as being suitable for use in the scratch-resistant layer 150a and/or 150b. In some aspects, the additional top coating 140 includes a combination of easy-to-clean material and scratch-resistant material. In one example, the combination includes an easy-to-clean material and diamond-like carbon. Such an additional top coating 140 may have a thickness in the range from about 5 nm to about 20 nm. The constituents of the additional coating 140 may be provided in separate layers. For example, the diamond-like carbon may be disposed as a first layer and the easy-to clean material can be disposed as a second layer on the first layer of diamond-like carbon. The thicknesses of the first layer and the second layer may be in the ranges provided above for the additional coating. For example, the first layer of diamond-like carbon may have a thickness of about 1 nm to about 20 nm or from about 4 nm to about 15 nm (or more specifically about 10 nm) and the second layer of easy-to-clean material may have a thickness of about 1 nm to about 10 nm (or more specifically about 6 nm). The diamond-like coating may include tetrahedral amorphous carbon (Ta—C), Ta—C:H, and/or a-C—H.

In some aspects, the outer optical film structure comprises an outermost low refractive index layer. In some aspects, the outer optical film structure comprises an outermost high refractive index layer. In some aspects, the outer optical film structure further comprising an easy-to-clean coating disposed on the outermost refractive index layer. In some aspects, the innermost RI layer of the outer optical film structure comprises an innermost high refractive index layer, optionally in direct contact with the at least one substrate or optionally with an organic layer disposed between the innermost RI layer of the outer optical film structure and at least one substrate. In some aspects, the innermost RI layer of the outer optical film structure comprises an innermost low refractive index layer, optionally in direct contact with the at least one substrate or optionally with an organic layer disposed between the innermost RI layer of the outer optical film structure and at least one substrate.

In some aspects, the inner optical film structure comprises an innermost low refractive index layer. In some aspects, the inner optical film structure comprises an innermost high refractive index layer. In some aspects, the inner optical film structure further comprising an easy-to-clean coating disposed on the innermost refractive index layer. In some aspects, the outermost RI layer of the inner optical film structure comprises an outermost high refractive index layer, optionally in direct contact with the at least one substrate or optionally with an organic layer disposed between the outermost RI layer of the inner optical film structure and at least one substrate. In some aspects, the outermost RI layer of the inner optical film structure comprises an outermost low refractive index layer, optionally in direct contact with the at least one substrate or optionally with an organic layer disposed between the outermost RI layer of the inner optical film structure and at least one substrate.

According to some aspects of the cover article 100 depicted in FIGS. 1A, 1B, and 1C, each of the high RI layers 130B and low RI layers 130A of the outer optical film structure 130a and inner optical film structure 130b, if present, independently can have a physical thickness (nm) of 5-2000, 5-1800, 5-1600, 5-1400, 5-1200, 5-1000, 5-900, 5-800, 5-700, 5-600, 5-500, 5-400, 5-300, 5-200, 5-100, 5-90, 5-80, 5-70, 5-60, 5-50, 5-40, 5-30, 5-20, 5-10, 10-2000, 10-1800, 10-1600, 10-1400, 10-1200, 10-1000, 10-900, 10-800, 10-700, 10-600, 10-500, 10-400, 10-300, 10-200, 10-100, 10-90, 10-80, 10-70, 10-60, 10-50, 10-40, 10-30, 10-20, 20-2000, 20-1800, 20-1600, 20-1400, 20-1200, 20-1000, 20-900, 20-800, 20-700, 20-600, 20-500, 20-400, 20-300, 20-200, 20-100, 20-90, 20-80, 20-70, 20-60, 20-50, 20-40, 20-30, 30-2000, 30-1800, 30-1600, 30-1400, 30-1200, 30-1000, 30-900, 30-800, 30-700, 30-600, 30-500, 30-400, 30-300, 30-200, 30-100, 30-90, 30-80, 30-70, 30-60, 30-50, 30-40, 40-2000, 40-1800, 40-1600, 40-1400, 40-1200, 40-1000, 40-900, 40-800, 40-700, 40-600, 40-500, 40-400, 40-300, 40-200, 40-100, 40-90, 40-80, 40-70, 40-60, 40-50, 50-2000, 50-1800, 50-1600, 50-1400, 50-1200, 50-1000, 50-900, 50-800, 50-700, 50-600, 50-500, 50-400, 50-300, 50-200, 50-100, 50-90, 50-80, 50-70, 50-60, 60-2000, 60-1800, 60-1600, 60-1400, 60-1200, 60-1000, 60-900, 60-800, 60-700, 60-600, 60-500, 60-400, 60-300, 60-200, 60-100, 60-90, 60-80, 60-70, 70-2000, 70-1800, 70-1600, 70-1400, 70-1200, 70-1000, 70-900, 70-800, 70-700, 70-600, 70-500, 70-400, 70-300, 70-200, 70-100, 70-90, 70-80, 80-2000, 80-1800, 80-1600, 80-1400, 80-1200, 80-1000, 80-900, 80-800, 80-700, 80-600, 80-500, 80-400, 80-300, 80-200, 80-100, 80-90, 90-2000, 90-1800, 90-1600, 90-1400, 90-1200, 90-1000, 90-900, 90-800, 90-700, 90-600, 90-500, 90-400, 90-300, 90-200, 90-100, 100-2000, 100-1800, 100-1600, 100-1400, 100-1200, 100-1000, 100-900, 100-800, 100-700, 100-600, 100-500, 100-400, 100-300, 100-200, 200-2000, 200-1800, 200-1600, 200-1400, 200-1200, 200-1000, 200-900, 200-800, 200-700, 200-600, 200-500, 200-400, 200-300, 300-2000, 300-1800, 300-1600, 300-1400, 300-1200, 300-1000, 300-900, 300-800, 300-700, 300-600, 300-500, 300-400, 400-2000, 400-1800, 400-1600, 400-1400, 400-1200, 400-1000, 400-900, 400-800, 400-700, 400-600, 400-500, 500-2000, 500-1800, 500-1600, 500-1400, 500-1200, 500-1000, 500-900, 500-800, 500-700, 500-600, 600-2000, 600-1800, 600-1600, 600-1400, 600-1200, 600-1000, 600-900, 600-800, 600-700, 700-2000, 700-1800, 700-1600, 700-1400, 700-1200, 700-1000, 700-900, 700-800, 800-2000, 800-1800, 800-1600, 800-1400, 800-1200, 800-1000, 800-900, 900-2000, 900-1800, 900-1600, 900-1400, 900-1200, 900-1000, 1000-2000, 1000-1800, 1000-1600, 1000-1400, 1000-1200, 1200-2000, 1200-1800, 1200-1600, 1200-1400, 1400-2000, 1400-1800, 1400-1600, 1600-2000, 1600-1800, or 1800-2000. In some aspects, each high RI layer and low RI layer independently can have a physical thickness that ranges from 5-500, 5-20, 50-200, 90-300, or 100-200.

According to some aspects of the cover article 100 depicted in FIGS. 1A, 1B, and 1C, each of the high RI layers 130B of the outer optical film structure 130a, if present, independently can have a physical thickness that ranges from about 5 nm to 2000 nm, about 5 nm to 1500 nm, about 5 nm to 1000 nm, and all thicknesses and ranges of thickness between these values. For example, each of these high RI layers 130B independently can have a physical thickness of 5 nm, 10 nm, 20 nm, 30 nm, 40 nm, 50 nm, 60 nm, 70 nm, 80 nm, 90 nm, 100 nm, 250 nm, 500 nm, 750 nm, 1000 nm, 1250 nm, 1500 nm, 1750 nm, 2000 nm and all thickness values between these levels. Further, each of the high RI layers 130B of the inner optical film structure 130b, if present, independently can have a physical thickness that ranges from about 5 nm to 500 nm, about 5 nm to 400 nm, about 5 nm to 300 nm, and all thicknesses and ranges of thickness between these values. As an example, each of these high RI layers 130B can have a physical thickness of 5 nm, 10 nm, 20 nm, 30 nm, 40 nm, 50 nm, 60 nm, 70 nm, 80 nm, 90 nm, 100 nm, 200 nm, 300 nm, 400 nm, 500 nm, and all thickness values between these levels.

According to some aspects of the cover article 100 depicted in FIGS. 1A, 1B, and 1C, each of the low RI layers 130A of the outer and/or inner optical film structures 130a, 130b, if present, independently can have a physical thickness from about 5 nm to 300 nm, about 5 nm to 250 nm, about 5 nm to 200 nm, and all thicknesses and ranges of thickness between these values. For example, each of these low RI layers 130A independently can have a physical thickness of 5 nm, 10 nm, 20 nm, 30 nm, 40 nm, 50 nm, 60 nm, 70 nm, 80 nm, 90 nm, 100 nm, 150 nm, 200 nm, 250 nm, 300 nm, and all thickness values between these levels.

In one or more aspects, at least one of the layers (such as a low RI layer 130A or a high RI layer 130B) of the outer and/or inner optical film structures 130a, 130b, if present, may include a specific optical thickness (or optical thickness range). As used herein, the term "optical thickness" refers to the product of the physical thickness and the refractive index of a layer. In one or more aspects, at least one of the layers of the outer and inner optical film structures 130a, 130b may have an optical thickness in the range from about 2 nm to about 200 nm, from about 10 nm to about 100 nm, from about 15 nm to about 100 nm, from about 15 nm to about 500 nm, or from about 15 nm to about 5000 nm. In some aspects, all of the layers in the outer and/or inner optical film structures 130a, 130b may each have an optical thickness in the range from about 2 nm to about 200 nm, from about 10 nm to about 100 nm, from about 15 nm to about 100 nm, from about 15 nm to about 500 nm, or from about 15 nm to about 5000 nm. In some aspects, at least one layer of either or both of the outer and inner optical film structures 130a, 130b has an optical thickness of about 50 nm or greater. In some aspects, each of the low RI layers 130A independently have an optical thickness in the range from about 2 nm to about 200 nm, from about 10 nm to about 100 nm, from about 15 nm to about 100 nm, from about 15 nm to about 500 nm, or from about 15 nm to about 5000 nm. In some aspects, each of the high RI layers 130B independently have an optical thickness in the range from about 2 nm to about 200 nm, from about 10 nm to about 100 nm, from about 15 nm to about 100 nm, from about 15 nm to about 500 nm, or from about 15 nm to about 5000 nm. In some aspects, with a three layer period 132, each of the medium RI layers independently have an optical thickness in the range from about 2 nm to about 200 nm, from about 10 nm to about 100 nm, from about 15 nm to about 100 nm, from about 15 nm to about 500 nm, or from about 15 nm to about 5000 nm. In some aspects, the scratch-resistant layer 150a and/or 150b is the thickest layer in the outer and/or inner optical film structure 130a, 130b, and/or has an index of refraction higher than that of any other layer in the film structure.

In some aspects, the outer optical film structure is present and the first plurality comprises at least 3 individual layers (or at least 4, at least 5, at least 6, at least 7, at least 8, at least 9, or at least 10 individual layers) selected from the high and low refractive index layers of the first plurality each having a physical thickness (nm) of at least 80, at least 90, at least 100, at least 110, at least 120, at least 130, at least 140, at least 150, at least 160, at least 170, at least 180, at least 190, at least 200, at least 225, or at least 250. In some aspects, at least 3 individual layers selected from the high and low refractive index layers of the first plurality each having a physical thickness (nm) of 80-250, 80-225, 80-200, 80-190, 80-180, 80-170, 80-160, 80-150, 80-140, 80-130, 80-120, 80-110, 80-100, 80-90, 90-250, 90-225, 90-200, 90-190, 90-180, 90-170, 90-160, 90-150, 90-140, 90-130, 90-120, 90-110, 90-100, 100-250, 100-225, 100-200, 100-190, 100-180, 100-170, 100-160, 100-150, 100-140, 100-130, 100-120, 100-110, 110-250, 110-225, 110-200, 110-190, 110-180, 110-170, 110-160, 110-150, 110-140, 110-130, 110-120, 120-250, 120-225, 120-200, 120-190, 120-180, 120-170, 120-160, 120-150, 120-140, 120-130, 130-250, 130-225, 130-200, 130-190, 130-180, 130-170, 130-160, 130-150, 130-140, 140-250, 140-225, 140-200, 140-190, 140-180, 140-170, 140-160, 140-150, 150-250, 150-225, 150-200, 150-190, 150-180, 150-170, 150-160, 160-250, 160-225, 160-200, 160-190, 160-180, 160-170, 170-250, 170-225, 170-200, 170-190, 170-180, 180-250, 180-225, 180-200, 180-190, 190-250, 190-225, 190-200, 200-250, 200-225, or 225-250. The number of layers that can have any of such physical thicknesses is at least 3, e.g., 3-10, 3-9, 3-8, 3-7, 3-6, 3-5, 3-4, 4-10, 4-9, 4-8, 4-7, 4-6, 4-5, 5-10, 5-9, 5-8, 5-7, 5-6, 6-10, 6-9, 6-8, 6-7, 7-10, 7-9, 7-8, 8-10, 8-9, or 9-10. In some aspects, at least 2, at least 3, at least 4, at least 5, at least 6, at least 7, at least 8, at least 9 layers, at least 10, 2-10, 2-9, 2-8, 2-7, 2-6, 2-5, 2-4, 2-3, 3-10, 3-9, 3-8, 3-7, 3-6, 3-5, 3-4, 4-10, 4-9, 4-8, 4-7, 4-6, 4-5, 5-10, 5-9, 5-8, 5-7, 5-6, 6-10, 6-9, 6-8, 6-7, 7-10, 7-9, 7-8, 8-10, 8-9, or 9-10 of such layers having such physical thicknesses are adjacent to (i.e., abutting) one another. In some aspects, at least two individual low refractive index layers (or any of the number of layers in this paragraph) in the first plurality of the outer optical film structure have any of the physical thicknesses in this paragraph (e.g., 80-150 nm, 100-200 nm, 120-180 nm, etc.) and also a refractive index of less than 1.55, less than 1.5, less than 1.45, less than 1.4, or less than 1.35, or any of the refractive index values disclosed elsewhere herein. In some aspects, at least two individual high refractive index layers (or any of the number of layers in this paragraph) in the first plurality of the outer optical film structure have any of the physical thicknesses in this paragraph (e.g., 80-180 nm, 100-200 nm, 120-180 nm, etc.) and also a refractive index of at least 2, at least 2.1, at least 2.2, at least 2.3, at least 2.4, or at least 2.5, or any of the refractive index values disclosed elsewhere herein.

In some aspects, the inner optical film structure is present and the second plurality comprises at least 3 individual layers (or at least 4, at least 5, at least 6, at least 7, at least 8, at least 9, or at least 10 individual layers) selected from the high and low refractive index layers of the first plurality each having a physical thickness (nm) of at least 80, at least 90, at least 100, at least 110, at least 120, at least 130, at least 140, at least 150, at least 160, at least 170, at least 180, at least 190, at least 200, at least 225, or at least 250. In some aspects, at least 3 individual layers selected from the high and low refractive index layers of the second plurality each having a physical thickness (nm) of 80-250, 80-225, 80-200, 80-190, 80-180, 80-170, 80-160, 80-150, 80-140, 80-130, 80-120, 80-110, 80-100, 80-90, 90-250, 90-225, 90-200, 90-190, 90-180, 90-170, 90-160, 90-150, 90-140, 90-130, 90-120, 90-110, 90-100, 100-250, 100-225, 100-200, 100-190, 100-180, 100-170, 100-160, 100-150, 100-140, 100-130, 100-120, 100-110, 110-250, 110-225, 110-200, 110-190, 110-180, 110-170, 110-160, 110-150, 110-140, 110-130, 110-120, 120-250, 120-225, 120-200, 120-190, 120-

180, 120-170, 120-160, 120-150, 120-140, 120-130, 130-250, 130-225, 130-200, 130-190, 130-180, 130-170, 130-160, 130-150, 130-140, 140-250, 140-225, 140-200, 140-190, 140-180, 140-170, 140-160, 140-150, 150-250, 150-225, 150-200, 150-190, 150-180, 150-170, 150-160, 160-250, 160-225, 160-200, 160-190, 160-180, 160-170, 170-250, 170-225, 170-200, 170-190, 170-180, 180-250, 180-225, 180-200, 180-190, 190-250, 190-225, 190-200, 200-250, 200-225, or 225-250. The number of layers that can have any of such physical thicknesses is at least 3, e.g., 3-10, 3-9, 3-8, 3-7, 3-6, 3-5, 3-4, 4-10, 4-9, 4-8, 4-7, 4-6, 4-5, 5-10, 5-9, 5-8, 5-7, 5-6, 6-10, 6-9, 6-8, 6-7, 7-10, 7-9, 7-8, 8-10, 8-9, or 9-10. In some aspects, at least 2, at least 3, at least 4, at least 5, at least 6, at least 7, at least 8, at least 9 layers, at least 10, 2-10, 2-9, 2-8, 2-7, 2-6, 2-5, 2-4, 2-3, 3-10, 3-9, 3-8, 3-7, 3-6, 3-5, 3-4, 4-10, 4-9, 4-8, 4-7, 4-6, 4-5, 5-10, 5-9, 5-8, 5-7, 5-6, 6-10, 6-9, 6-8, 6-7, 7-10, 7-9, 7-8, 8-10, 8-9, or 9-10 of such layers having such physical thicknesses are adjacent to (i.e., abutting) one another. In some aspects, at least two individual low refractive index layers (or any of the number of layers in this paragraph) in the second plurality of the inner optical film structure have any of the physical thicknesses in this paragraph (e.g., 80-150 nm, 100-200 nm, 120-180 nm, etc.) and also a refractive index of less than 1.55, less than 1.5, less than 1.45, less than 1.4, or less than 1.35, or any of the refractive index values disclosed elsewhere herein. In some aspects, at least two individual high refractive index layers (or any of the number of layers in this paragraph) in the second plurality of the inner optical film structure have any of the physical thicknesses in this paragraph (e.g., 80-180 nm, 100-200 nm, 120-180 nm, etc.) and also a refractive index of at least 2, at least 2.1, at least 2.2, at least 2.3, at least 2.4, or at least 2.5, or any of the refractive index values disclosed elsewhere herein.

In some aspects, a sum total physical thickness of the high refractive index layers in the first plurality (outer optical film structure) is less than 50%, less than 45%, less than 40%, less than 35%, or less than 30% of a sum total physical thickness of the high refractive index layers and the low refractive index layers in the first plurality. In some aspects, the sum total physical thickness of the high refractive index layers in the first plurality (outer optical film structure) is 25-50%, 25-45%, 25-40%, 25-35%, 25-30%, 30-50%, 30-45%, 30-40%, 30-35%, 35-50%, 35-45%, 35-40%, 40-50%, 40-45%, or 45-50% of a sum total physical thickness of the high refractive index layers and the low refractive index layers in the first plurality. In other aspects, such as in some aspects when inner and outer optical coatings have positive compressive stress values that roughly cancel each other out (or, e.g., at least have $|ST_a{-}ST_b|$ that is 500 Pa·m or any other value disclosed elsewhere herein), the cover glass article has a sum total physical thickness of the high refractive index layers in the first plurality (outer optical film structure) that is at least X % of a sum total physical thickness of the high refractive index layers and the low refractive index layers in the first plurality, in which X is 50, 55, 60, 65, 70, 75, 80, 85, 90, or 95. In some aspects, for example, in such balanced stress cases, the sum total physical thickness of the high refractive index layers in the first plurality (outer optical film structure) can be 50-95, 50-90, 50-85, 50-80, 50-75, 50-70, 50-65, 50-60, 50-55, 55-95, 55-90, 55-85, 55-80, 55-75, 55-70, 55-65, 55-60, 60-95, 60-90, 60-85, 60-80, 60-75, 60-70, 60-65, 65-95, 65-90, 65-85, 65-80, 65-75, 65-70, 70-95, 70-90, 70-85, 70-80, 70-75, 75-95, 75-90, 75-85, 75-80, 80-95, 80-90, 80-85, 85-95, 85-90, or 90-95. The percent of low refractive index layers can be readily calculated by subtracting each number above from 100%: e.g., 100% minus 25-50% results in a range of 50-75% that characterizes the percent of low refractive index layers relative to a sum total physical thickness of the high refractive index layers and the low refractive index layers. It is contemplated that such a calculation can be applied to any number or range in this paragraph.

In some aspects, a sum total physical thickness of the high refractive index layers in the second plurality (inner optical film structure) is less than 50%, less than 45%, less than 40%, less than 35%, or less than 30% of a sum total physical thickness of the high refractive index layers and the low refractive index layers in the second plurality. In some aspects, the sum total physical thickness of the high refractive index layers in the second plurality (inner optical film structure) is 25-50%, 25-45%, 25-40%, 25-35%, 25-30%, 30-50%, 30-45%, 30-40%, 30-35%, 35-50%, 35-45%, 35-40%, 40-50%, 40-45%, or 45-50% of a sum total physical thickness of the high refractive index layers and the low refractive index layers in the second plurality. In other aspects, such as in some aspects when inner and outer optical coatings have positive compressive stress values that roughly cancel each other out (or, e.g., at least have $|ST_a - ST_b|$ that is 500 Pa·m or any other value disclosed elsewhere herein), the cover glass article has a sum total physical thickness of the high refractive index layers in the second plurality (inner optical film structure) that is at least X % of a sum total physical thickness of the high refractive index layers and the low refractive index layers in the first plurality, in which X is 50, 55, 60, 65, 70, 75, 80, 85, 90, or 95. In some aspects, for example, in such balanced stress cases, the sum total physical thickness of the high refractive index layers in the second plurality (inner optical film structure) can be 50-95, 50-90, 50-85, 50-80, 50-75, 50-70, 50-65, 50-60, 50-55, 55-95, 55-90, 55-85, 55-80, 55-75, 55-70, 55-65, 55-60, 60-95, 60-90, 60-85, 60-80, 60-75, 60-70, 60-65, 65-95, 65-90, 65-85, 65-80, 65-75, 65-70, 70-95, 70-90, 70-85, 70-80, 70-75, 75-95, 75-90, 75-85, 75-80, 80-95, 80-90, 80-85, 85-95, 85-90, or 90-95. The percent of low refractive index layers can be readily calculated by subtracting each number above from 100%: e.g., 100% minus the range 25-50% results in a range of 50-75% that characterizes the percent of low refractive index layers relative to a sum total physical thickness of the high refractive index layers and the low refractive index layers. It is contemplated that such a calculation can be applied to any number or range in this paragraph.

In some aspects, at least one of the first plurality (outer optical film structure) and the second plurality (inner optical film structure) has a sum total physical thickness (nm) of at least 400, at least 500, at least 800, at least 1000, at least 1500, at least 2000, at least 2500, at least 3000, at least 3500, at least 4000, or at least 4500. In some aspects, at least one of the first plurality (outer optical film structure) and the second plurality (inner optical film structure) has a sum total physical thickness (nm) of 400-5000, 400-5000, 400-4500, 400-4000, 400-3500, 400-3000, 400-2500, 400-2000, 400-1500, 400-1000, 400-900, 400-800, 400-700, 400-600, 400-500, 500-5000, 500-4500, 500-4000, 500-3500, 500-3000, 500-2500, 500-2000, 500-1500, 500-1000, 500-900, 500-800, 500-700, 500-600, 600-5000, 600-4500, 600-4000, 600-3500, 600-3000, 600-2500, 600-2000, 600-1500, 600-1000, 600-900, 600-800, 600-700, 700-5000, 700-4500, 700-4000, 700-3500, 700-3000, 700-2500, 700-2000, 700-1500, 700-1000, 700-900, 700-800, 800-5000, 800-4500, 800-4000, 800-3500, 800-3000, 800-2500, 800-2000, 800-1500, 800-1000, 800-900, 900-5000, 900-4500, 900-4000, 900-3500, 900-3000, 900-2500, 900-2000, 900-1500, 900-1000, 1000-5000, 1000-4500, 1000-4000, 1000-3500, 1000-3000, 1000-2500, 1000-2000, 1000-1500, 1500-5000, 1500-4500, 1500-4000, 1500-3500, 1500-3000, 1500-2500, 1500-2000, 2000-5000, 2000-4500, 2000-4000, 2000-3500, 2000-3000, 2000-2500, 2500-5000, 2500-4500, 2500-4000, 2500-3500, 2500-3000, 3000-5000, 3000-4500, 3000-4000, 3000-3500, 3500-5000, 3500-4500, 3500-4000, 4000-5000, 4000-4500, or 4500-5000.

The substrate 110, 110a, and 110b of the cover article 100 depicted in FIGS. 1A, 1B, and 1C may include an inorganic material and may include an amorphous substrate, a crystalline substrate or a combination thereof. The substrate 110 may be formed from man-made materials and/or naturally occurring materials (e.g., quartz and/or polymers). For example, in some instances, the substrate 110 (including 110a and 110b) may be characterized as organic and may specifically be polymeric. Examples of suitable polymers include, without limitation: thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

In some specific aspects, the substrate 110, 110a, 110b may specifically exclude polymeric, plastic and/or metal substrates. The substrate 110, 110a, 110b may be characterized as alkali-including substrates (i.e., the substrate includes one or more alkalis). In one or more aspects, the substrate 110, 110a, 110b exhibits a refractive index in the range from about 1.45 to about 1.55. In specific aspects, the substrate 110, 110a, 110b may exhibit an average strain-to-failure at a surface on one or more opposing major surfaces that is 0.5% or greater. 0.6% or greater, 0.7% or greater, 0.8% or greater, 0.9% or greater, 1% or greater, 1.1% or greater, 1.2% or greater, 1.3% or greater, 1.4% or greater, 1.5% or greater or even 2% or greater, as measured using ball-on-ring or ring-on-ring testing using at least 5, at least 10, at least 15, or at least 20 samples. In specific aspects, the substrate 110, 110a. 110b may exhibit an average strain-to-failure at its surface on one or more opposing major surfaces of about 1.2%, about 1.4%, about 1.6%, about 1.8%, about 2.2%, about 2.4%, about 2.6%, about 2.8%, or about 3% or greater.

The term "strain-to-failure" refers to the strain at which cracks propagate in the outer or inner optical film structure 130a, 130b, substrate 110, 110a, 110b, or both the outer/inner film structure and substrate simultaneously without application of additional load, typically leading to catastrophic failure in a given material, layer or film and perhaps even bridge to another material, layer, or film, as defined herein. That is, breakage of the optical film structures 130a, 130b without breakage of the substrate 110, 110a, 110b constitutes failure, and breakage of the substrate 110, 110a, 110b also constitutes failure. The term "average" when used in connection with average strain-to-failure or any other property is based on the mathematical average of measurements of such property on 5 samples. Typically, crack onset strain measurements are repeatable under normal laboratory conditions. Average strain-to-failure as used herein was measured using Ring-on-Ring Tensile Testing. Unless stated otherwise, strain-to-failure measurements described herein refer to measurements from the ring-on-ring testing, as described in International Publication No. WO2018/125676, published on Jul. 5, 2018, entitled "Coated Articles with Optical Coatings Having Residual Compressive Stress," and incorporated herein by reference in its entirety.

The at least one substrate disclosed herein can comprise one, two three, four, five, six, seven, eight, nine, ten, or any other number of substrates. In some aspects, the at least one substrate comprises one substrate. In some aspects, the at least one substrate comprises a laminate. In some aspects, the laminate comprises glass with one or more layers of glass and/or polymer disposed thereon.

Suitable substrates 110, 110*a*, 110*b* may exhibit an elastic modulus (or Young's modulus) in the range from about 30 GPa to about 150 GPa. In some instances, the elastic modulus of the substrate 110 may be in the range from about 30 GPa to about 120 GPa, from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween. In some examples, Young's modulus may be measured by sonic resonance (ASTM E1875), resonant ultrasound spectroscopy, or nanoindentation using Berkovich indenters.

In one or more aspects, an amorphous substrate may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative aspects, the substrate 110 may include crystalline substrates such as glass ceramic substrates (which may be strengthened or non-strengthened) or may include a single crystal structure, such as sapphire. In one or more specific aspects, the substrate 110, 110*a*. 110*b* includes an amorphous base (e.g., glass) and a crystalline cladding (e.g., sapphire layer, a polycrystalline alumina layer and/or or a spinel (MgAl$_x$O$_y$) layer). Glass-ceramic substrates may comprise one or more crystalline phases such as lithium disilicate, petalite, beta quartz, or beta spodumene, potentially combined with residual glass in the structure. These glass-ceramic substrates may preferably be optically transparent and chemically strengthened, such as those described in U.S. Pat. No. 10,611,675, U.S. Patent Application Publication No. 2020/0231491, U.S. Patent Application Publication No. 2020/0223744, and U.S. Patent Application Publication No. 2020/0148591, each of which is hereby incorporated by reference in its entirety.

The substrate 110, 110*a*, 110*b* of one or more aspects may have a hardness that is less than the hardness of the article (as measured by the Berkovich Indenter Hardness Test described herein). The hardness of the substrate 110, 110*a*, 110*b* is measured using the Berkovich Indenter Hardness Test.

The substrate 110, 110*a*. 110*b* may be substantially optically clear, transparent and free from light scattering. In such aspects, the substrate 110, 110*a*, 110*b* may exhibit an average light transmittance over the optical wavelength regime of about 85% or greater, about 86% or greater, about 87% or greater, about 88% or greater, about 89% or greater, about 90% or greater, about 91% or greater or about 92% or greater. In some aspects, these light reflectance and transmittance values may be a total reflectance or total transmittance (taking into account reflectance or transmittance on all major surfaces of the substrate 110, 110*a*, 110*b*) or may be observed on a single-side of the substrate 110, 110*a*, 110*b* (i.e., on the primary surface 112 only (e.g., or 112*a/b* only), without taking into account the opposite surface 114 or 114*a/b*). Unless otherwise specified, the average reflectance or transmittance of the substrate 110, 110*a*, 110*b* alone is measured at an incident illumination angle of 0 degrees relative to the primary surface 112 (however, such measurements may be provided at incident illumination angles of 45 degrees or 60 degrees). The substrate 110, 110*a*, 110*b* may optionally exhibit a color, such as white, black, red, blue, green, yellow, orange, etc.

Additionally or alternatively, the physical thickness of the substrate 110, 110*a*. 110*b* may vary along one or more of its dimensions for aesthetic and/or functional reasons. For example, the edges of the substrate 110, 110*a*. 110*b* may be thicker as compared to more central regions of the substrate 110, 110*a*, 110*b*. The length, width and physical thickness dimensions of the substrate 110, 110*a*. 110*b* may also vary according to the application or use of the article 100.

The substrate 110, 110*a*, 110*b* may be provided using a variety of different processes. For instance, where the substrate 110 includes an amorphous substrate such as glass, various forming methods can include float glass processes and down-draw processes such as fusion draw and slot draw.

Once formed, a substrate 110, 110*a*, 110*b* may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

Where the substrate 110, 110*a*, 110*b* is chemically strengthened by an ion exchange process, the ions in the surface layer of the substrate 110 are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate 110, 110*a*, 110*b* in a salt bath (or baths), use of multiple salt baths, additional steps such as annealing, washing, and the like, are generally determined by the composition of the substrate 110, 110*a*, 110*b* and the desired compressive stress (CS), depth of compressive stress layer (or depth of layer) of the substrate 110, 110*a*, 110*b* that result from the strengthening operation. By way of example, ion exchange of alkali metal-containing glass substrates may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. Pat. No. 8,561,

41

429, in which glass substrates are strengthened by immersion in multiple, successive, ion exchange treatments in salt baths of different concentrations; and U.S. Pat. No. 8,312, 739, in which glass substrates are strengthened by ion exchange in a first bath diluted with an effluent ion, followed by immersion in a second bath having a smaller concentration of the effluent ion than the first bath. The contents of U.S. Pat. Nos. 8,561,429 and 8,312,739 are incorporated herein by reference in their entirety.

The degree of chemical strengthening achieved by ion exchange may be quantified based on the parameters of central tension (CT), surface CS, depth of compression (DOC), and depth of layer of potassium ions (DOL). Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient." the contents of which are incorporated herein by reference in their entirety. Refracted near-field (RNF) method or a scattered light polariscope (SCALP) technique may be used to measure the stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, issued Oct. 7, 2014, entitled "Systems and Methods for Measuring a Profile Characteristic of a Glass Sample", which is incorporated herein by reference in its entirety. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal. Refracted near-field (RNF) method or SCALP may be used to measure the stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. In particular, the RNF method includes placing the glass article adjacent to a reference block, generating a polarization-switched light beam that is switched between orthogonal polarizations at a rate of between 1 Hz. and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal. The maximum CT values are measured using a scattered light polariscope (SCALP) technique known in the art.

In some aspects, a strengthened substrate 110, 110a, 110b can have a surface CS of 250 MPa or greater, 300 MPa or greater (e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater). The strengthened substrate 110, 110a, 110b may have a DOL of 10 μm or greater, 15 μm or greater, 20 μm or greater (e.g., 25 μm, 30 μm, 35 μm, 40 μm, 45 μm, 50 μm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). The DOC may be from 0.05 times the thickness (t) of the substrate 110, 110a. 110b to about 0.3·t, for example from about 0.05·t to about 0.25·t, or from about 0.05·t to about 0.24·t, or from about 0.05·t to about 0.23·t, or from about 0.05·t to about 0.22·t, or from about 0.05·t to about 0.21·t, or from about 0.05·t to about 0.20·t, or from about 0.05·t to about 0.19·t, or from about 0.05·t to about 0.18·t. In one or more specific aspects, the strengthened substrate 110, 110a, 110b has one or more of the following: a surface CS greater than 500 MPa, a DOL greater than 15 μm, a DOC of from about 0.05·t to about 0.22·t, and a CT greater than 18 MPa.

Example glasses that may be used in the substrate 110, 110a, 110b may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3)\geq66$ mol. %, and $Na_2O\geq9$ mol. %. In an aspect, the glass composition includes at least 6 wt. % aluminum oxide. In a further aspect, the substrate 110 includes a glass composition with one or more alkaline earth oxides, such that a content of alkaline earth oxides is at least 5 wt. %. Suitable glass compositions, in some aspects, further comprise at least one of $K_2O$, MgO, and CaO. In a particular aspect, the glass compositions used in the substrate 110 can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate 110, 110a, 110b comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. %≤$(Li_2O+Na_2O+K_2O)$≤20 mol. % and 0 mol. %≤$(MgO+CaO)$≤10 mol. %.

A still further example glass composition suitable for the substrate 110, 110a, 110b comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol.

% $SnO_2$; 0.05-0.5 mol. % $CeO_2$; less than 50 ppm $As_2O_3$; and less than 50 ppm $Sb_2O_3$; where 14 mol. %≤($Li_2O$+$Na_2O$+$K_2O$)≤18 mol. % and 2 mol. %≤($MgO$+$CaO$)≤7 mol. %.

In a particular aspect, an alkali aluminosilicate glass composition suitable for the substrate 110, 110a, 110b comprises alumina, at least one alkali metal and, in some aspects, greater than 50 mol. % $SiO_2$, in other aspects at least 58 mol. % $SiO_2$, and in still other aspects at least 60 mol. % $SiO_2$, wherein the ratio ($Al_2O_3$+$B_2O_3$)/Σmodifiers (i.e., sum of modifiers) is greater than 1, where in the ratio the components are expressed in mol. % and the modifiers are alkali metal oxides. This glass composition, in particular aspects, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio ($Al_2O_3$+$B_2O_3$)/Σmodifiers (i.e., sum of modifiers) is greater than 1.

In still another aspect, the substrate 110, 110a, 110b may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % $MgO$; and 0-5 mol. % $CaO$, wherein: 66 mol. % _ $SiO_2$+ $B_2O_3$+$CaO$ _ 69 mol. %; $Na_2O$+$K_2O$+$B_2O_3$+$MgO$+$CaO$+ $SrO$>10 mol. %; 5 mol. % ₗ$MgO$+$CaO$+$SrO$ ₗ8 mol. %; ($Na_2O$+$B_2O_3$) _ $Al_2O_3$ _ 2 mol. %; 2 mol. % _ $Na_2O$ ₗ$Al_2O_3$ ₗ6 mol. %; and 4 mol. % ₗ($Na_2O$+$K_2O$) $AlO_3$ ⌋10 mol. %.

In an alternative aspect, the substrate 110, 110a, 110b may comprise an alkali aluminosilicate glass composition comprising: 2 mol. % or more of $Al_2O_3$ and/or $ZrO_2$, or 4 mol. % or more of $Al_2O_3$ and/or $ZrO_2$.

Where the substrate 110, 110a, 110b includes a crystalline substrate, the substrate may include a single crystal, which may include $Al_2O_3$. Such single crystal substrates are referred to as sapphire. Other suitable materials for a crystalline substrate include polycrystalline alumina and/or spinel ($MgAl_xO_y$).

Optionally, the crystalline substrate 110, 110a. 110b may include a glass ceramic substrate, which may be strengthened or non-strengthened. Examples of suitable glass ceramics may include $Li_2O$—$Al_2O_3$—$SiO_2$ system (i.e., LAS-System) glass ceramics, $MgO$—$Al_2O_3$—$SiO_2$ system (i.e., MAS-System) glass ceramics, and/or glass ceramics that include a predominant crystal phase including β-quartz solid solution, β-spodumene ss, cordierite, and lithium disilicate. The glass ceramic substrates may be strengthened using the chemical strengthening processes disclosed herein. In one or more aspects, MAS-System glass ceramic substrates may be strengthened in $Li_2SO_4$ molten salt, whereby an exchange of $2Li^+$ for $Mg^{2+}$ can occur.

The substrate 110, 110a, 110b according to one or more aspects can have a physical thickness ranging from about 100 μm to about 5 mm in various portions of the substrate 110, 110a, 110b. Example substrate 11, 110a, 110b 0 physical thicknesses range from about 100 μm to about 500 μm (e.g., 100, 200, 300, 400 or 500 μm). Further example substrate 110, 110a, 110b physical thicknesses range from about 500 μm to about 1000 μm (e.g., 500, 600, 700, 800, 900 or 1000 μm). The substrate 110, 110a, 110b may have a physical thickness greater than about 1 mm (e.g., about 2, 3, 4, or 5 mm). In one or more specific aspects, the substrate 110, 110a, 110b may have a physical thickness of 2 mm or less, or less than 1 mm. The substrate 110, 110a, 110b may be acid polished or otherwise treated to remove or reduce the effect of surface flaws.

With regard to the hardness of the cover glass articles 100, 110a, 110b depicted in FIGS. 1A, 1B, and 1C, typically, in nanoindentation measurement methods (such as by using a Berkovich indenter) where the coating is harder than the underlying substrate, the measured hardness may appear to increase initially due to development of the plastic zone at shallow indentation depths (e.g., less than 25 nm or less than 50 nm) and then increases and reaches a maximum value or plateau at deeper indentation depths (e.g., from 50 nm to about 500 nm or 1000 nm). Thereafter, hardness begins to decrease at even deeper indentation depths due to the effect of the underlying substrate. Where a substrate 110, 110a, 110b having a greater hardness compared to the coating is utilized, the same effect can be seen; however, the hardness increases at deeper indentation depths due to the effect of the underlying substrate.

With further regard to the cover glass articles 100, 110a. 110b depicted in FIGS. 1A, 1B, and 1C, the indentation depth range and the hardness values at certain indentation depth ranges can be selected to identify a particular hardness response of the outer and inner optical film structures 130a, 130b and the layers of these structures thereof, described herein, without the effect of the underlying substrate 110, 110a, 110b. When measuring hardness of the optical film structures 130a, 130b (when disposed on a substrate 110) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate 110, 110a, 110b. The influence of the substrate 110, 110a, 110b on hardness occurs at deeper indentation depths (i.e., typically at depths greater than about 10% of the total thickness of the outer or inner optical film structure 130a, 130b). Moreover, a further complication is that the hardness response requires a certain minimum load to develop full plasticity during the indentation process. Prior to that certain minimum load, the hardness shows a generally increasing trend.

At small indentation depths (which also may be characterized as small loads) (e.g., up to about 50 nm) in the outer or inner optical film structure 130a, 130b, the apparent hardness of a material appears to increase dramatically versus indentation depth. This small indentation depth regime does not represent a true metric of hardness but, instead, reflects the development of the aforementioned plastic zone, which is related to the finite radius of curvature of the indenter. At intermediate indentation depths, the apparent hardness approaches maximum levels. At deeper indentation depths, the influence of the substrate 110, 110a, 110b becomes more pronounced as the indentation depths increase. Hardness may begin to drop dramatically once the indentation depth exceeds about 30% of the optical coating thickness.

In one or more aspects, the cover glass article 100, as depicted in FIGS. 1A, 1B, and 1C, may exhibit a maximum hardness of 8 GPa or greater, about 9 GPa or greater, about 10 GPa or greater, about 11 GPa or greater, or about 12 GPa or greater, as measured in the outer optical film structure 130a by a Berkovich Indenter Hardness Test over an indentation depth from about 100 nm to about 500 nm. For example, the cover glass article 100 can exhibit a maximum hardness of 8 GPa, 9 GPa, 10 GPa, 11 GPa, 12 GPa, 13 GPa, 14 GPa, 15 GPa, 16 GPa, 17 GPa, 18 GPa, 19 GPa, 20 GPa, or greater, as measured in the outer optical film structure 130a. In one or more aspects, the cover glass article 100 may exhibit a maximum hardness of about 8 GPa or greater, about 9 GPa or greater, about 10 GPa or greater, about 11

GPa or greater, or about 12 GPa or greater (e.g., 14 GPa or greater, 16 GPa or greater, 18 GPa or greater, or even 20 GPa or greater) as measured in the inner optical film structure 130*b* by a Berkovich Indenter Hardness Test over an indentation depth from about 100 nm to about 500 nm. For example, the cover glass article 100 can exhibit a maximum hardness of 8 GPa, 9 GPa, 10 GPa, 11 GPa, 12 GPa, 13 GPa, 14 GPa, 15 GPa, 16 GPa, 17 GPa, 18 GPa, 19 GPa, 20 GPa, or greater, as measured in the inner optical film structure 130*b*.

With further regard to the hardness of the cover glass articles 100 depicted in FIGS. 1A, 1B, and 1C, the hardness of the material of a high RI layer 130B and/or scratch-resistant layer 150*a*, 150*b* may be characterized specifically. In some aspects, the maximum hardness of the high RI layer 130B and/or the scratch-resistant layers 150*a*. 150*b*, as measured by the Berkovich Indenter Hardness Test, may be about 8 GPa or greater, about 9 GPa or greater, about 10 GPa or greater, about 12 GPa or greater, about 15 GPa or greater, about 18 GPa or greater, or even about 20 GPa or greater. The hardness of a given layer (e.g., high RI layer 130B) may be measured by analyzing a cover glass article 100 where the layer measured is the uppermost layer in the outer optical film structure 130*a* or the innermost layer in the inner optical film structure 130*b*. If the layer to be measured for hardness is a buried layer, its hardness may be measured by producing a cover glass article which does not include the overlying layers and subsequently testing the article for hardness. Such measured hardness values may be exhibited by the cover glass article 100, outer and/or inner optical film structures 130*a*, 130*b*, high RI layer 130B, and/or scratch-resistant layers 150*a*, 150*b* along an indentation depth of about 50 nm or greater or about 100 nm or greater, and may be sustained above a certain hardness value for a continuous indentation depth range. In aspects, the continuous indentation depth range can be from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, from about 200 nm to about 600 nm, from about 200 nm to about 800 nm, from about 200 nm to about 1000 nm, from about 300 nm to about 500 nm, from about 300 nm to about 800 nm, or from about 300 nm to about 1000 nm. In one or more aspects, the cover glass article 100 exhibits a hardness that is greater than the hardness of the substrate 110, 110*a*, 110*b* (which can be measured on the primary surface 112 or 114 with the respective outer or inner optical film structure 130*a*, 130*b* removed).

According to some aspects, the cover glass articles 100 depicted in FIGS. 1A, 1B, and 1C, and variations thereof, may exhibit an average transmittance of at least 92%, at least 93%, at least 94%, at least 95%, at least 96%, at least 97%, or at least 98%, as measured from 400-700 nm at one or more incident angles (e.g., at all incident angles) from 0 to 30 degrees through the outer and inner primary surfaces of the at least one substrate and the inner and outer optical film structures (and any organic and/or intervening layers), if present. In some aspects, the average transmittance (%) is 92-99, 92-98, 92-97, 92-96, 92-95, 92-94, 92-93, 93-99, 93-98, 93-97, 93-96, 93-95, 93-94, 94-99, 94-98, 94-97, 94-96, 94-95, 95-99, 95-98, 95-97, 95-96, 96-99, 96-98, 96-97, 97-99, 97-98, or 98-99, as measured from 400-700 nm at one or more incident angles (e.g., at all incident angles) from 0 to 30 degrees through the outer and inner primary surfaces of the at least one substrate and the inner and outer optical film structures (and any organic and/or intervening layers), if present.

According to some aspects, the cover glass articles 100 depicted in FIGS. 1A, 1B, and 1C, and variations thereof, may exhibit an average transmittance of at least 80%, at least 81%, at least 82%, at least 83%, at least 84%, at least 85%, at least 86%, at least 87%, at least 88%, or at least 89%, as measured from 400-700 nm at one or more incident angles (e.g., at all incident angles) from 0 to 60 degrees through the outer and inner primary surfaces of the at least one substrate and the inner and outer optical film structures (and any organic and/or intervening layers), if present. In some aspects, the average transmittance (%) is 80-90, 80-89, 80-88, 80-87, 80-86, 80-85, 80-84, 80-83, 80-82, 80-81, 81-90, 81-89, 81-88, 81-87, 81-86, 81-85, 81-84, 81-83, 81-82, 82-90, 82-89, 82-88, 82-87, 82-86, 82-85, 82-84, 82-83, 83-90, 83-89, 83-88, 83-7, 83-86, 83-85, 83-84, 84-90, 84-89, 84-88, 84-87, 84-86, 84-85, 85-90, 85-89, 85-88, 85-87, 85-86, 86-90, 86-89, 86-88, 86-87, 87-90, 87-89, 87-88, 88-90, 88-89, or 89-90, as measured from 400-700 nm at one or more incident angles (e.g., at all incident angles) from 0 to 60 degrees through the outer and inner primary surfaces of the at least one substrate and the inner and outer optical film structures (and any organic and/or intervening layers), if present.

According to some aspects, the cover glass articles 100 depicted in FIGS. 1A, 1B, and 1C, and variations thereof, may exhibit a visible photopic average transmittance of at least 92%, at least 93%, at least 94%, at least 95%, at least 96%, at least 97%, or at least 98%, as measured at an incident angle of 0 degrees or at one or more incident angles (e.g., at all incident angles) from 0 to 10 degrees through the outer and inner primary surfaces of the at least one substrate and the inner and outer optical film structures (and any organic and/or intervening layers), if present. In some aspects, the visible photopic average transmittance (%) is 92-99, 92-98, 92-97, 92-96, 92-95, 92-94, 92-93, 93-99, 93-98, 93-97, 93-96, 93-95, 93-94, 94-99, 94-98, 94-97, 94-96, 94-95, 95-99, 95-98, 95-97, 95-96, 96-99, 96-98, 96-97, 97-99, 97-98, or 98-99, as measured at an incident angle of 0 degrees or at one or more incident angles (e.g., at all incident angles) from 0 to 10 degrees through the outer and inner primary surfaces of the at least one substrate and the inner and outer optical film structures (and any organic and/or intervening layers), if present.

According to some aspects, the cover glass articles 100 depicted in FIGS. 1A, 1B, and 1C, and variations thereof, may exhibit an average transmittance of at least 92%, at least 93%, at least 94%, at least 95%, at least 96%, at least 97%, or at least 98%, as measured from 400-700 nm at an incident angle of 0 degrees or at one or more incident angles (e.g., at all incident angles) from 0 to 10 degrees through the outer and inner primary surfaces of the at least one substrate and the inner and outer optical film structures (and any organic and/or intervening layers), if present. In some aspects, the average transmittance (%) is 92-99, 92-98, 92-97, 92-96, 92-95, 92-94, 92-93, 93-99, 93-98, 93-97, 93-96, 93-95, 93-94, 94-99, 94-98, 94-97, 94-96, 94-95, 95-99, 95-98, 95-97, 95-96, 96-99, 96-98, 96-97, 97-99, 97-98, or 98-99, as measured from 400-700 nm at an incident angle of 0 degrees or at one or more incident angles (e.g., at all incident angles) from 0 to 10 degrees through the outer and inner primary surfaces of the at least one substrate and the inner and outer optical film structures (and any organic and/or intervening layers), if present.

According to some aspects, the cover glass articles 100 depicted in FIGS. 1A, 1B, and 1C, and variations thereof, may exhibit an average transmittance of less than 50%, less than 45%, less than 40%, less than 35%, less than 30%, less than 25%, less than 20%, less than 15%, less than 10%, less than 9%, less than 8%, less than 7%, less than 6%, less than 5%, less than 4%, less than 3%, less than 2%, or less than 1%, as measured from 930-950 nm at one or more incident angles (e.g., at all incident angles) from 0 to 30 degrees through the outer and inner primary surfaces of the at least one substrate and the inner and outer optical film structures (and any organic and/or intervening layers), if present. In some aspects, the average transmittance (%) is 0.1-50, 0.1-45, 0.1-40, 0.1-35, 0.1-30, 0.1-25, 0.1-20, 0.1-15, 0.1-10, 0.1-9, 0.1-8, 0.1-7, 0.1-6, 0.1-5, 0.1-4, 0.1-3, 0.1-2, 0.1-1, 1-50, 1-45, 1-40, 1-35, 1-30, 1-25, 1-20, 1-15, 1-10, 1-9, 1-8, 1-7, 1-6, 1-5, 1-4, 1-3, 1-2, 2-50, 2-45, 2-40, 2-35, 2-30, 2-25, 2-20, 2-15, 2-10, 2-9, 2-8, 2-7, 2-6, 2-5, 2-4, 2-3, 3-50, 3-45, 3-40, 3-35, 3-30, 3-25, 3-20, 3-15, 3-10, 3-9, 3-8, 3-7, 3-6, 3-5, 3-4, 4-50, 4-45, 4-40, 4-35, 4-30, 4-25, 4-20, 4-15, 4-10, 4-9, 4-8, 4-7, 4-6, 4-5, 5-50, 5-45, 5-40, 5-35, 5-30, 5-25, 5-20, 5-15, 5-10, 5-9, 5-8, 5-7, 5-6, 6-50, 6-45, 6-40, 6-35, 6-30, 6-25, 6-20, 6-15, 6-10, 6-9, 6-8, 6-7, 7-50, 7-45, 7-40, 7-35, 7-30, 7-25, 7-20, 7-15, 7-10, 7-9, 7-8, 8-50, 8-45, 8-40, 8-35, 8-30, 8-25, 8-20, 8-15, 8-10, 8-9, 9-50, 9-45, 9-40, 9-35, 9-30, 9-5, 9-20, 9-15, 9-10, 10-50, 10-45, 10-40, 10-35, 10-30, 10-25, 10-20, 10-15, 15-50, 15-45, 15-40, 15-35, 15-30, 15-25, 15-20, 20-50, 20-45, 20-40, 20-35, 20-30, 20-25, 25-50, 25-45, 25-40, 25-35, 25-30, 30-50, 30-45, 30-40, 30-35, 35-50, 35-45, 35-40, 40-50, 40-45, or 45-50, as measured from 930-950 nm at one or more incident angles (e.g., at all incident angles) from 0 to 30 degrees through the outer and inner primary surfaces of the at least one substrate and the inner and outer optical film structures (and any organic and/or intervening layers), if present.

According to some aspects, the cover glass articles 100 depicted in FIGS. 1A, 1B, and 1C, and variations thereof, may exhibit an average transmittance of less than 50%, less than 45%, less than 40%, less than 35%, less than 30%, less than 25%, less than 20%, less than 15%, less than 10%, less than 9%, less than 8%, or less than 7%, as measured from 930-950 nm at one or more incident angles (e.g., at all incident angles) from 0 to 60 degrees through the outer and inner primary surfaces of the at least one substrate and the inner and outer optical film structures (and any organic and/or intervening layers), if present. In some aspects, the average transmittance (%) is 5-50, 5-45, 5-40, 5-35, 5-30, 5-25, 5-20, 5-15, 5-10, 5-9, 5-8, 5-7, 5-6, 6-50, 6-45, 6-40, 6-35, 6-30, 6-25, 6-20, 6-15, 6-10, 6-9, 6-8, 6-7, 7-50, 7-45, 7-40, 7-35, 7-30, 7-25, 7-20, 7-15, 7-10, 7-9, 7-8, 8-50, 8-45, 8-40, 8-35, 8-30, 8-25, 8-20, 8-15, 8-10, 8-9, 9-50, 9-45, 9-40, 9-35, 9-30, 9-5, 9-20, 9-15, 9-10, 10-50, 10-45, 10-40, 10-35, 10-30, 10-25, 10-20, 10-15, 15-50, 15-45, 15-40, 15-35, 15-30, 15-25, 15-20, 20-50, 20-45, 20-40, 20-35, 20-30, 20-25, 25-50, 25-45, 25-40, 25-35, 25-30, 30-50, 30-45, 30-40, 30-35, 35-50, 35-45, 35-40, 40-50, 40-45, or 45-50, as measured from 930-950 nm at one or more incident angles (e.g., at all incident angles) from 0 to 60 degrees through the outer and inner primary surfaces of the at least one substrate and the inner and outer optical film structures (and any organic and/or intervening layers), if present.

According to some aspects, the cover glass articles 100 depicted in FIGS. 1A, 1B, and 1C, and variations thereof, may exhibit an average transmittance of less than 50%, less than 45%, less than 40%, less than 35%, less than 30%, less than 25%, less than 20%, less than 15%, less than 10%, less than 9%, less than 8%, less than 7%, or less than 6%, or less than 5%, as measured from 930-950 nm at an incident angle of 0 degrees or at one or more incident angles (e.g., at all incident angles) from 0 to 10 degrees through the outer and inner primary surfaces of the at least one substrate and the inner and outer optical film structures (and any organic and/or intervening layers), if present. In some aspects, the average transmittance (%) is 3-50, 3-45, 3-40, 3-35, 3-30, 3-25, 3-20, 3-15, 3-10, 3-9, 3-8, 3-7, 3-6, 3-5, 3-4, 4-50, 4-45, 4-40, 4-35, 4-30, 4-25, 4-20, 4-15, 4-10, 4-9, 4-8, 4-7, 4-6, 4-5, 5-50, 5-45, 5-40, 5-35, 5-30, 5-25, 5-20, 5-15, 5-10, 5-9, 5-8, 5-7, 5-6, 6-50, 6-45, 6-40, 6-35, 6-30, 6-25, 6-20, 6-15, 6-10, 6-9, 6-8, 6-7, 7-50, 7-45, 7-40, 7-35, 7-30, 7-25, 7-20, 7-15, 7-10, 7-9, 7-8, 8-50, 8-45, 8-40, 8-35, 8-30, 8-25, 8-20, 8-15, 8-10, 8-9, 9-50, 9-45, 9-40, 9-35, 9-30, 9-5, 9-20, 9-15, 9-10, 10-50, 10-45, 10-40, 10-35, 10-30, 10-25, 10-20, 10-15, 15-50, 15-45, 15-40, 15-35, 15-30, 15-25, 15-20, 20-50, 20-45, 20-40, 20-35, 20-30, 20-25, 25-50, 25-45, 25-40, 25-35, 25-30, 30-50, 30-45, 30-40, 30-35, 35-50, 35-45, 35-40, 40-50, 40-45, or 45-50, as measured from 930-950 nm at an incident angle of 0 degrees or at one or more incident angles (e.g., at all incident angles) from 0 to 10 degrees through the outer and inner primary surfaces of the at least one substrate and the inner and outer optical film structures (and any organic and/or intervening layers), if present.

According to some aspects, the cover glass articles 100 depicted in FIGS. 1A, 1B, and 1C, and variations thereof, may exhibit an average transmittance of less than 60%, less than 55%, less than 50%, less than 45%, less than 40%, less than 35%, less than 30%, less than 25%, less than 20%, or less than 15%, as measured from 800-1300 nm at an incident angle of 0 degrees or at one or more incident angles (e.g., at all incident angles) from 0 to 10 degrees through the outer and inner primary surfaces of the at least one substrate and the inner and outer optical film structures (and any organic and/or intervening layers), if present. In some aspects, the average transmittance (%) is 10-60, 10-55, 10-50, 10-45, 10-40, 10-35, 10-30, 10-25, 10-20, 10-15, 15-60, 15-55, 15-50, 15-45, 15-40, 15-35, 15-30, 15-25, 15-20, 20-60, 20-55, 20-50, 20-45, 20-40, 20-35, 20-30, 20-25, 25-60, 25-55, 25-50, 25-45, 25-40, 25-35, 25-30, 30-60, 30-55, 30-50, 30-45, 30-40, 30-35, 35-60, 35-55, 35-50, 35-45, 35-40, 40-60, 40-55, 40-50, 40-45, 45-60, 45-55, 45-50, 50-60, 50-55, or 55-60, as measured from 800-1300 nm at an incident angle of 0 degrees or at one or more incident angles (e.g., at all incident angles) from 0 to 10 degrees through the outer and inner primary surfaces of the at least one substrate and the inner and outer optical film structures (and any organic and/or intervening layers), if present.

According to some aspects, the cover glass articles 100 depicted in FIGS. 1A, 1B, and 1C, and variations thereof, may exhibit an average transmittance of less than 60%, less than 55%, less than 50%, less than 45%, less than 40%, less than 35%, less than 30%, less than 25%, less than 20%, less than 15%, or less than 10%, as measured from 850-1250 nm at an incident angle of 0 degrees or at one or more incident angles (e.g., at all incident angles) from 0 to 10 degrees through the outer and inner primary surfaces of the at least one substrate and the inner and outer optical film structures (and any organic and/or intervening layers), if present. In some aspects, the average transmittance (%) is 5-60, 5-55, 5-50, 5-45, 5-40, 5-35, 5-30, 5-25, 5-20, 5-15, 5-10, 10-60, 10-55, 10-50, 10-45, 10-40, 10-35, 10-30, 10-25, 10-20, 10-15, 15-60, 15-55, 15-50, 15-45, 15-40, 15-35, 15-30, 15-25, 15-20, 20-60, 20-55, 20-50, 20-45, 20-40, 20-35, 20-30, 20-25, 25-60, 25-55, 25-50, 25-45, 25-40, 25-35, 25-30, 30-60, 30-55, 30-50, 30-45, 30-40, 30-35, 35-60, 35-55, 35-50, 35-45, 35-40, 40-60, 40-55, 40-50, 40-45, 45-60, 45-55, 45-50, 50-60, 50-55, or 55-60, as measured from 850-1250 nm at an incident angle of 0 degrees or at one or more incident angles (e.g., at all incident angles) from 0 to 10 degrees through the outer and inner primary surfaces of the at least one substrate and the inner and outer optical film structures (and any organic and/or intervening layers), if present.

According to some aspects, the cover glass articles 100 depicted in FIGS. 1A, 1B, and 1C, and variations thereof, may exhibit an average transmittance of less than 50%, less than 45%, less than 40%, less than 35%, less than 30%, less than 25%, less than 20%, less than 15%, less than 10%, less than 9%, less than 8%, less than 7%, or less than 6%, or less than 5%, as measured from 900-1200 nm at an incident angle of 0 degrees or at one or more incident angles (e.g., at all incident angles) from 0 to 10 degrees through the outer and inner primary surfaces of the at least one substrate and the inner and outer optical film structures (and any organic and/or intervening layers), if present. In some aspects, the average transmittance (%) is 3-50, 3-45, 3-40, 3-35, 3-30, 3-25, 3-20, 3-15, 3-10, 3-9, 3-8, 3-7, 3-6, 3-5, 3-4, 4-50, 4-45, 4-40, 4-35, 4-30, 4-25, 4-20, 4-15, 4-10, 4-9, 4-8, 4-7, 4-6, 4-5, 5-50, 5-45, 5-40, 5-35, 5-30, 5-25, 5-20, 5-15, 5-10, 5-9, 5-8, 5-7, 5-6, 6-50, 6-45, 6-40, 6-35, 6-30, 6-25, 6-20, 6-15, 6-10, 6-9, 6-8, 6-7, 7-50, 7-45, 7-40, 7-35, 7-30, 7-25, 7-20, 7-15, 7-10, 7-9, 7-8, 8-50, 8-45, 8-40, 8-35, 8-30, 8-25, 8-20, 8-15, 8-10, 8-9, 9-50, 9-45, 9-40, 9-35, 9-30, 9-5, 9-20, 9-15, 9-10, 10-50, 10-45, 10-40, 10-35, 10-30, 10-25, 10-20, 10-15, 15-50, 15-45, 15-40, 15-35, 15-30, 15-25, 15-20, 20-50, 20-45, 20-40, 20-35, 20-30, 20-25, 25-50, 25-45, 25-40, 25-35, 25-30, 30-50, 30-45, 30-40, 30-35, 35-50, 35-45, 35-40, 40-50, 40-45, or 45-50, as measured from 900-1200 nm at an incident angle of 0 degrees or at one or more incident angles (e.g., at all incident angles) from 0 to 10 degrees through the outer and inner primary surfaces of the at least one substrate and the inner and outer optical film structures (and any organic and/or intervening layers), if present.

According to some aspects, the cover glass articles 100 depicted in FIGS. 1A, 1B, and 1C, and variations thereof, may exhibit an average transmittance of less than 50%, less than 45%, less than 40%, less than 35%, less than 30%, less than 25%, less than 20%, less than 15%, less than 10%, less than 9%, less than 8%, less than 7%, or less than 6%, less than 5%, less than 4%, less than 3%, or less than 2%, as measured from 900-1100 nm at an incident angle of 0 degrees or at one or more incident angles (e.g., at all incident angles) from 0 to 10 degrees through the outer and inner primary surfaces of the at least one substrate and the inner and outer optical film structures (and any organic and/or intervening layers), if present. In some aspects, the average transmittance (%) is 1-50, 1-45, 1-40, 1-35, 1-30, 1-25, 1-20, 1-15, 1-10, 1-9, 1-8, 1-7, 1-6, 1-5, 1-4, 1-3, 1-2, 2-50, 2-45, 2-40, 2-35, 2-30, 2-25, 2-20, 2-15, 2-10, 2-9, 2-8, 2-7, 2-6, 2-5, 2-4, 2-3, 3-50, 3-45, 3-40, 3-35, 3-30, 3-25, 3-20, 3-15, 3-10, 3-9, 3-8, 3-7, 3-6, 3-5, 3-4, 4-50, 4-45, 4-40, 4-35, 4-30, 4-25, 4-20, 4-15, 4-10, 4-9, 4-8, 4-7, 4-6, 4-5, 5-50, 5-45, 5-40, 5-35, 5-30, 5-25, 5-20, 5-15, 5-10, 5-9, 5-8, 5-7, 5-6, 6-50, 6-45, 6-40, 6-35, 6-30, 6-25, 6-20, 6-15, 6-10, 6-9, 6-8, 6-7, 7-50, 7-45, 7-40, 7-35, 7-30, 7-25, 7-20, 7-15, 7-10, 7-9, 7-8, 8-50, 8-45, 8-40, 8-35, 8-30, 8-25, 8-20, 8-15, 8-10, 8-9, 9-50, 9-45, 9-40, 9-35, 9-30, 9-5, 9-20, 9-15, 9-10, 10-50, 10-45, 10-40, 10-35, 10-30, 10-25, 10-20, 10-15, 15-50, 15-45, 15-40, 15-35, 15-30, 15-25, 15-20, 20-50, 20-45, 20-40, 20-35, 20-30, 20-25, 25-50, 25-45, 25-40, 25-35, 25-30, 30-50, 30-45, 30-40, 30-35, 35-50, 35-45, 35-40, 40-50, 40-45, or 45-50, as measured from 900-1100 nm at an incident angle of 0 degrees or at one or more incident angles (e.g., at all incident angles) from 0 to 10 degrees through the outer and inner primary surfaces of the at least one substrate and the inner and outer optical film structures (and any organic and/or intervening layers), if present.

According to some aspects, the cover glass articles 100 depicted in FIGS. 1A, 1B, and 1C, and variants thereof, may exhibit a transmitted color with a D65 illuminant, as given by $\sqrt{(a^{*2}+b^{*2})}$, of less than 4, less than 3.5, less than 3, less than 2.5, less than 2, less than 1.5, or less than 1, as measured at incidence angles of 0 to 40 degrees or 0 to 50 degrees through the outer and inner primary surfaces of the at least one substrate and the inner and outer optical film structures (and any organic and/or intervening layers), if present. In some aspects, the transmitted color is 0.5-2, 0.5-1.5, 0.5-1, 1-2, 1-1.5, or 1.5-2, as measured through the outer and inner primary surfaces of the at least one substrate and the inner and outer optical film structures (and any organic and/or intervening layers), if present.

According to some aspects, the cover glass articles 100 depicted in FIGS. 1A, 1B, and 1C, and variants thereof, may exhibit a transmitted color with a D65 illuminant, as given by $\sqrt{(a^{*2}+b^{*2})}$, of less than 1.1, less than 1, less than 0.9, less than 0.8, less than 0.7, less than 0.6, or less than 0.5, as measured at incidence angles of 0 to 50 degrees through the outer and inner primary surfaces of the at least one substrate and the inner and outer optical film structures (and any organic and/or intervening layers), if present. In some aspects, the transmitted color is 0.4-1.2, 0.4-1.1, 0.4-1, 0.4-0.9, 0.4-0.8, 0.4-0.7, 0.4-0.6, 0.4-0.5, 0.5-1.2, 0.5-1.1, 0.5-1, 0.5-0.9, 0.5-0.8, 0.5-0.7, 0.5-0.6, 0.6-1.2, 0.6-1.1, 0.6-1, 0.6-0.9, 0.6-0.8, 0.6-0.7, 0.7-1.2, 0.7-1.1, 0.7-1, 0.7-0.9, 0.7-0.8, 0.8-1.2, 0.8-1.1, 0.8-1, 0.8-0.9, 0.9-1.2, 0.9-1.1, 0.9-1, 1-1.2, 1-1.1, or 1.1-1.2, as measured at incidence angles of 0 to 50 degrees through the outer and inner primary surfaces of the at least one substrate and the inner and outer optical film structures (and any organic and/or intervening layers), if present.

According to some aspects, the cover glass articles 100 depicted in FIGS. 1A, 1B, and 1C, and variants thereof, may exhibit a transmitted color with a D65 illuminant, as given by $\sqrt{(a^{*2}+b^{*2})}$, of less than 0.5, less than 0.4, less than 0.3, less than 0.2, or less than 0.1, as measured at incidence angles of 0 to 20 degrees through the outer and inner primary surfaces of the at least one substrate and the inner and outer optical film structures (and any organic and/or intervening layers), if present. In some aspects, the transmitted color is 0.05-0.5, 0.05-0.4, 0.05-0.3, 0.05-0.2, 0.05-0.1, 0.1-0.5, 0.1-0.4, 0.1-0.3, 0.1-0.2, 0.2-0.5, 0.2-0.4, 0.2-0.3, 0.3-0.56, 0.3-0.4, or 0.4-0.5, as measured at incidence angles of 0 to 20 degrees through the outer and inner primary surfaces of the at least one substrate and the inner and outer optical film structures (and any organic and/or intervening layers), if present.

According to some aspects, the cover glass articles 100 depicted in FIGS. 1A, 1B, and 1C, and variants thereof, may exhibit a transmitted color with a D65 illuminant, as given by $\sqrt{(a^{*2}+b^{*2})}$, of less than 0.3, less than 0.25, less than 0.2, less than 0.15, less than 0.1, less than 0.05, or less than 0.01, as measured at incidence angles of 0 to 10 degrees through the outer and inner primary surfaces of the at least one substrate and the inner and outer optical film structures (and any organic and/or intervening layers), if present. In some aspects, the transmitted color is 0.01-0.3, 0.01-0.25, 0.01-0.2, 0.01-0.15, 0.01-0.1, 0.01-0.05, 0.05-0.3, 0.05-0.25, 0.05-0.2, 0.05-0.15, 0.05-0.1, 0.1-0.3, 0.1-0.25, 0.1-0.2, 0.1-0.15, 0.15-0.3, 0.15-0.25, 0.15-0.2, 0.2-0.3, 0.2-0.25, or 0.25-0.3, as measured at incidence angles of 0 to 10 degrees through the outer and inner primary surfaces of the at least one substrate and the inner and outer optical film structures (and any organic and/or intervening layers), if present.

According to some aspects, the cover glass articles 100 depicted in FIGS. 1A, 1B, and 1C, and variations thereof, may exhibit an average reflectance of less than 8%, less than 7%, less than 6%, less than 5%, less than 4%, less than 3%, less than 2%, or less than 1.5%, as measured from 400-700 nm at an incident angle of 0 degrees or at one or more incident angles (e.g., at all incident angles) from 0 to 10 degrees through the outer and inner primary surfaces of the at least one substrate and the inner and outer optical film structures (and any organic and/or intervening layers), if present. In some aspects, the average reflectance (%) is 0.5-8, 0.5-7, 0.5-6, 0.5-5, 0.5-4, 0.5-3, 0.5-2, 0.5-1, 1-8, 1-7, 1-6, 1-5, 1-4, 1-3, 1-2, 2-8, 2-7, 2-6, 2-5, 2-4, 2-3, 3-8, 3-7, 3-6, 3-5, 3-4, 4-8, 4-7, 4-6, 4-5, 5-8, 5-7, 5-6, 6-8, 6-7, or 7-8, as measured from 400-700 nm at an incident angle of 0 degrees or at one or more incident angles (e.g., at all incident angles) from 0 to 10 degrees through the outer and inner primary surfaces of the at least one substrate and the inner and outer optical film structures (and any organic and/or intervening layers), if present.

Any of the average transmittance, visible photopic average transmittance, transmitted color, or average reflectance values disclosed herein (e.g. at any incident angle disclosed herein) can be combined in any manner to form a combination of such values to describe a cover glass article.

Figure 2:
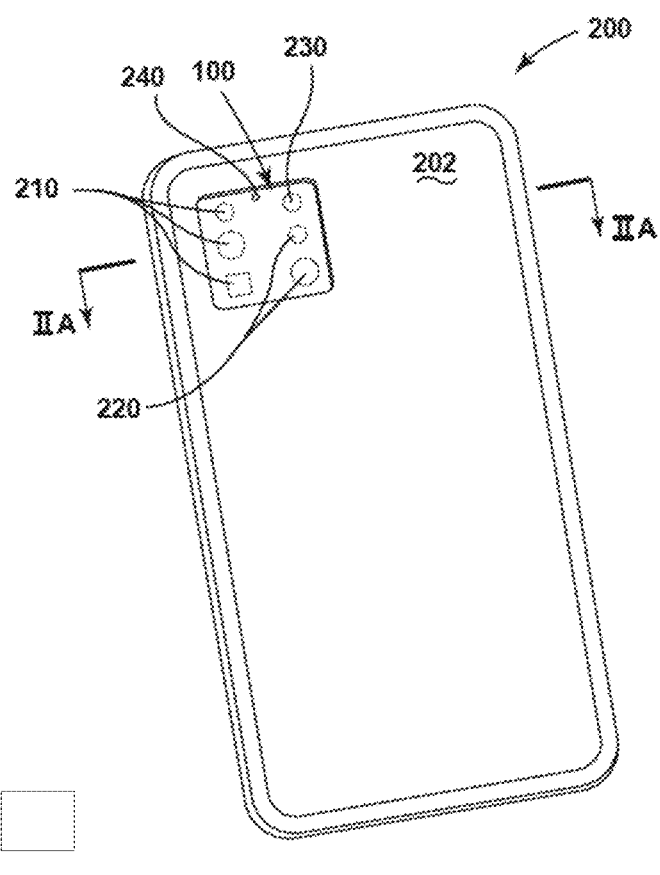
FIG. 2 is a perspective view of an apparatus (e.g., a mobile phone) with a housing, two or more of a camera, a sensor, and a light source, and a cover glass article, according to an aspect of the disclosure.
Figure 2A:
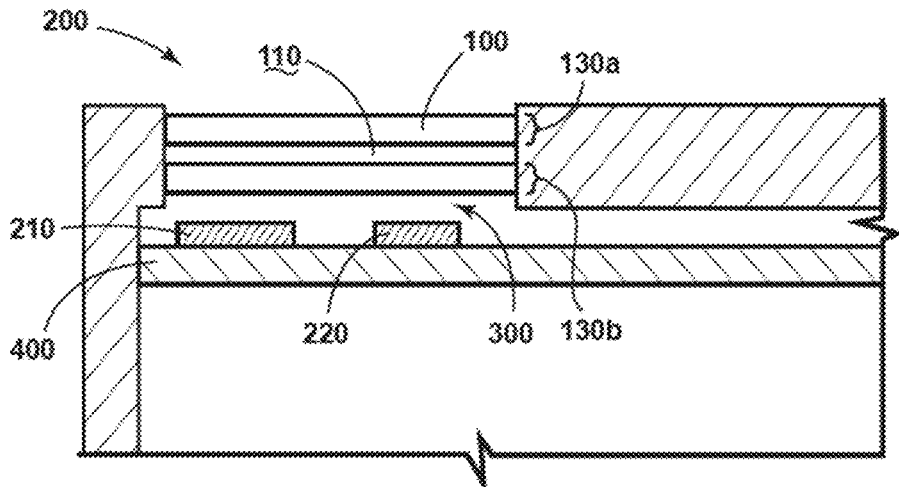
FIG. 2A is a cross-sectional view of the apparatus depicted in FIG. 2 along line IIA-IIA.

Referring now to FIGS. 2 and 2A, an apparatus 200 is provided with a housing 202, two or more of lens 210 (e.g., for a visible light camera), sensor 220 (e.g., an infrared sensor), and a light source 230, and a cover glass article 100 (e.g., as shown in FIGS. 1A, 1B, and 1C, and described above), according to an aspect of the disclosure. In other aspects, the apparatus 200 is provided with one or more of a lens 210, sensor 220 and a light source 230. In some implementations, the apparatus 200 includes a microphone 240, as also depicted in FIG. 2. Further, apparatus 200 can be a mobile phone, smart phone, computer tablet, hand-held electronic device, vehicular display or any other electronic device with a display, camera, light source and/or sensor. According to some additional implementations, the apparatus 200 depicted in FIGS. 2 and 2A can be envisioned as an architectural article, transportation article (e.g., an article used in automotive applications, trains, aircraft, sea craft, etc.), an appliance article, or any article that requires some transparency, scratch resistance, abrasion resistance, or a combination thereof and, further, employs a cover glass article 100 of the disclosure.

Referring again to FIGS. 2 and 2A, an apparatus 200 is depicted that includes: a housing 202; at least one lens 210, at least one sensor 220, and a light source 230 configured within the housing 202; and a substrate 110 within the housing 202, wherein the substrate 110 comprises an outer primary surface 112 and an inner primary surface 114 (see FIGS. 1A, 1B, and 1C), the outer primary and inner primary surfaces 112, 114 opposite of one another, and the substrate 110 is disposed over the at least one lens 210, the at least one sensor 220, and the light source 230. Further, the outer primary surface 112 of the substrate 110 has an outer optical film structure 130a disposed thereon; and the inner primary surface 114 of the substrate 110 has an inner optical film structure 130b disposed thereon. In addition, the outer optical film structure 130a comprises a first plurality of alternating high index and low index layers 130B, 130A, the first plurality comprising an outermost low index layer (e.g., a capping layer 131, as shown in FIGS. 1A and 1B). Further, in some instances this outermost low index layer is exposed to air. Alternatively, the outermost low index layer can be covered by a top coating 140. Further, the inner optical film structure 130b comprises a second plurality of alternating high index and low index layers 130B, 130A, the second plurality comprising a low or high index layer (130A or 130B) disposed on the inner primary surface 114 of the substrate 110, and an innermost low or high index layer disposed over, and with an air gap 300 therebetween, the at least one lens 210, the at least one sensor 220, and the light source 230. In some aspects, at least a portion of the high index layers 130B of the first and second pluralities, if present, can independently comprise an oxide, a nitride, an oxynitride, any other material disclosed herein, or any combination thereof. In some aspects, at least a portion of the low refractive index layers of the first and second pluralities, if present, can independently comprise an oxide, a nitride, an oxynitride, a metal fluoride, any other material disclose herein, or any combination thereof. In addition, the substrate 110 and the outer and inner optical film structures 130a, 130b together exhibit any of the transmittance, reflectance, and/or transmitted color values disclosed elsewhere herein. Further, in some aspects, the substrate 110 and the outer and inner optical film structures 130a, 130b exhibit a maximum hardness of greater than 8 GPa, as measured by a Berkovich Hardness Test over an indentation depth range from about 100 nm to about 500 nm in at least one of the outer optical film structure 130a and the inner optical film structure 130b, if present.

Figure 2B:
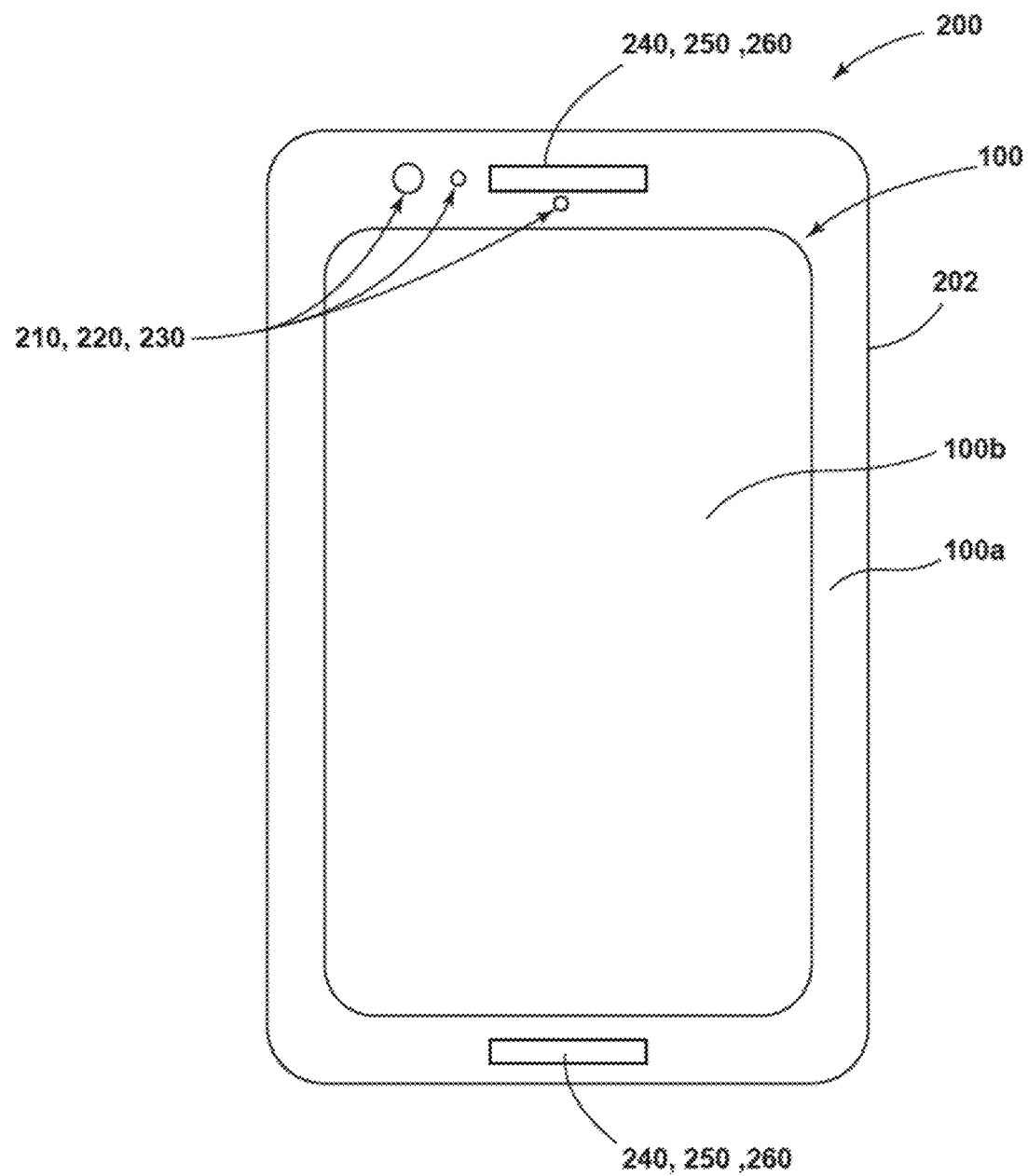
FIG. 2B is a perspective view of an apparatus (e.g., a mobile phone) with a housing, one or more of a camera, a sensor, and a light source, and a cover glass article with a portion having optical film structures according to the disclosure over the camera(s), sensor(s) and light source(s), according to an aspect of the disclosure.
Figure 2C:
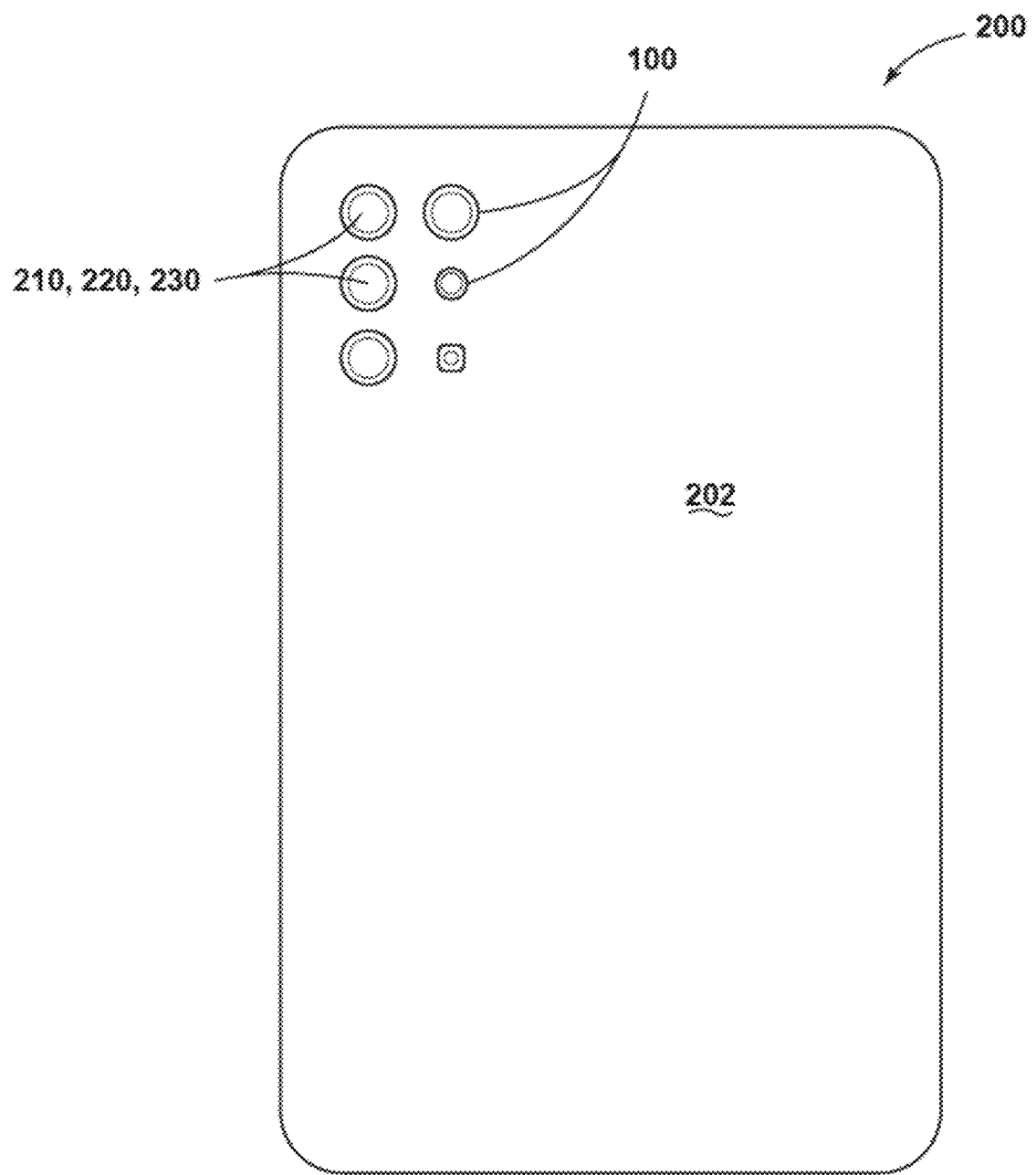
FIG. 2C is a perspective view of an apparatus (e.g., a mobile phone) with a housing, one or more of a camera, a sensor, and a light source, and cover glass articles according to the disclosure over each of the camera(s), sensor(s) and light source(s), according to an aspect of the disclosure.
Figure 2D:
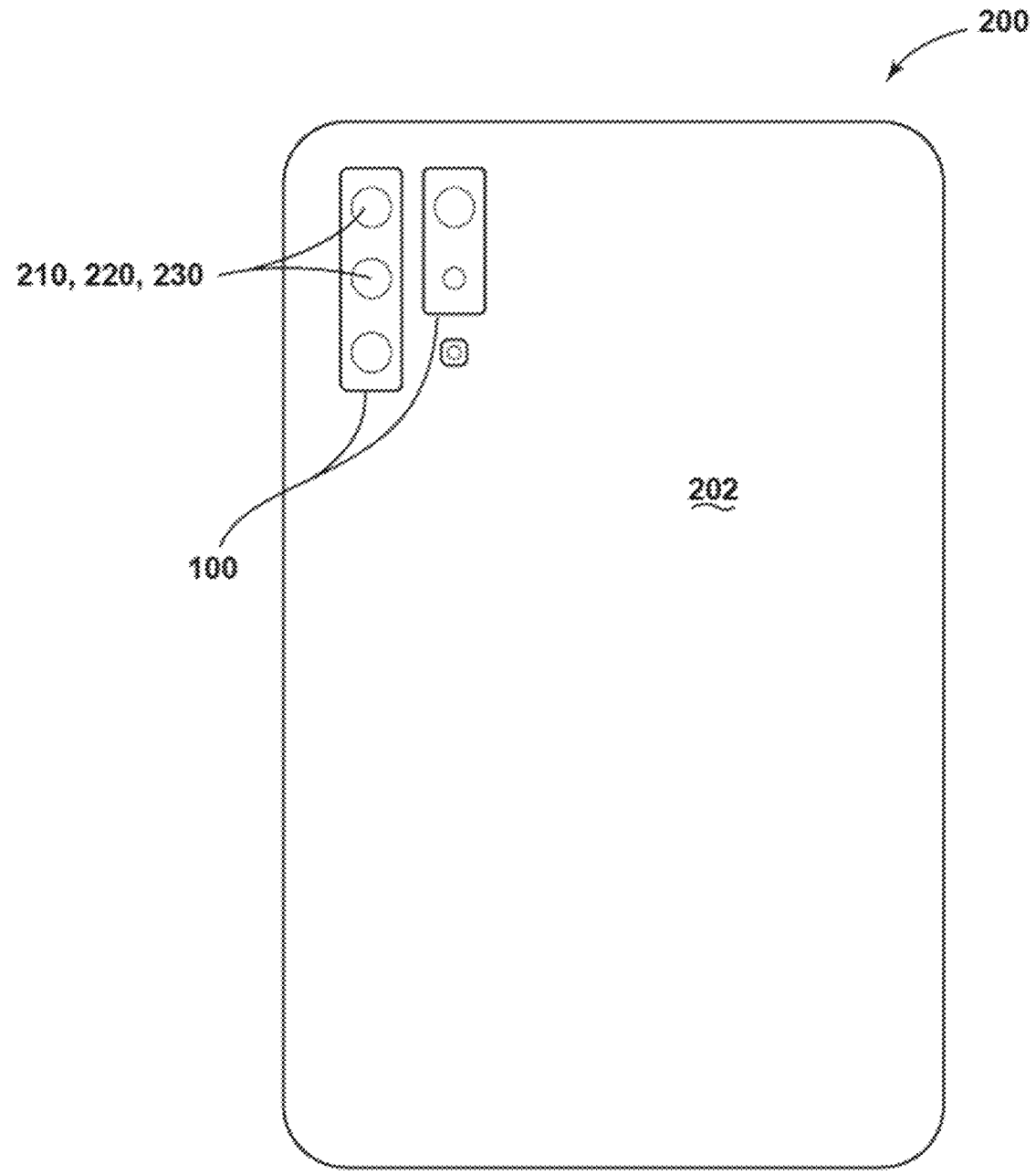
FIG. 2D is a perspective view of an apparatus (e.g., a mobile phone) with a housing, one or more of a camera, a sensor, and a light source, and cover glass articles according to the disclosure over one or more of the camera(s), sensor(s) and light source(s), according to an aspect of the disclosure.

As noted earlier, FIGS. 2 and 2A depict an apparatus 200 where a single cover glass article 100, having at least one of optical film structures 130a, 130b coatings on its primary surfaces 112, 114, is used as a durable, optically transparent cover to protect one or more cameras and sensors. Additional apparatus 200 configurations can be considered that employ cover glass articles 100 of the disclosure, as depicted in FIGS. 2B-2D. For example, as depicted in FIG. 2B, an apparatus 200 can include a housing 202, one or more of a lens 210, a sensor 220, and a light source 230 together with a display region (not shown, but underneath the display portion 100b), and a cover glass article 100 that includes an optical film portion 100a having optical film structures 130a, 130b over the lens(es) 210, sensor(s) 220 and light source(s) 230; and the display portion 100b. Optionally, the apparatus 200 may also include one or more microphones 240, speakers 250 and/or buttons 260, which are also covered by the optical film portion 100a of the cover glass article 100 having the optical film structures 130a, 130b, or these microphones 240, speakers 250 and/or buttons 260 may be exposed holes or have a different cover material that is not the same as the cover glass article 100, In these configurations, the cover glass article 100 also may be configured such that the display portion 100b (e.g., in a display region of the device) has only one of optical film structures 130a, 130b, an optical film coating that differs from the film structures 130a, 130b, or no optical film coating. In such configurations, the cover glass article 100 employed in this apparatus 200 can be utilized on the front cover of a smartphone, tablet, laptop, smartwatch, or similar device having a display adjacent to one or more sensors which can be cameras or infrared (IR) sensors, together with optional visible or IR light emitters/light sources. In this application, the dual-sided optical film structures 130a, 130b may be present in the optical film portion 100a of the cover glass article 100, as situated only over the lens 210 or sensor 220 portion of the apparatus 200, Hence, the cover glass article 100 may include a one or more substrates 110 with different coatings in different areas (e.g., in the optical film portion 100a, display portion 100b, etc.), or coatings in one area and no coatings in another area.

Referring again to the apparatus 200 depicted in FIGS. 2A-2D, at least some portion of the cover glass article 100 comprises at least one substrate 110 with at least one of optical film structures 130a, 130b on respective primary surfaces 112, 114 of the at least one substrate 110, as embodied by the Examples that follow below. Alternately, there could be multiple pieces of substrate 110 in the different areas of the cover glass article 100 (not shown). Optionally and preferably for some applications, the cover glass article 100 may include a single substrate 110 over both the display and one or more lenses 210 or sensors 220, with a single-side hard-coating of the display portion 100b present over the display region of the device, while the two-sided coating of the optical film structures 130a, 130b of the optical film portion 100a is present over one or more lenses 210 or sensors 220. The single-side hard-coating in the display portion 100b may be the same as the outer optical film structure 130a on the outer primary surface 112 of the substrate 110 (or the same as the inner optical film structure 130b on the inner primary surface 114 of the substrate 110) detailed in the disclosure and/or the following Examples, while an optical film portion 100a of the cover glass article 100 over one or more lenses 210 or sensors 220 incorporates the two-sided coatings of the optical film structures 130a, 130b, as detailed in the disclosure and/or in the following Examples. The rear side of the cover glass article 100 within the display portion 100b of the apparatus 200 may be optically bonded with an adhesive between the rear side of the substrate 110 and the display region, with no optical film structure 130b on the rear of the substrate 110 in this display region.

In another aspect of the disclosure, an apparatus 200 is depicted in FIG. 2C with a housing 202, one or more of a lens 210, a sensor 220, and a light source 230, and multiple cover glass articles 100, with each article 100 over each of the lens(es) 210, sensor(s) 220 and light source(s) 230. Similarly, according to another aspect of the disclosure, an apparatus 200 is depicted in FIG. 2D with housing 202, one or more of a lens 210, a sensor 220, and a light source 230, and multiple cover glass articles 100 over one or more of the lens(es) 210, sensor(s) 220 and light source(s) 230. As such, each of the apparatus 200 depicted in FIGS. 2C and 2D may include a cover glass article 100, as utilized on, for example, the back, non-display side of a smartphone, tablet, laptop, smartwatch, or similar device. Separately cut pieces of cover glass articles 100, as outlined in the disclosure, may cover individual or multiple sensors, cameras and/or light sources. The multiple pieces of the cover glass article 100 may be the same, having the same optics, hardness, and 1- or 2-sided coating structure(s) (i.e., as of the optical film structures 130a, 130b). Alternately, the multiple pieces of the cover glass article 100 could have different coatings or coating combinations. For example, one piece of the cover glass article 100 may have a 1- or 2-sided coating with optical film structures facilitating high visible transmission and low IR transmission, while another cover glass article 100 over another sensor or lens may be uncoated, may have a 1- or 2-sided coating, and/or may have high transmission in the IR wavelength range and low or high transmission in the visible wavelength range, or any other wavelength-selective optical effects. In a further aspect, a cover glass article as disclosed herein with 1- or 2-sided coatings having high visible transmission and low IR transmission (e.g., covering a visible light camera sensor) can be combined in an apparatus with another cover glass article covering one or more infrared sensors, in which this other cover glass article has high IR transmission and cither high or low visible light transmission.

In some aspects, an apparatus comprising a cover glass article disclosed herein comprises a camera, a sensor display assembly, or a combination thereof. In some aspects, the apparatus comprises a visible light detector or visible light imaging component, and the visible light detector or visible light imaging component is not configured in combination with an infrared light filter (e.g., other than a cover glass article herein that has IR filtering properties). In some aspects, the apparatus is a smartwatch, a smartphone, smart glasses, a vehicle camera system, a display, or a camera.

Figure 3:
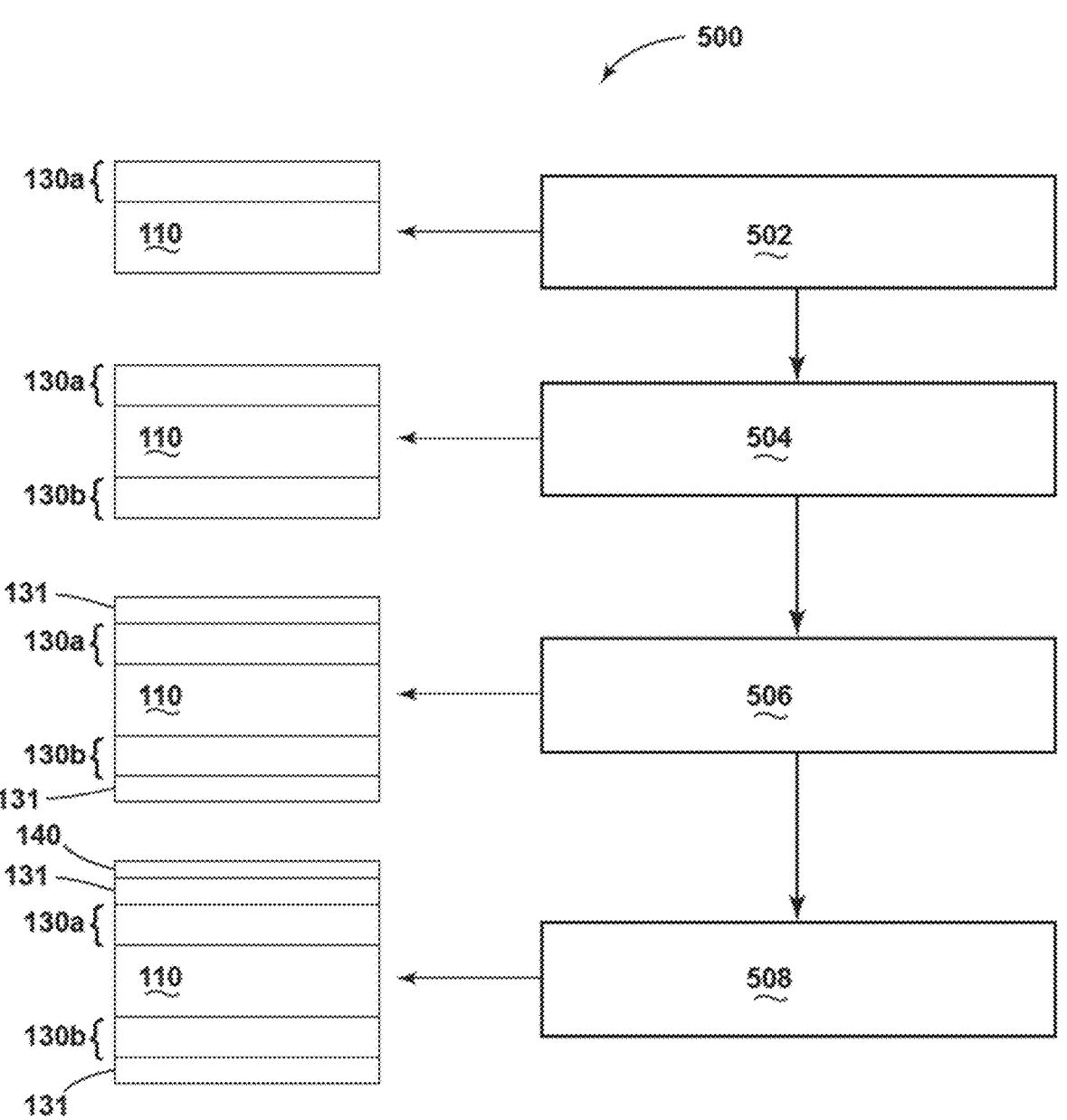
FIG. 3 is a schematic of a method of making cover glass articles, according to aspects of the disclosure.

Referring now to FIG. 3, a method 500 of making a cover glass article 100 (see FIGS. 1A, 1B, and 1C, and description elsewhere herein) is depicted in schematic form. In particular, the method 500 includes a step 502 of forming an outer optical film structure 130a over the outer primary surface 112 of a substrate 110; and step 504 of forming an inner optical film structure 130b over the inner primary surface 114 of the substrate 110. It should be understood that steps 502 and 504 can be conducted in reverse order or simultaneously, according to some aspects of the method 500 depicted in FIG. 3. In addition, the method 500 includes an optional step 506 of forming a capping layer 131 over the outer and/or inner optical film structure 130a, 130b. The method 500 may also include an optional step 508 of forming a top coating 140 over the outer optical film structure 130a. In addition, each of the steps 502-508 may be conducted by a vacuum deposition technique such as, for example, chemical vapor deposition (e.g., plasma enhanced chemical vapor deposition (PECVD), low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation and/or atomic layer deposition. Liquid-based methods may also be used such as spraying, dipping, spin coating, or slot coating (e.g., using sol-gel materials). Generally, vapor deposition techniques employed in steps 502-508 may include a variety of vacuum deposition methods which can be used to produce thin films. For example, physical vapor deposition uses a physical process (such as heating or sputtering) to produce a vapor of material, which is then deposited on the object which is coated. Preferred methods of fabricating the outer and inner optical film structures 130a and 130b according to steps 502 and 504 include reactive sputtering, metal-mode reactive sputtering and PECVD processes. Finally, it should be understood that the substrate 100 can optionally be chemically strengthened, as outlined earlier in the disclosure, before steps 502-508 of the method 500.

In some aspects, a method of making a cover glass article comprises a first disposing step and/or a second disposing step, in which the first disposing step comprises disposing the outer optical film structure on the outer primary surface and the second disposing step comprises disposing the inner optical film structure on the inner primary surface. Any methods disclosed herein can be utilized for the first and second disposing steps, including vacuum deposition and/or liquid-based deposition. Vacuum deposition comprises chemical vapor deposition, physical vapor deposition, thermal evaporation, e-beam evaporation, atomic layer deposition, or any combination thereof, whereas liquid-based deposition comprises spraying, dipping, spin coating, slot coating, or any combination thereof. Vacuum and liquid-based deposition techniques can be combined in any manner. In some aspects it is desirable to use reactive sputtering, metal-mode reactive sputtering, thermal evaporation, e-beam evaporation, ion-beam enhanced evaporation, plasma-enhanced chemical vapor deposition (PECVD), or any combination thereof as part of the first and/or second disposing steps. It is also contemplated that the inner and outer optical film structures can be formed simultaneously by performing the first and second disposing steps at substantially the same time. In some aspects, it is contemplated to alternate between forming one or more portions of the inner optical film structure and forming one or more portions of the outer optical film structure, in any order.

Various aspects are contemplated herein, several of which are set forth in the paragraphs below. It is explicitly contemplated that any aspect or portion thereof can be combined to form a combination.

Aspect 1. A cover glass article, comprising:

at least one substrate comprising an outer primary surface and an inner primary surface opposite the outer primary surface; and at least one of:

an outer optical film structure disposed on the outer primary surface, the outer optical film structure comprising a first plurality of alternating high refractive index and low refractive index layers; and an inner optical film structure disposed on the inner primary surface, the inner optical film structure comprising a second plurality of alternating high refractive index and low refractive index layers;

wherein at least a portion of the high refractive index layers of the first and second pluralities, if present, independently is an oxide, a nitride, an oxynitride, or any combination thereof;

wherein at least a portion of the low refractive index layers of the first and second pluralities, if present, independently is an oxide, a nitride, an oxynitride, a metal fluoride, or any combination thereof;

wherein each high refractive index layer of the first and second pluralities, if present, can be the same or different, and each low refractive index layer of the first and second pluralities, if present, can be the same or different;

wherein the cover glass article exhibits:

(1) an average transmittance of at least 92%, as measured from 400-700 nm at one or more incident angles (e.g., at all incident angles) from 0 to 30 degrees; and (2) at least one of:

an average transmittance of less than 50%, as measured from 930-950 nm at an incident angle of 0 degrees or at one or more incident angles (e.g., at all incident angles) from 0 to 10 degrees; and an average transmittance of less than 50%, as measured from 900-1200 nm at an incident angle of 0 degrees or at one or more incident angles (e.g., at all incident angles) from 0 to 10 degrees;

wherein each transmittance is measured through the outer and inner primary surfaces of the at least one substrate and the inner and outer optical film structures, if present.

Aspect 2. The cover glass article of aspect 1, or any preceding aspect, wherein the cover glass article exhibits at least one of:

a visible photopic average transmittance of at least 92% at an incident angle of 0 degrees or at one or more incident angles (e.g., at all incident angles) from 0 to 10 degrees;

an average transmittance of less than 60%, as measured from 800-1300 nm at an incident angle of 0 degrees or at one or more incident angles (e.g., at all incident angles) from 0 to 10 degrees;

an average transmittance of less than 60%, as measured from 850-1250 nm at an incident angle of 0 degrees or at one or more incident angles (e.g., at all incident angles) from 0 to 10 degrees; and an average transmittance of less than 50%, as measured from 900-1100 nm at an incident angle of 0 degrees or at one or more incident angles (e.g., at all incident angles) from 0 to 10 degrees;

wherein each transmittance is measured through the outer and inner primary surfaces of the at least one substrate and the inner and outer optical film structures, if present.

Aspect 3. The cover glass article of aspect 1 or 2, or any preceding aspect, wherein the cover glass article exhibits at least one of:

an average transmittance of at least 92%, as measured from 400-700 nm at one or more incident angles (e.g., at all incident angles) from 0 to 40 degrees;

an average transmittance of at least 80%, as measured from 400-700 nm at one or more incident angles (e.g., at all incident angles) from 0 to 60 degrees;

an average transmittance of less than 50%, as measured from 930-950 nm at one or more incident angles (e.g., at all incident angles) from 0 to 30 degrees; and an average transmittance of less than 50%, as measured from 930-950 nm at one or more incident angles (e.g., at all incident angles) from 0 to 60 degrees;

wherein each transmittance is measured through the outer and inner primary surfaces of the at least one substrate and the inner and outer optical film structures, if present.

Aspect 4. The cover glass article of any one of aspects 1-3, or any preceding aspect, wherein the cover glass article exhibits at least one of:

an average transmittance of at least 94%, as measured from 400-700 nm at one or more incident angles (e.g., at all incident angles) from 0-20 degrees;

an average transmittance of less than 42%, as measured from 930-950 nm at one or more incident angles (e.g., at all incident angles) from 0 to 50 degrees; and an average transmittance of less than 40%, as measured from 900-1200 nm at an incident angle of 0 degrees or at one or more incident angles (e.g., at all incident angles) from 0 to 10 degrees;

wherein each transmittance is measured through the outer and inner primary surfaces of the at least one substrate and the inner and outer optical film structures, if present.

Aspect 5. The cover glass article of any one of aspects 1-4, or any preceding aspect, wherein the cover glass article exhibits at least one of:

an average transmittance of at least 97%, as measured from 400-700 nm at one or more incident angles (e.g., at all incident angles) from 0 to 20 degrees;

an average transmittance of less than 8%, as measured from 930-950 nm at an incident angle of 0 degrees or at one or more incident angles (e.g., at all incident angles) from 0 to 10 degrees; and an average transmittance of less than 12%, as measured from 900-1200 nm at an incident angle of 0 degrees or at one or more incident angles (e.g., at all incident angles) from 0 to 10 degrees;

wherein each transmittance is measured through the outer and inner primary surfaces of the at least one substrate and the inner and outer optical film structures, if present.

Aspect 6. The cover glass article of any one of aspects 1-5, or any preceding aspect, wherein the cover glass article exhibits at least one of:

a transmitted color $\sqrt{(a^{*2}+b^{*2})}$ with a D65 illuminant of less than 4 at one or more incident angles (e.g., at all incident angles) from 0 degrees to 40 degrees; and a transmitted color $\sqrt{(a^{*2}+b^{*2})}$ with a D65 illuminant of less than 0.5 at one or more incident angles (e.g., at all incident angles) from 0 degrees to 20 degrees;

wherein each transmitted color is measured through the outer and inner primary surfaces of the at least one substrate and the inner and outer optical film structures, if present.

Aspect 7. The cover glass article of any one of aspects 1-6, or any preceding aspect, wherein the cover glass article exhibits an average reflectance of less than 8%, as measured from 400-700 nm at an incident angle of 0 degrees or at one or more incident angles (e.g., at all incident angles) from 0 to 10 degrees, wherein the reflectance is measured through the outer and inner primary surfaces of the at least one substrate and the inner and outer optical film structures, if present.

Aspect 8. The cover glass article of any one of aspects 1-7, or any preceding aspect, wherein the at least one substrate is one substrate.

Aspect 9. The cover glass article of any one of aspects 1-8, or any preceding aspect, wherein the at least one substrate comprises glass.

Aspect 10. The cover glass article of any one of aspects 1-9, or any preceding aspect, wherein the cover glass article exhibits a maximum hardness of at least 8 GPa, as measured by a Berkovich Hardness Test over an indentation depth range from about 100 nm to about 500 nm in at least one of the outer optical film structure and the inner optical film structure, if present.

Aspect 11. The cover glass article of any one of aspects 1-10, or any preceding aspect, wherein at least a portion of the high refractive index layers of the first and second pluralities, if present, independently is $SiAl_xO_yN_z$, $Ta_2O_5$, $Nb_2O_5$, AlN, $AlN_x$, $SiAl_xN_y$, $AlN_x/SiAl_xN_y$, $Si_3N_4$, $AlO_xN_y$, $SiO_xN_y$, $SiN_x$, $SiN_x:H_y$, $HfO_2$, $TiO_2$, $ZrO_2$, $Y_2O_3$, $Al_2O_3$, $MoO_3$, diamond-like carbon, or any combination thereof.

Aspect 12. The cover glass article of any one of aspects 1-11, or any preceding aspect, wherein at least a portion of the low refractive index layers of the first and second pluralities, if present, independently is $SiO_2$, doped $SiO_2$, $Al_2O_3$, $SiAl_xO_y$, $GeO_2$, SiO, $AlO_xN_y$, $SiO_xN_y$, $SiAl_xO_yN_z$, MgO, $MgAl_xO_y$, $MgF_2$, $BaF_2$, $CaF_2$, $DyF_3$, $YbF_3$, $YF_3$, $CeF_3$, or any combination thereof.

Aspect 13. The cover glass article of any one of aspects 1-12, or any preceding aspect, wherein the outer optical film structure is present and at least a portion of the first plurality is $SiO_2$, $SiN_x$, $SiO_xN_y$, or any combination thereof.

Aspect 14. The cover glass article of any one of aspects 1-13, or any preceding aspect, wherein the inner optical film structure is present and at least a portion of the second plurality is $SiO_2$, $TiO_2$, $Nb_2O_5$, $MgF_2$, or any combination thereof.

Aspect 15. The cover glass article of any one of aspects 1-14, or any preceding aspect, wherein at least one of:

the outer optical film structure is present and the first plurality comprises at least 3 individual layers selected from the high and low refractive index layers of the first plurality each having a physical thickness of at least 100 nm, optionally wherein the at least 3 individual layers are adjacent to one another; and the inner optical film structure is present and the second plurality comprises at least 3 individual layers selected from the high and low refractive index layers of the second plurality each having a physical thickness of at least 100 nm, optionally wherein the at least 3 individual layers are adjacent to one another.

Aspect 16. The cover glass article of any one of aspects 1-15, or any preceding aspect, wherein at least one of:

the outer optical film structure is present and the first plurality comprises at least 4 individual layers selected from the high and low refractive index layers of the first plurality each having a physical thickness of at least 100 nm, optionally wherein the at least 4 individual layers are adjacent to one another; and the inner optical film structure is present and the second plurality and comprises at least 4 individual layers selected from the high and low refractive index layers of the second plurality each having a physical thickness of at least 100 nm, optionally wherein the at least 4 individual layers are adjacent to one another.

Aspect 17. The cover glass article of any one of aspects 1-16, or any preceding aspect, wherein at least one of:

the outer optical film structure is present and the first plurality comprises at least 4 individual layers selected from the high and low refractive index layers of the first plurality each having a physical thickness of 100-200 nm, optionally wherein the at least 4 individual layers are adjacent to one another; and the inner optical film structure is present and the second plurality comprises at least 4 individual layers selected from the high and low refractive index layers of the second plurality each having a physical thickness of 100-200 nm, optionally wherein the at least 4 individual layers are adjacent to one another.

Aspect 18. The cover glass article of any one of aspects 1-17, or any preceding aspect, wherein at least one of:

the outer optical film structure is present and the first plurality comprises at least 2 individual low refractive index layers each having a physical thickness of 100-200 nm and a refractive index of less than 1.55; and the inner optical film structure is present and the second plurality comprises at least 2 individual low refractive index layers each having a physical thickness of 100-200 nm and a refractive index of less than 1.55.

Aspect 19. The cover glass article of any one of aspects 1-18, or any preceding aspect, wherein at least one of:

the outer optical film structure is present and the first plurality comprises at least 2 individual high refractive index layers each having a physical thickness of at least 80 nm and a refractive index of at least 2.1; and the inner optical film structure is present and the second plurality comprises at least 2 individual high refractive index layers each having a physical thickness of at least 80 nm and a refractive index of at least 2.1.

Aspect 20. The cover glass article of any one of aspects 1-19, or any preceding aspect, wherein at least one of:

the outer optical film structure is present and the first plurality comprises: (a) at least 4 individual layers selected from high and low refractive index layers of the first plurality each having a physical thickness of 100-200 nm; (b) at least 2 individual low refractive index layers each having a physical thickness of 100-200 nm; and (c) at least 2 individual high refractive index layers each having a physical thickness of at least 80 nm and a refractive index of at least 2.1; and the inner optical film structure is present and the second plurality comprises: (a) at least 4 individual layers selected from high and low refractive index layers of the second plurality each having a physical thickness of 100-200 nm; (b) at least 2 individual low refractive index layers each having a physical thickness of 100-200 nm; and (c) at least 2 individual high refractive index layers each having a physical thickness of at least 80 nm and a refractive index of at least 2.1.

Aspect 21. The cover glass article of aspect 20, or any preceding aspect, wherein, in the first plurality, the second plurality, or both, each of the (c) at least 2 individual high refractive index layers independently is $TiO_2$ or $Nb_2O_5$.

Aspect 22. The cover glass article of any one of aspects 1-21, or any preceding aspect, wherein the inner optical film structure is present.

Aspect 23. The cover glass article of any one of aspects 1-22, or any preceding aspect, wherein the outer optical film structure is present.

Aspect 24. The cover glass article of any one of aspects 1-23, or any preceding aspect, wherein both the inner and outer optical film structures are present.

Aspect 25. The cover glass article of any one of aspects 1-24, or any preceding aspect, further comprising an organic layer disposed between at least one of:

the outer primary surface and the first plurality, if present; and the inner primary surface and the second plurality, if present.

Aspect 26. The cover glass article of aspect 25, or any preceding aspect, wherein the organic layer comprises a polyimide, a silicone, a siloxane, or any combination thereof.

Aspect 27. The cover glass article of any one of aspects 1-26, or any preceding aspect, wherein at least one of:

the outer optical film structure is present and a sum total physical thickness of the high refractive index layers in the first plurality is less than 50% of a sum total physical thickness of the high refractive index layers and the low refractive index layers in the first plurality; and the inner optical film structure is present and a sum total physical thickness of the high refractive index layers in the second plurality is less than 50% of a sum total physical thickness of the high refractive index layers and the low refractive index layers in the second plurality.

Aspect 28. The cover glass article of any one of aspects 1-27, or any preceding aspect, wherein at least one of the first plurality and the second plurality has a sum total physical thickness of 400 nm to 5000 nm.

Aspect 29. The cover glass article of any one of aspects 1-28, or any preceding aspect, wherein at least one of:

the outer optical film structure is present and the first plurality comprises an outermost low refractive index layer, optionally further comprising an outermost easy-to-clean coating; and the inner optical film structure is present and the second plurality comprises an innermost low refractive index layer.

Aspect 30. The cover glass article of any one of aspects 1-29, or any preceding aspect, wherein at least one of:

the outer optical film structure is present and the first plurality comprises a low refractive index layer in direct contact with the outer primary surface; and the inner optical film structure is present and the second plurality comprises a low refractive index layer in direct contact with the inner primary surface.

Aspect 31. The cover glass article of any one of aspects 1-30, or any preceding aspect, wherein each high refractive index and low refractive index layer in the first and second pluralities, if present, has a physical thickness of from 5-500 nm.

Aspect 32. The cover glass article of any one of aspects 1-31, or any preceding aspect, wherein at least one of the first plurality and second plurality further comprises a scratch-resistant high refractive index layer having a physical thickness of at least 50 nm.

Aspect 33. The cover glass article of any one of aspects 1-32, or any preceding aspect, wherein at least one of the first and second pluralities has a sum total of the high refractive index and low refractive index layers of at least 5 layers.

Aspect 34. The cover glass article of any one of aspects 1-33, or any preceding aspect, wherein at least one of the first and second pluralities has a sum total of the high refractive index and low refractive index layers of at least 30 layers.

Aspect 35. The cover glass article of any one of aspects 1-34, or any preceding aspect, wherein both the first and second pluralities are present and have a different number of layers.

Aspect 36. A cover glass article, comprising:

at least one substrate comprising an outer primary surface and an inner primary surface opposite the outer primary surface; and at least one of:

an outer optical film structure disposed on the outer primary surface, the outer optical film structure comprising a first plurality of alternating high refractive index and low refractive index layers; and an inner optical film structure disposed on the inner primary surface, the inner optical film structure comprising a second plurality of alternating high refractive index and low refractive index layers;

wherein at least a portion of the high refractive index layers of the first and second pluralities, if present, independently is an oxide, a nitride, an oxynitride, or any combination thereof;

wherein at least a portion of the low refractive index layers of the first and second pluralities, if present, independently is an oxide, a nitride, an oxynitride, a metal fluoride, or any combination thereof;

wherein each high refractive index layer of the first and second pluralities, if present, can be the same or different, and each low refractive index layer of the first and second pluralities, if present, can be the same or different;

wherein the cover glass article exhibits:

(1) an average transmittance of at least 94%, as measured from 400-700 nm at one or more incident angles (e.g., at all incident angles) from 0 to 20 degrees; and (2) at least one of:

an average transmittance of less than 42%, as measured from 930-950 nm at one or more incident angles (e.g., at all incident angles) from 0 to 50 degrees; and an average transmittance of less than 40%, as measured from 900-1200 nm at an incident angle of 0 degrees or at one or more incident angles (e.g., at all incident angles) from 0 to 10 degrees;

wherein each transmittance is measured through the outer and inner primary surfaces of the at least one substrate and the inner and outer optical film structures, if present.

Aspect 37. The cover glass article of aspect 36, or any preceding aspect, wherein at least one of:

at least a portion of the high refractive index layers of the first and second pluralities, if present, independently is $SiAl_xO_yN_z$, $Ta_2O_5$, $Nb_2O_5$, AlN, $AlN_x$, $SiAl_xN_y$, $AlN_x/SiAl_xN_y$, $Si_3N_4$, $AlO_xN_y$, $SiO_xN_y$, $SiN_x$, $SiN_x{:}H_y$, $HfO_2$, $TiO_2$, $ZrO_2$, $Y_2O_3$, $Al_2O_3$, $MoO_3$, diamond-like carbon, or any combination thereof; and at least a portion of the low refractive index layers of the first and second pluralities, if present, independently is $SiO_2$, doped $SiO_2$, $Al_2O_3$, $SiAl_xO_y$, $GeO_2$, SiO, $AlO_xN_y$, $SiO_xN_y$, $SiAl_xO_yN_z$, MgO, $MgAl_xO_y$, $MgF_2$, $BaF_2$, $CaF_2$, $DyF_3$, $YbF_3$, $YF_3$, $CeF_3$, or any combination thereof.

Aspect 38. The cover glass article of aspect 36 or 37, or any preceding aspect, wherein at least one of:

the outer optical film structure is present and the first plurality comprises at least 3 individual layers selected from the high and low refractive index layers each having a physical thickness of at least 100 nm, optionally wherein the at least 3 individual layers are adjacent to one another; and the inner optical film structure is present and the second plurality comprises at least 3 individual layers selected from the high and low refractive index layers each having a physical thickness of at least 100 nm, optionally wherein the at least 3 individual layers are adjacent to one another.

Aspect 39. The cover glass article of any one of aspects 36-38, or any preceding aspect, wherein at least one of:

the outer optical film structure is present and the first plurality comprises: (a) at least 4 individual layers selected from high and low refractive index layers each having a physical thickness of 100-200 nm; (b) at least 2 individual low refractive index layers each having a physical thickness of 100-200 nm; and (c) at least 2 individual high refractive index layers each having a physical thickness of at least 80 nm and a refractive index of at least 2.1; and the inner optical film structure is present and the second plurality comprises: (a) at least 4 individual layers selected from high and low refractive index layers each having a physical thickness of 100-200 nm; (b) at least 2 individual low refractive index layers each having a physical thickness of 100-200 nm; and (c) at least 2 individual high refractive index layers each having a physical thickness of at least 80 nm and a refractive index of at least 2.1.

Aspect 40. The cover glass article of any one of aspects 36-39, or any preceding aspect, wherein:

the inner optical film structure is present;

the outer optical film structure is present; or both the inner and outer optical film structures are present.

Aspect 41. A cover glass article, comprising:

at least one substrate comprising an outer primary surface and an inner primary surface opposite the outer primary surface; and at least one of:

an outer optical film structure disposed on the outer primary surface, the outer optical film structure comprising a first plurality of alternating high refractive index and low refractive index layers; and an inner optical film structure disposed on the inner primary surface, the inner optical film structure comprising a second plurality of alternating high refractive index and low refractive index layers;

wherein at least a portion of the high refractive index layers of the first and second pluralities, if present, independently is an oxide, a nitride, an oxynitride, or any combination thereof;

wherein at least a portion of the low refractive index layers of the first and second pluralities, if present, independently is an oxide, a nitride, an oxynitride, a metal fluoride, or any combination thereof;

wherein each high refractive index layer of the first and second pluralities, if present, can be the same or different, and each low refractive index layer of the first and second pluralities, if present, can be the same or different;

wherein the cover glass article exhibits:

(1) an average transmittance of at least 97%, as measured from 400-700 nm at one or more incident angles (e.g., at all incident angles) from 0 to 20 degrees; and (2) at least one of:

an average transmittance of less than 8%, as measured from 930-950 nm at an incident angle of 0 degrees or at one or more incident angles (e.g., at all incident angles) from 0 to 10 degrees; and an average transmittance of less than 12%, as measured from 900-1200 nm at an incident angle of 0 degrees or at one or more incident angles (e.g., at all incident angles) from 0 to 10 degrees;

wherein each transmittance is measured through the outer and inner primary surfaces of the at least one substrate and the inner and outer optical film structures, if present.

Aspect 42. The cover glass article of aspect 41, or any preceding aspect, wherein at least one of:

at least a portion of the high refractive index layers of the first and second pluralities, if present, independently is $SiAl_xO_yN_z$, $Ta_2O_5$, $Nb_2O_5$, AlN, $AlN_x$, $SiAl_xN_y$, $AlN_x/SiAl_xN_y$, $Si_3N_4$, $AlO_xN_y$, $SiO_xN_y$, $SiN_x$, $SiN_x{:}H_y$, $HfO_2$, $TiO_2$, $ZrO_2$, $Y_2O_3$, $Al_2O_3$, $MoO_3$, diamond-like carbon, or any combination thereof; and at least a portion of the low refractive index layers of the first and second pluralities, if present, independently is $SiO_2$, doped $SiO_2$, $Al_2O_3$, $SiAl_xO_y$, $GeO_2$, SiO, $AlO_xN_y$, $SiO_xN_y$, $SiAl_xO_yN_z$, MgO, $MgAl_xO_y$, $MgF_2$, $BaF_2$, $CaF_2$, $DyF_3$, $YbF_3$, $YF_3$, $CeF_3$, or any combination thereof.

Aspect 43. The cover glass article of aspect 41 or 42, or any preceding aspect, wherein at least one of:

the outer optical film structure is present and the first plurality comprises at least 3 individual layers selected from the high and low refractive index layers each having a physical thickness of at least 100 nm, optionally wherein the at least 3 individual layers are adjacent to one another; and the inner optical film structure is present and the second plurality comprises at least 3 individual layers selected from the high and low refractive index layers each having a physical thickness of at least 100 nm, optionally wherein the at least 3 individual layers are adjacent to one another.

Aspect 44. The cover glass article of any one of aspects 41-43, or any preceding aspect, wherein at least one of:

the outer optical film structure is present and the first plurality comprises: (a) at least 4 individual layers selected from high and low refractive index layers each having a physical thickness of 100-200 nm; (b) at least 2 individual low refractive index layers each having a physical thickness of 100-200 nm; and (c) at least 2 individual high refractive index layers each having a physical thickness of at least 80 nm and a refractive index of at least 2.1; and the inner optical film structure is present and the second plurality comprises: (a) at least 4 individual layers selected from high and low refractive index layers each having a physical thickness of 100-200 nm; (b) at least 2 individual low refractive index layers each having a physical thickness of 100-200 nm; and (c) at least 2 individual high refractive index layers each having a physical thickness of at least 80 nm and a refractive index of at least 2.1.

Aspect 45. The cover glass article of any one of aspects 41-44, or any preceding aspect, wherein:

the inner optical film structure is present;

the outer optical film structure is present; or both the inner and outer optical film structures are present.

Aspect 46. An apparatus, comprising:

a housing;

at least one of a lens, a sensor, and a light source, each configured within the housing; and the cover glass article of any one of aspects 1-45, or any preceding aspect, disposed over the at least one of a lens, a sensor, and a light source.

Aspect 47. The apparatus of aspect 46, or any preceding aspect, wherein the apparatus further comprises a visible light detector or visible light imaging component, and the visible light detector or visible light imaging component is not configured in combination with an infrared light filter other than the cover glass article.

Aspect 48. The apparatus of aspect 46 or 47, or any preceding aspect, wherein the apparatus comprises a camera and/or sensor assembly.

Aspect 49. The apparatus of any one of aspects 46-48, or any preceding aspect, wherein the apparatus is a smartwatch, a smartphone, smart glasses, a vehicle camera system, a display, or a camera.

Aspect 50. A method for making the cover glass article of any one of aspects 1-45, or any preceding aspect, the method comprising:

a first disposing step, comprising disposing the outer optical film structure on the outer primary surface; and/or a second disposing step, comprising disposing the inner optical film structure on the inner primary surface.

Aspect 51. The method of aspect 50, or any preceding aspect, wherein at least one of the first and second disposing steps comprises vacuum deposition, liquid-based deposition, or a combination thereof.

Aspect 52. The method of aspect 51, or any preceding aspect, wherein the vacuum deposition comprises chemical vapor deposition, physical vapor deposition, thermal evaporation, e-beam evaporation, atomic layer deposition, or any combination thereof.

Aspect 53. The method of aspect 51 or 52, or any preceding aspect, wherein the liquid-based deposition comprises spraying, dipping, spin coating, slot coating, or any combination thereof.

Aspect 54. The method of any one of aspects 50-53, or any preceding aspect, wherein at least one of the first and second disposing steps comprises reactive sputtering, metal-mode reactive sputtering, thermal evaporation, e-beam evaporation, ion-beam enhanced evaporation, plasma-enhanced chemical vapor deposition (PECVD), or any combination thereof.

Aspect 55. A cover glass article, comprising:

at least one substrate comprising an outer primary surface and an inner primary surface opposite the outer primary surface;

an outer optical film structure disposed on the outer primary surface, the outer optical film structure comprising a first plurality of alternating high refractive index and low refractive index layers; and an inner optical film structure disposed on the inner primary surface, the inner optical film structure comprising a second plurality of alternating high refractive index and low refractive index layers;

wherein the outer optical film structure has an average compressive stress $\sigma_a$ and an average thickness $h_a$ resulting in a stress×thickness value $ST_a$ of at least 100 Pa·m;

wherein the inner optical film structure has an average compressive stress $\sigma_b$ and an average thickness $h_b$ resulting in a stress×thickness value $ST_b$ of at least 100 Pa·m; and wherein an absolute value of a difference between $ST_a$ and $ST_b$, calculated as $|ST_a-ST_b|$, is less than or equal to 500 Pa·m.

Aspect 56. The cover glass article of aspect 55, or any preceding aspect, wherein at least one of $ST_a$ and $ST_b$ is 3000 Pa·m or less.

Aspect 57. The cover glass article of aspect 55 or 56, or any preceding aspect, wherein each of the average compressive stress $\sigma_a$ and the compressive stress $\sigma_b$ is at least 100 MPa.

Aspect 58. The cover glass article of any one of aspects 55-57, or any preceding aspect, wherein each of the average compressive stress $\sigma_a$ and the compressive stress $\sigma_b$ is 200-2000 MPa.

Aspect 59. The cover glass article of any one of aspects 55-58, or any preceding aspect, wherein each of the average compressive stress $\sigma_a$ and the average compressive stress $\sigma_b$ is at least 500 MPa, and further wherein the flexural strength of the cover glass article as measured in a ring-on-ring strength test is at least 600 MPa.

Aspect 60. The cover glass article of any one of aspects 55-59, or any preceding aspect, wherein $|ST_a-ST_b|$ is 200 Pa·m or less.

Aspect 61. The cover glass article of any one of aspects 55-60, or any preceding aspect, wherein $|ST_a-ST_b|$ is 0-100 Pa·m.

Aspect 62. The cover glass article of any one of aspects 55-61, or any preceding aspect, wherein the first plurality comprises a first layer with a first thickness $h_{i1}$, the second plurality comprises a second layer with a second thickness $h_{i2}$, wherein each of the first and second thicknesses $h_{i1}$ and $h_{i2}$ is at least 200 nm.

Aspect 63. The cover glass article of any one of aspects 55-62, or any preceding aspect, wherein at least one of the first and second thicknesses $h_{i1}$ and $h_{i2}$ is at least 1000 nm.

Aspect 64. The cover glass article of any one of aspects 55-63, or any preceding aspect, wherein the first plurality and the second plurality each have a sum total physical thickness of 400 nm to 5000 nm.

Aspect 65. The cover glass article of any one of aspects 55-64, or any preceding aspect, wherein at least one of:

a sum total physical thickness of the high refractive index layers in the first plurality is at least 50% of a sum total physical thickness of the high refractive index layers and the low refractive index layers in the first plurality; and a sum total physical thickness of the high refractive index layers in the second plurality is at least 50% of a sum total physical thickness of the high refractive index layers and the low refractive index layers in the second plurality.

Aspect 66. The cover glass article of any one of aspects 55-65, or any preceding aspect, wherein the cover glass article is substantially planar.

Aspect 67. The cover glass article of any one of aspects 55-66, or any preceding aspect, wherein the inner optical film structure is the same as the outer optical film structure.

Aspect 68. The cover glass article of any one of aspects 55-66, or any preceding aspect, wherein the inner optical film structure is different than the outer optical film structure.

Aspect 69. The cover glass article of any one of aspects 55-68, or any preceding aspect, wherein at least a portion of the high refractive index layers of the first and second pluralities independently is $SiAl_xO_yN_z$, $Ta_2O_5$, $Nb_2O_5$, AlN, $AlN_x$, $SiAl_xN_y$, $AlN_x/SiAl_xN_y$, $Si_3N_4$, $AlO_xN_y$, $SiO_xN_y$, $SiN_x$, $SiN_x:H_y$, $HfO_2$, $TiO_2$, $ZrO_2$, $Y_2O_3$, $Al_2O_3$, $MoO_3$, diamond-like carbon, or any combination thereof.

Aspect 70. The cover glass article of any one of aspects 55-69, or any preceding aspect, wherein at least a portion of the low refractive index layers of the first and second pluralities independently is $SiO_2$, doped $SiO_2$, $Al_2O_3$, $SiAl_xO_y$, $GeO_2$, SiO, $AlO_xN_y$, $SiO_xN_y$, $SiAl_xO_yN_z$, MgO, $MgAl_xO_y$, $MgF_2$, $BaF_2$, $CaF_2$, $DyF_3$, $YbF_3$, $YF_3$, $CeF_3$, or any combination thereof.

Aspect 71. The cover glass article of any one of aspects 55-70, or any preceding aspect, wherein at least a portion of the high refractive index layers in the first and second pluralities comprise $SiN_x$, $SiO_xN_y$, or any combination thereof, and wherein at least a portion of the low refractive index layers in the first and second pluralities comprise $SiO_2$, $TiO_2$, $Nb_2O_5$, $MgF_2$, or any combination thereof.

Aspect 72. The cover glass article of any one of aspects 55-71, or any preceding aspect, wherein the at least one substrate comprises a glass or glass-ceramic having an elastic modulus of 50-150 GPa.

Aspect 73. The cover glass article of any one of aspects 55-72, or any preceding aspect, wherein the cover glass article exhibits:

(1) an average transmittance of at least 92%, as measured from 400-700 nm at one or more incident angles (e.g., at all incident angles) from 0 to 30 degrees; and (2) at least one of:

an average transmittance of less than 50%, as measured from 930-950 nm at an incident angle of 0 degrees or at one or more incident angels (e.g., at all incident angles) from 0 to 10 degrees; and an average transmittance of less than 50%, as measured from 900-1200 nm at an incident angle of 0 degrees or at one or more incident angles (e.g., at all incident angles) from 0 to 10 degrees;

wherein each transmittance is measured through the outer and inner primary surfaces of the at least one substrate and the inner and outer optical film structures.

Aspect 74. The cover glass article of any one of aspects 55-73, or any preceding aspect, wherein the cover glass article exhibits a maximum hardness of at least 8 GPa, as measured by a Berkovich Hardness Test over an indentation depth range from about 100 nm to about 500 nm in at least one of the outer optical film structure and the inner optical film structure.

Aspect 75. A method for making the cover glass article of any one of aspects 55-74, or any preceding aspect, the method comprising:

a first disposing step, comprising disposing the outer optical film structure on the outer primary surface, such that the outer optical film structure has the stress× thickness value $ST_a$; and a second disposing step, comprising disposing the inner optical film structure on the inner primary surface, such that the inner optical film structure has the stress× thickness value $ST_b$.

Aspect 76. The method of aspect 75, or any preceding aspect, wherein the $ST_a$ and $ST_b$ values result from at least one of (1) thermal mismatch between any two layers of the first and second pluralities, (2) thermal mismatch between the at least one substrate and any layer of the first and secondary pluralities, (3) an intrinsic characteristic of the first or second disposing step, or (4) any combination thereof.

Aspect 77. The method of aspect 75 or 76, or any preceding aspect, wherein at least one of the first and second disposing steps comprises vacuum deposition, liquid-based deposition, or a combination thereof.

Aspect 78. The method of aspect 77, or any preceding aspect, wherein the vacuum deposition comprises chemical vapor deposition, physical vapor deposition, thermal evaporation, e-beam evaporation, atomic layer deposition, or any combination thereof.

Aspect 79. The method of aspect 77 or 78, or any preceding aspect, wherein the liquid-based deposition comprises spraying, dipping, spin coating, slot coating, or any combination thereof.

Aspect 80. The method of any one of aspects 75-79, or any preceding aspect, wherein at least one of the first and second disposing steps comprises reactive sputtering, metal-mode reactive sputtering, thermal evaporation, e-beam evaporation, ion-beam enhanced evaporation, plasma-enhanced chemical vapor deposition (PECVD), or any combination thereof.

Aspect 81: A combination of any two or more of aspects 1-80, or any one or more portions thereof, which optionally can be combined with any other disclosure herein to form an aspect.

EXAMPLES

The following examples describe various features and advantages provided by the disclosure, and are in no way intended to limit the invention and appended claims.

In these examples, cover glass articles were formed according to the methods described elsewhere herein (e.g., through reactive sputtering, metal-mode reactive sputtering, PECVD methods, and/or any of the other methods disclosed herein) and as delineated in each of the Tables below. Optical properties were obtained through transfer matrix modeling, starting from experimentally measured refractive index (n and k) values for the substrate(s) and each of the layers of the optical film structure(s) in these cover glass articles. This modeling approach has yielded highly accurate modeling results which have been shown to match very precisely with optimized experiments.

In the examples below, Glass A and Glass B were used as substrates, the compositions of which are set forth in Tables A and B, respectively.

TABLE A

| Composition for Glass A | |
| --- | --- |
| | mol. % |
| $SiO_2$ | 67.23 |
| $Al_2O_3$ | 12.72 |
| $B_2O_3$ | 3.63 |
| $Na_2O$ | 13.91 |
| $K_2O$ | 0.01 |
| MgO | 2.34 |
| CaO | 0.05 |
| ZnO | 0.00 |
| $SnO_2$ | 0.09 |
| $ZrO_2$ | 0.01 |
| $Fe_2O_3$ | 0.01 |
| TOTAL | 100 |

TABLE B

| Composition for Glass B | |
| --- | --- |
| | mol. % |
| $SiO_2$ | 63.76 |
| $Al_2O_3$ | 16.59 |
| $P_2O_5$ | 2.47 |
| $Li_2O$ | 4.91 |
| $Na_2O$ | 12.20 |
| MgO | 0.03 |
| ZnO | 0.00 |
| $SnO_2$ | 0.05 |
| TOTAL | 100.01 |

Example 1

A cover glass article was prepared for this example with the structure delineated below in Table 1. The outer optical film structure ("Front Coating") has 9 layers (Layers 1-9), and the inner optical film structure ("Rear Coating") has 53 layers (Layers 11-63).

Optical properties measured for this example are summarized in Table 1A below. In particular, optical transmission vs. wavelength range data are reported. As is evident from Table 1A, the cover glass article of this example has an average transmission (Tx) of at least 97% as measured from 400-700 nm at one or more incident angles (e.g., at all incident angles) from 0-30 degrees, and a Tx of less than 6% as measured from 930-950 nm at one or more incident angles (e.g., at all incident angles) from 0-50 degrees. Although not shown in Table 1A, the cover glass article of this example has a visible photopic average transmittance of 98.1% at one or more incident angles (e.g., at all incident angles) from 0-10 degrees. Each transmittance in this example is measured through the outer and inner primary surfaces of the substrate and the inner and outer optical film structures. For clarity, average transmission (Tx) values in Table 1A are calculated for the indicated incident angle (e.g. at) 0° by summing the transmission at each wavelength in the indicated wavelength range (e.g., 400-700 nm) and dividing the sum by the total number of wavelengths in this range.

Figure 4A:
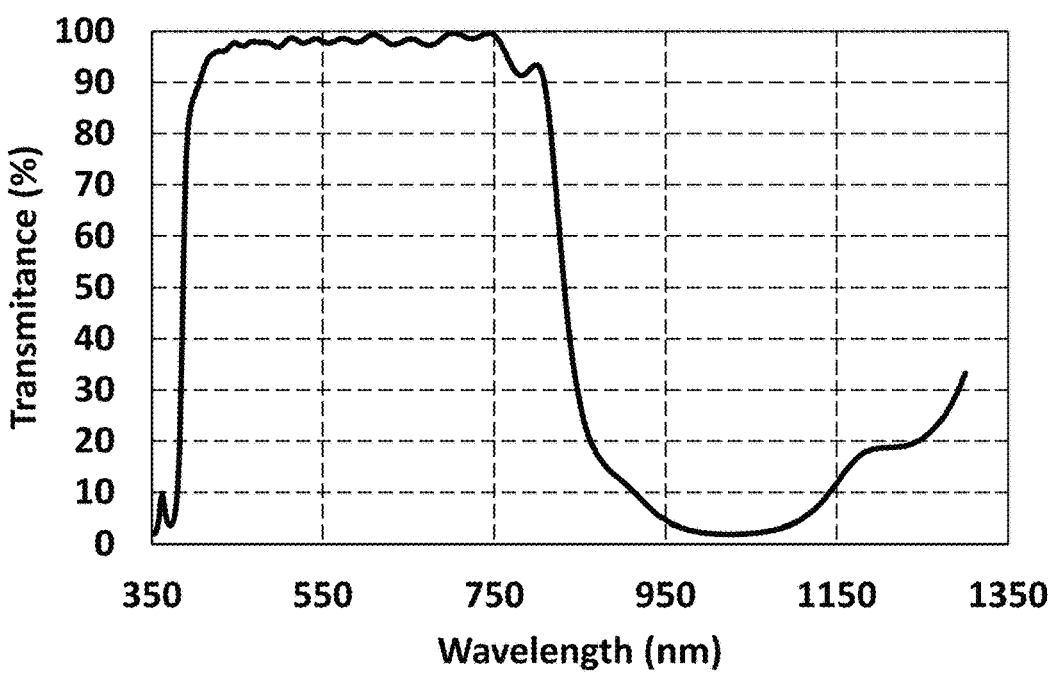
FIGS. 4A and 4C are plots of modeled, two-surface transmittance and reflectance, respectively, vs. wavelength at normal incidence of a cover glass article according to Example 1 of the disclosure.
Figure 4B:
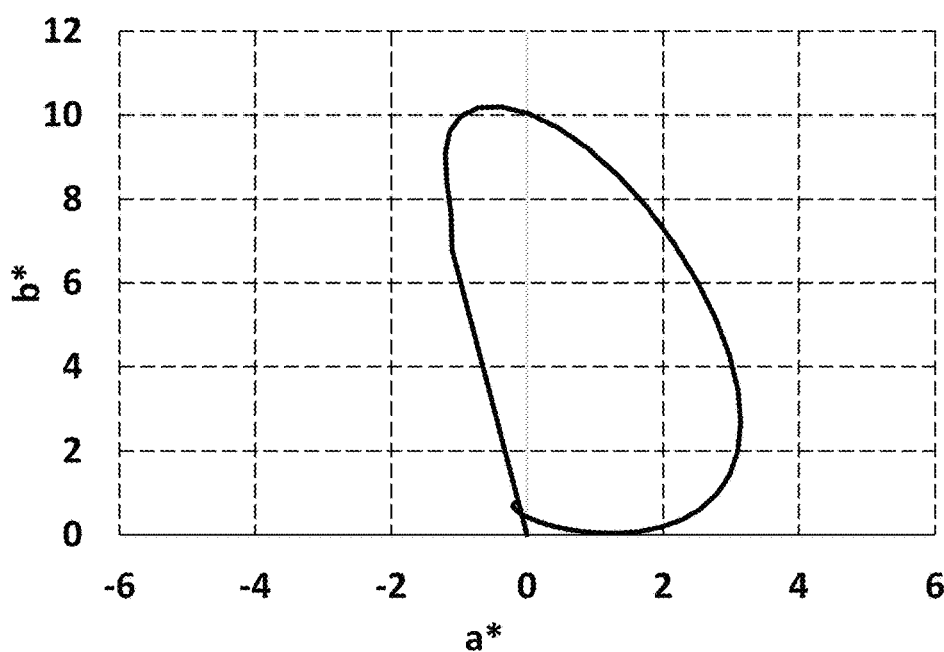
FIGS. 4B and 4D are plots of modeled, two-surface transmitted and reflected color, respectively, for all incidence angles from 0-90 degrees according to Example 1 of the disclosure.
Figure 4C:
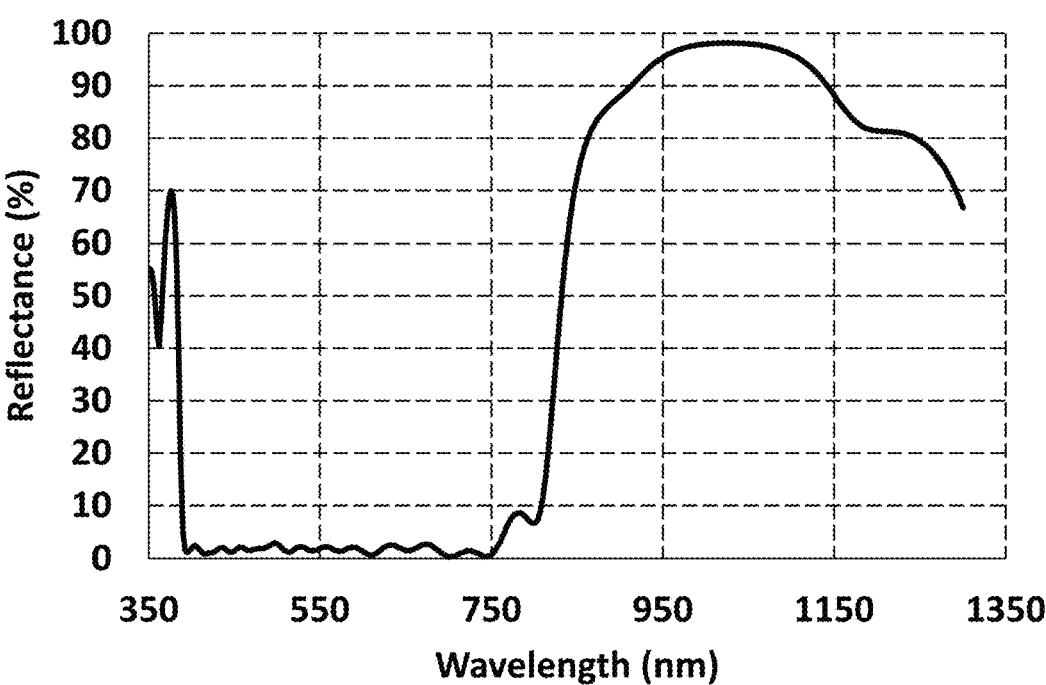
Figure 4D:
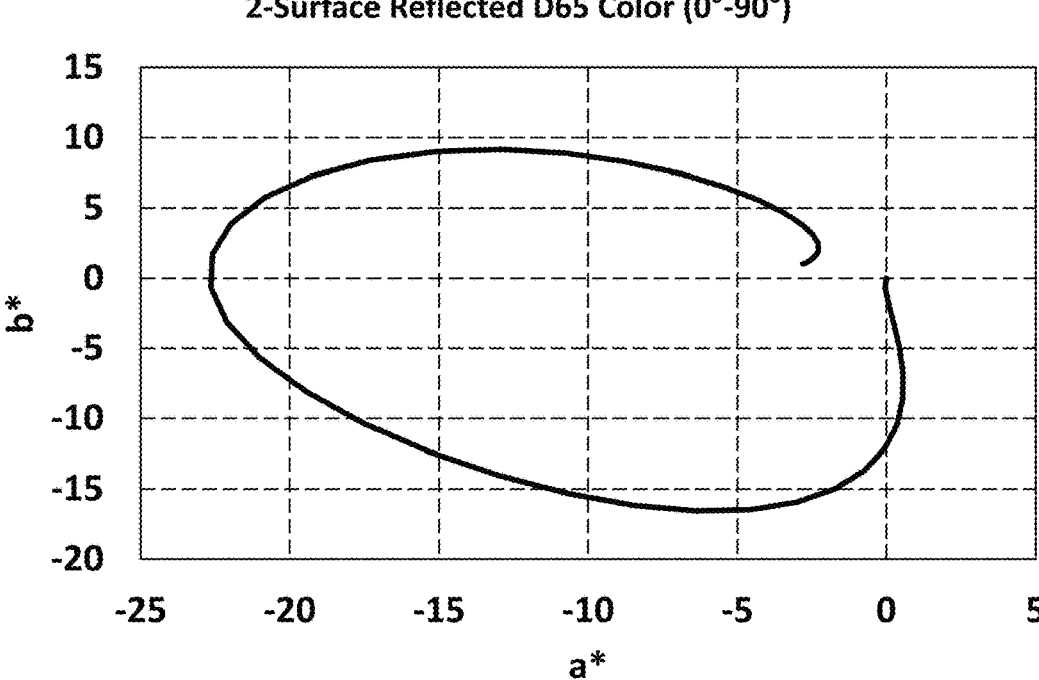

As shown in FIGS. 4A and 4C, plots are provided of modeled, two-surface transmittance and reflectance, respectively, vs. wavelength at normal incidence of the cover glass article according to this example. Further, as shown in FIGS. 4B and 4D, plots are provided of modeled, two-surface transmitted and reflected color, respectively, for all incidence angles from 0-90 degrees of the cover glass article according to this example. As is evident from FIG. 4B, the cover glass article of this example has low transmitted color, where $\sqrt{(a^{*2}+b^{*2})}$ is less than 2 at one or more incident angles (e.g., at all incident angles) from 0-40 degrees, and less than 0.8 at one or more incident angles (e.g., at all incident angles) from 0-20 degrees.

In Example 1, the first plurality of the outer optical film structure has a sum total physical thickness of high and low RI layers of 624 nm; a sum total physical thickness of high RI layers of 292 nm; a sum total physical thickness of low RI layers of 332 nm; and a sum total physical thickness of the high refractive index layers is 47% of a sum total physical thickness of the high refractive index layers and the low refractive index layers in the first plurality.

In Example 1, the second plurality of the inner optical film structure has a sum total physical thickness of high and low RI layers of 2324 nm; a sum total physical thickness of high RI layers of 794 nm; a sum total physical thickness of low RI layers of 1529 nm; and a sum total physical thickness of the high refractive index layers is 34% of a sum total physical thickness of the high refractive index layers and the low refractive index layers in the second plurality.

In Example 1, the second plurality of the inner optical film structure comprises 7 individual layers selected from the high and low refractive index layers of the second plurality each having a physical thickness of at least 100 nm (e.g., between 100-200 nm). Each of these 7 layers has a refractive index of 1.45.

In Example 1, the second plurality of the inner optical film structure comprises 6 individual high refractive index layers each having a physical thickness of at least 80 nm and a refractive index of 2.4.

TABLE 1

| Example 1—Two-Side Coated Cover Glass Article Design | | | | | |
| --- | --- | --- | --- | --- | --- |
| Medium Type | Layer | Material | Refractive Index @550 nm | Extinction Coefficient @550 nm | Physical Thickness (nm) |
| Incident | | Air | 1 | 0 | |
| Front | 1 | $SiO_2$ | 1.461 | 0 | 88.22 |
| Coating | 2 | $SiN_x$ | 2.040 | 0 | 127.26 |
| | 3 | $SiO_2$ | 1.461 | 0 | 72 |
| | 4 | $SiN_x$ | 2.040 | 0 | 12.12 |
| | 5 | $SiO_2$ | 1.461 | 0 | 62.16 |
| | 6 | $SiN_x$ | 2.040 | 0 | 138.44 |
| | 7 | $SiO_2$ | 1.461 | 0 | 39.83 |
| | 8 | $SiN_x$ | 2.040 | 0 | 14.05 |
| | 9 | $SiO_2$ | 1.461 | 0 | 69.85 |
| Substrate | 10 | Glass A | 1.508 | 0 | 0.6 mm |
| Rear | 11 | $SiO_2$ | 1.446 | 0 | 25 |
| Coating | 12 | $TiO_2$ | 2.408 | 0.00001 | 12.2 |
| | 13 | $SiO_2$ | 1.446 | 0 | 26.63 |
| | 14 | $TiO_2$ | 2.408 | 0.00001 | 90.11 |
| | 15 | $SiO_2$ | 1.446 | 0 | 8.21 |
| | 16 | $TiO_2$ | 2.408 | 0.00001 | 7.93 |
| | 17 | $SiO_2$ | 1.446 | 0 | 15.26 |
| | 18 | $TiO_2$ | 2.408 | 0.00001 | 7.98 |
| | 19 | $SiO_2$ | 1.446 | 0 | 163.38 |

TABLE 1-continued

| Medium Type | Layer | Material | Refractive Index @550 nm | Extinction Coefficient @550 nm | Physical Thickness (nm) |
|---|---|---|---|---|---|
| | | | Example 1—Two-Side Coated Cover Glass Article Design | | |
| | 20 | $TiO_2$ | 2.408 | 0.00001 | 12.78 |
| | 21 | $SiO_2$ | 1.446 | 0 | 43.07 |
| | 22 | $TiO_2$ | 2.408 | 0.00001 | 16.07 |
| | 23 | $SiO_2$ | 1.446 | 0 | 178 |
| | 24 | $TiO_2$ | 2.408 | 0.00001 | 8.42 |
| | 25 | $SiO_2$ | 1.446 | 0 | 14.22 |
| | 26 | $TiO_2$ | 2.408 | 0.00001 | 84.4 |
| | 27 | $SiO_2$ | 1.446 | 0 | 8.17 |
| | 28 | $TiO_2$ | 2.408 | 0.00001 | 8 |
| | 29 | $SiO_2$ | 1.446 | 0 | 165.03 |
| | 30 | $TiO_2$ | 2.408 | 0.00001 | 8.17 |
| | 31 | $SiO_2$ | 1.446 | 0 | 7.92 |
| | 32 | $TiO_2$ | 2.408 | 0.00001 | 36.67 |
| | 33 | $SiO_2$ | 1.446 | 0 | 8.07 |
| | 34 | $TiO_2$ | 2.408 | 0.00001 | 37.54 |
| | 35 | $SiO_2$ | 1.446 | 0 | 7.91 |
| | 36 | $TiO_2$ | 2.408 | 0.00001 | 8.09 |
| | 37 | $SiO_2$ | 1.446 | 0 | 166.43 |
| | 38 | $TiO_2$ | 2.408 | 0.00001 | 8.17 |
| | 39 | $SiO_2$ | 1.446 | 0 | 7.91 |
| | 40 | $TiO_2$ | 2.408 | 0.00001 | 87.54 |
| | 41 | $SiO_2$ | 1.446 | 0 | 8.4 |
| | 42 | $TiO_2$ | 2.408 | 0.00001 | 8.23 |
| | 43 | $SiO_2$ | 1.446 | 0 | 160.7 |
| | 44 | $TiO_2$ | 2.408 | 0.00001 | 8.49 |
| | 45 | $SiO_2$ | 1.446 | 0 | 12.97 |
| | 46 | $TiO_2$ | 2.408 | 0.00001 | 86.25 |
| | 47 | $SiO_2$ | 1.446 | 0 | 7.96 |
| | 48 | $TiO_2$ | 2.408 | 0.00001 | 7.91 |
| | 49 | $SiO_2$ | 1.446 | 0 | 8.28 |
| | 50 | $TiO_2$ | 2.408 | 0.00001 | 7.98 |
| | 51 | $SiO_2$ | 1.446 | 0 | 173.74 |
| | 52 | $TiO_2$ | 2.408 | 0.00001 | 20.55 |
| | 53 | $SiO_2$ | 1.446 | 0 | 11.57 |
| | 54 | $TiO_2$ | 2.408 | 0.00001 | 88.68 |
| | 55 | $SiO_2$ | 1.446 | 0 | 25.78 |
| | 56 | $TiO_2$ | 2.408 | 0.00001 | 14.45 |
| | 57 | $SiO_2$ | 1.446 | 0 | 149.88 |
| | 58 | $TiO_2$ | 2.408 | 0.00001 | 11.22 |
| | 59 | $SiO_2$ | 1.446 | 0 | 30.83 |
| | 60 | $TiO_2$ | 2.408 | 0.00001 | 88.21 |
| | 61 | $SiO_2$ | 1.446 | 0 | 8.11 |
| | 62 | $TiO_2$ | 2.408 | 0.00001 | 18.37 |
| | 63 | $SiO_2$ | 1.446 | 0 | 86.02 |
| Emergent | | Air | 1 | 0 | |

TABLE 1A

| (values in %) | Tx0° | Tx10° | Tx20° | Tx30° | Tx40° | Tx50° | Tx60° | Tx70° | Tx80° |
|---|---|---|---|---|---|---|---|---|---|
| | | | Optical Properties of Example 1 | | | | | | |
| Tx(400-700 nm) | 97.47 | 97.53 | 97.60 | 97.29 | 96.08 | 92.37 | 84.79 | 68.90 | 41.65 |
| Tx(930-950 nm) | 5.84 | 5.22 | 3.84 | 2.75 | 2.64 | 4.47 | 12.22 | 24.73 | 25.85 |
| Tx(800-1300 nm) | 16.6 | | | | | | | | |
| Tx(850-1250 nm) | 9.54 | | | | | | | | |
| Tx(900-1200 nm) | 6.6 | | | | | | | | |
| Tx(900-1100 nm) | 3.99 | | | | | | | | |

Example 2

A cover glass article was prepared for this example with the structure delineated below in Table 2. The outer optical film structure ("Front Coating") has 9 layers (Layers 1-9), and the inner optical film structure ("Rear Coating") has 37 layers (Layers 11-47).

Optical properties measured for this example are summarized in Table 2A below. In particular, optical transmission vs. wavelength range data are reported. As is evident from Table 2A, the cover glass article of this example has an average transmission (Tx) or at least 97% as measured from 400 to 700 nm at one or more incident angles (e.g., at all incident angles) from 0 to 30 degrees, and a Tx of less than 28% as measured from 930-950 nm at one or more incident angles (e.g., at all incident angles) from 0 to 10 degrees. Although not shown in Table 2A, the cover glass article of this example has a visible photopic average transmittance of 98.0% at one or more incident angles (e.g., at all incident angles) from 0-10 degrees. Each transmittance in this example is measured through the outer and inner primary surfaces of the substrate and the inner and outer optical film structures. For clarity, average transmission (Tx) values in Table 2A are calculated for the indicated incident angle (e.g. at) 0° by summing the transmission at each wavelength in the indicated wavelength range (e.g., 400-700 nm) and dividing the sum by the total number of wavelengths in this range.

Figure 5A:
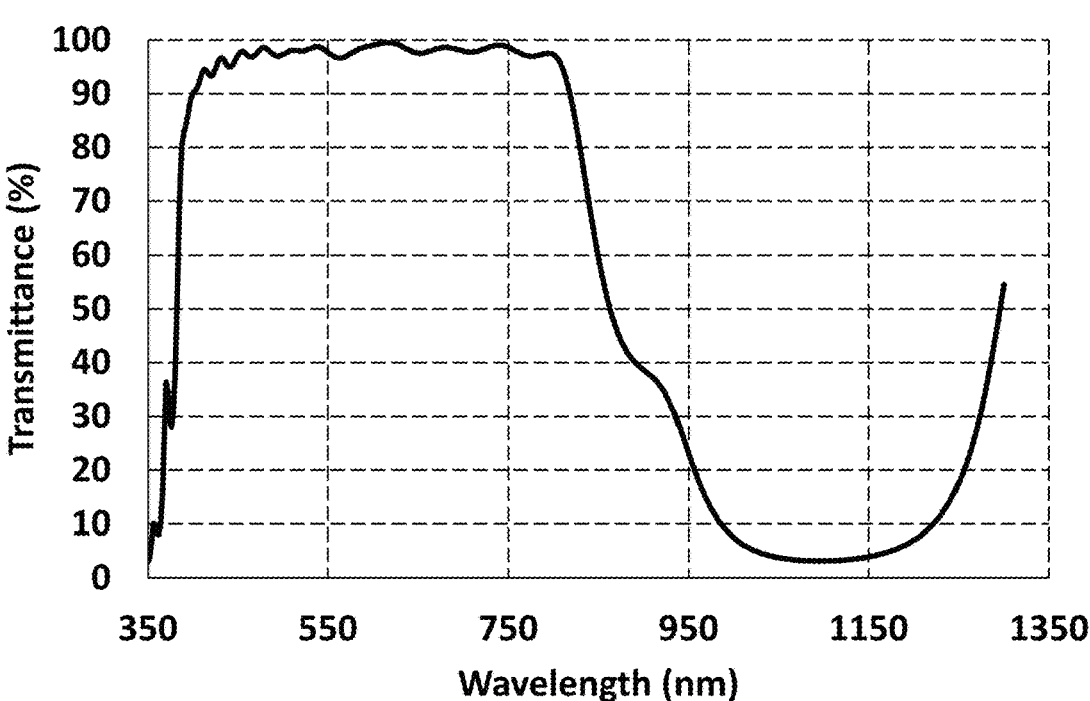
FIGS. 5A and 5C are plots of modeled, two-surface transmittance and reflectance, respectively, vs. wavelength at normal incidence of a cover glass article according to Example 2 of the disclosure.
Figure 5B:
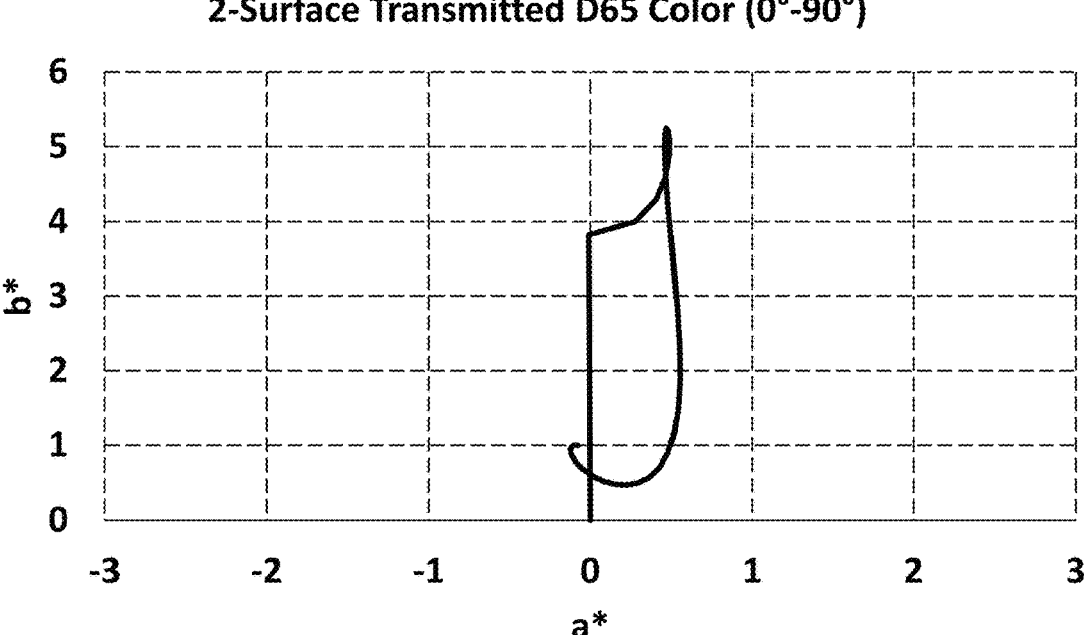
FIGS. 5B and 5D are plots of modeled, two-surface transmitted and reflected color, respectively, for all incidence angles from 0-90 degrees according to Example 2 of the disclosure.
Figure 5C:
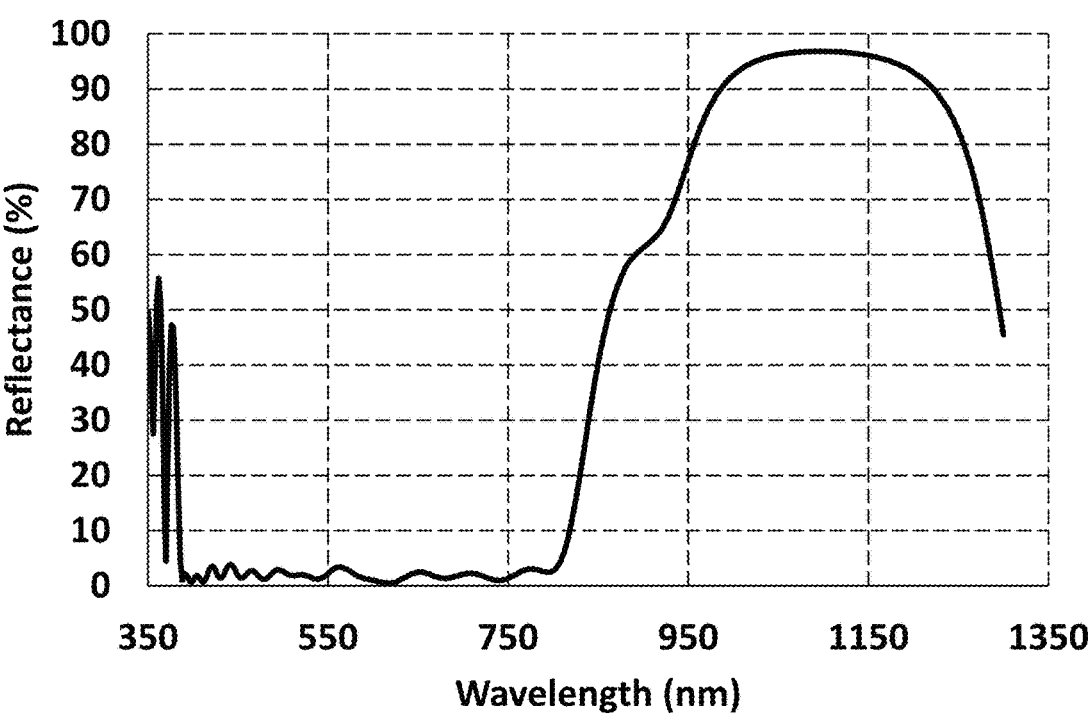
Figure 5D:
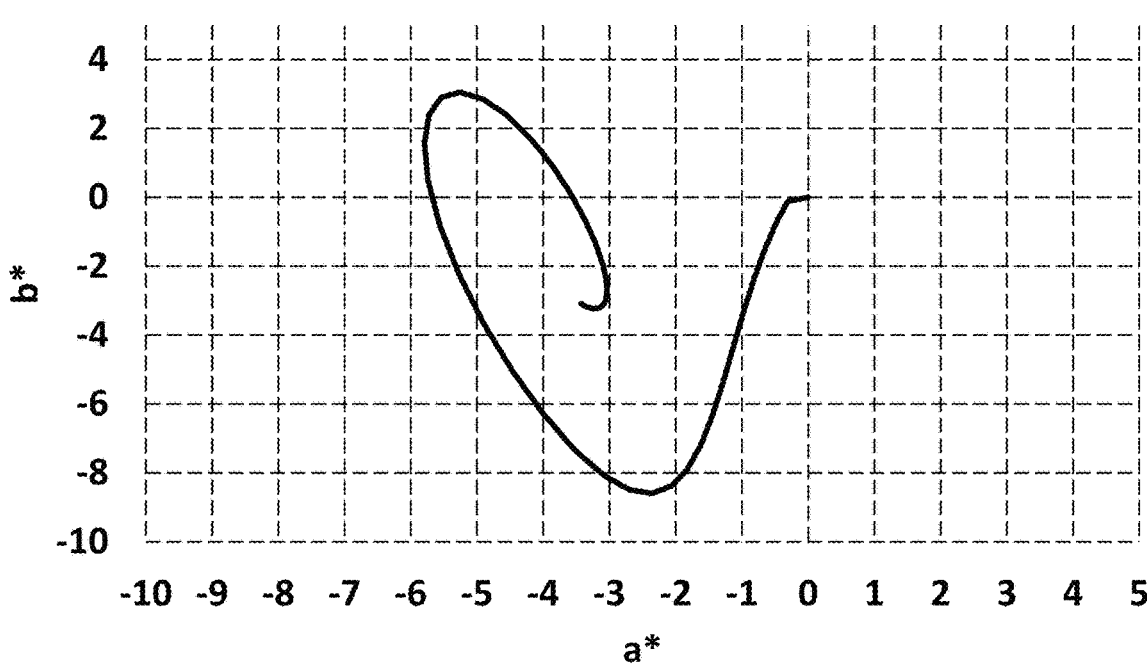

As shown in FIGS. 5A and 5C, plots are provided of modeled, two-surface transmittance and reflectance, respectively, vs. wavelength at normal incidence of the cover glass article according to this example. Further, as shown in FIGS. 5B and 5D, plots are provided of modeled, two-surface transmitted and reflected color, respectively, for all incidence angles from 0-90 degrees of the cover glass article according to this example. As is evident from FIG. 5B, the cover glass article of this example has low transmitted color, where $\sqrt{(a^{*2}+b^{*2})}$ is less than 1.1 for all incident angles from 0-50 degrees, and less than 5.5 for all incidence angles from 0 to 90 degrees. As is evident from FIG. 5D, the cover glass article of this example has reflected color $\sqrt{(a^{*2}+b^{*2})}$ of less than 9.0 at one or more incident angles (e.g., at all incident angles) from 0 to 90 degrees.

In Example 2, the first plurality of the outer optical film structure has a sum total physical thickness of high and low RI layers of 476 nm; a sum total physical thickness of high RI layers of 189 nm; a sum total physical thickness of low RI layers of 287 nm; and a sum total physical thickness of the high refractive index layers is 40% of a sum total physical thickness of the high refractive index layers and the low refractive index layers in the first plurality.

In Example 2, the second plurality of the inner optical film structure has a sum total physical thickness of high and low RI layers of 1788 nm; a sum total physical thickness of high RI layers of 695 nm; a sum total physical thickness of low RI layers of 1093 nm; and a sum total physical thickness of the high refractive index layers is 39% of a sum total physical thickness of the high refractive index layers and the low refractive index layers in the second plurality.

In Example 2, the second plurality of the inner optical film structure comprises 7 individual layers selected from the high and low refractive index layers of the second plurality each having a physical thickness of at least 100 nm (e.g., between 100-200 nm). Five of these 7 layers has a refractive index of 1.45, and two of these 7 layers has a refractive index of 2.41.

In Example 2, the second plurality of the inner optical film structure comprises 5 individual high refractive index layers each having a physical thickness of at least 80 nm and a refractive index of 2.41.

TABLE 2

Example 2—Two-Side Coated Cover Glass Article Design

| Medium Type | Layer | Material | Refractive Index @550 nm | Extinction Coefficient @550 nm | Physical Thickness (nm) |
|---|---|---|---|---|---|
| Incident | | Air | 1 | 0 | |
| Front | 1 | SiO$_2$ | 1.461 | 0 | 88.89 |
| Coating | 2 | SiN$_x$ | 2.040 | 0 | 139.45 |
| | 3 | SiO$_2$ | 1.461 | 0 | 39.09 |
| | 4 | SiN$_x$ | 2.040 | 0 | 25.12 |
| | 5 | SiO$_2$ | 1.461 | 0 | 66.22 |
| | 6 | SiN$_x$ | 2.040 | 0 | 16.3 |

TABLE 2-continued

Example 2—Two-Side Coated Cover Glass Article Design

| Medium Type | Layer | Material | Refractive Index @550 nm | Extinction Coefficient @550 nm | Physical Thickness (nm) |
|---|---|---|---|---|---|
| | 7 | SiO$_2$ | 1.461 | 0 | 68.26 |
| | 8 | SiN$_x$ | 2.040 | 0 | 8.03 |
| | 9 | SiO$_2$ | 1.461 | 0 | 25 |
| Substrate | 10 | Glass A | 1.508 | 0 | 0.6 mm |
| Rear | 11 | SiO$_2$ | 1.446 | 0 | 25 |
| Coating | 12 | TiO$_2$ | 2.408 | 0.00001 | 15.95 |
| | 13 | SiO$_2$ | 1.446 | 0 | 29.4 |
| | 14 | TiO$_2$ | 2.408 | 0.00001 | 114.07 |
| | 15 | SiO$_2$ | 1.446 | 0 | 28.41 |
| | 16 | TiO$_2$ | 2.408 | 0.00001 | 11.35 |
| | 17 | SiO$_2$ | 1.446 | 0 | 154.42 |
| | 18 | TiO$_2$ | 2.408 | 0.00001 | 14.32 |
| | 19 | SiO$_2$ | 1.446 | 0 | 26.7 |
| | 20 | TiO$_2$ | 2.408 | 0.00001 | 103.23 |
| | 21 | SiO$_2$ | 1.446 | 0 | 22.77 |
| | 22 | TiO$_2$ | 2.408 | 0.00001 | 14.42 |
| | 23 | SiO$_2$ | 1.446 | 0 | 169.26 |
| | 24 | TiO$_2$ | 2.408 | 0.00001 | 11.21 |
| | 25 | SiO$_2$ | 1.446 | 0 | 20.31 |
| | 26 | TiO$_2$ | 2.408 | 0.00001 | 90.27 |
| | 27 | SiO$_2$ | 1.446 | 0 | 22.77 |
| | 28 | TiO$_2$ | 2.408 | 0.00001 | 11.16 |
| | 29 | SiO$_2$ | 1.446 | 0 | 147.5 |
| | 30 | TiO$_2$ | 2.408 | 0.00001 | 8.85 |
| | 31 | SiO$_2$ | 1.446 | 0 | 19.83 |
| | 32 | TiO$_2$ | 2.408 | 0.00001 | 86.56 |
| | 33 | SiO$_2$ | 1.446 | 0 | 17.82 |
| | 34 | TiO$_2$ | 2.408 | 0.00001 | 8.27 |
| | 35 | SiO$_2$ | 1.446 | 0 | 149.28 |
| | 36 | TiO$_2$ | 2.408 | 0.00001 | 11.96 |
| | 37 | SiO$_2$ | 1.446 | 0 | 11.59 |
| | 38 | TiO$_2$ | 2.408 | 0.00001 | 82.37 |
| | 39 | SiO$_2$ | 1.446 | 0 | 13.9 |
| | 40 | TiO$_2$ | 2.408 | 0.00001 | 8.57 |
| | 41 | SiO$_2$ | 1.446 | 0 | 167.7 |
| | 42 | TiO$_2$ | 2.408 | 0.00001 | 22.03 |
| | 43 | SiO$_2$ | 1.446 | 0 | 8.84 |
| | 44 | TiO$_2$ | 2.408 | 0.00001 | 72.21 |
| | 45 | SiO$_2$ | 1.446 | 0 | 49.48 |
| | 46 | TiO$_2$ | 2.408 | 0.00001 | 8.05 |
| | 47 | SiO$_2$ | 1.446 | 0 | 8 |
| Emergent | | Air | 1 | 0 | |

TABLE 2A

Optical Properties of Example 2

| (values in %) | Tx0° | Tx10° | Tx20° | Tx30° | Tx40° | Tx50° | Tx60° | Tx70° | Tx80° |
|---|---|---|---|---|---|---|---|---|---|
| Tx(400-700 nm) | 97.44 | 97.49 | 97.56 | 97.45 | 96.67 | 94.23 | 88.43 | 74.70 | 45.88 |
| Tx(930-950 nm) | 27.91 | 25.58 | 18.95 | 11.58 | 7.53 | 6.92 | 9.94 | 19.35 | 27.85 |
| Tx(800-1300 nm) | 23.8 | | | | | | | | |
| Tx(850-1250 nm) | 15.2 | | | | | | | | |
| Tx(900-1200 nm) | 10.7 | | | | | | | | |
| Tx(900-1100 nm) | 13.8 | | | | | | | | |

Example 3

A cover glass article was prepared for this example with the structure delineated below in Table 3. The outer optical film structure ("Front Coating") has 9 layers (Layers 1-9), and the inner optical film structure ("Rear Coating") has 65 layers (Layers 11-75).

Optical properties measured for this example are summarized in Table 3A below. In particular, optical transmission vs. wavelength range data are reported. As is evident from Table 3A, the cover glass article in this example has a 2-surface average transmission (Tx) of at least 97% as measured from 400 to 700 nm at one or more incident angles (e.g., at all incident angles) from 0-30 degrees, and a Tx of less than 7% as measured from 930-950 nm at incidence angles of 0-60 degrees. Although not shown in Table 3A, the cover glass article of this example has a visible photopic average transmittance of 97.8% at one or more incident angles (e.g., at all incident angles) from 0-10 degrees. Each transmittance in this example is measured through the outer and inner primary surfaces of the substrate and the inner and outer optical film structures. For clarity, average transmission (Tx) values in Table 3A are calculated for the indicated incident angle (e.g. at) 0° by summing the transmission at each wavelength in the indicated wavelength range (e.g., 400-700 nm) and dividing the sum by the total number of wavelengths in this range.

Figure 6A:
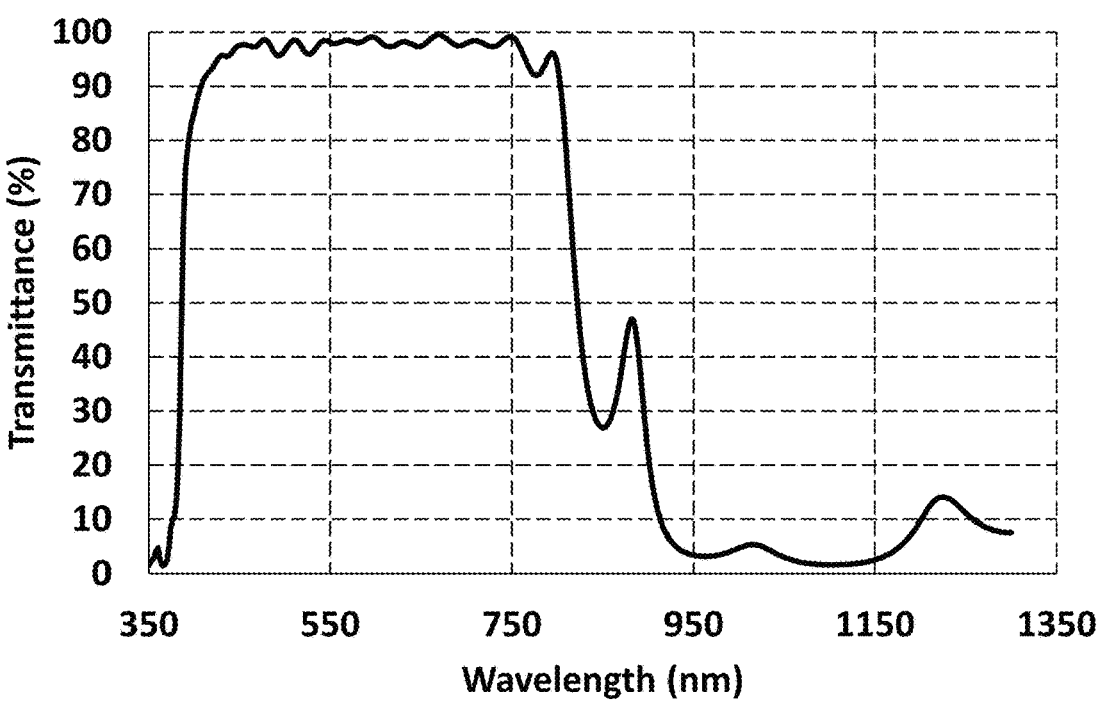
FIGS. 6A and 6C are plots of modeled, two-surface transmittance and reflectance, respectively, vs. wavelength at normal incidence of a cover glass article according to Example 3 of the disclosure.
Figure 6B:
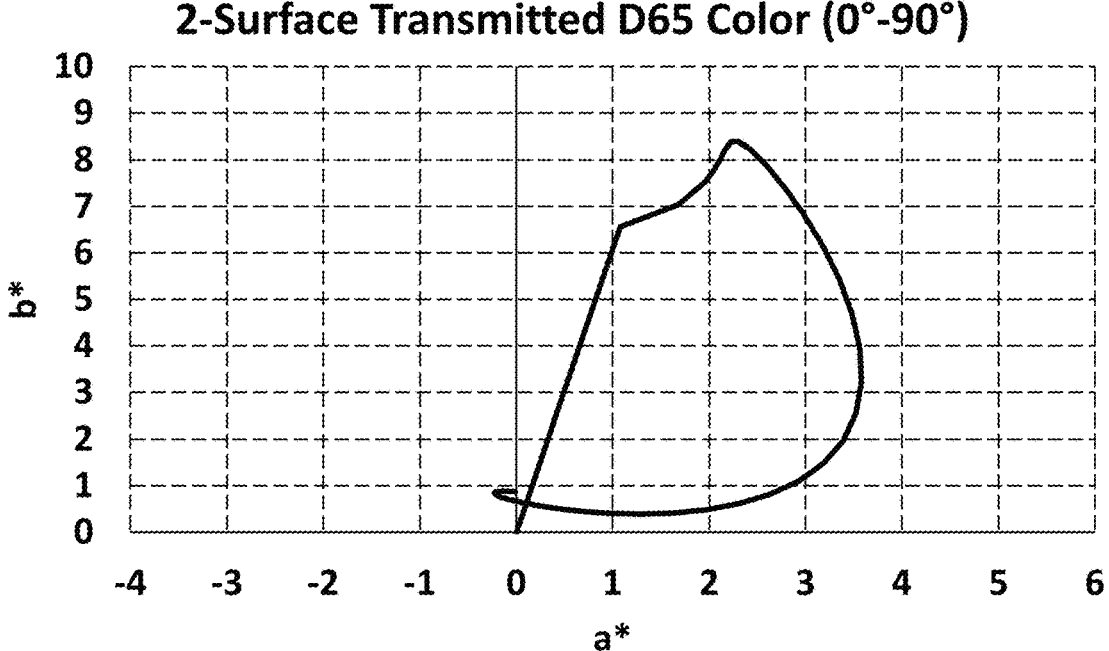
FIGS. 6B and 6D are plots of modeled, two-surface transmitted and reflected color, respectively, for all incidence angles from 0-90 degrees according to Example 3 of the disclosure.
Figure 6C:
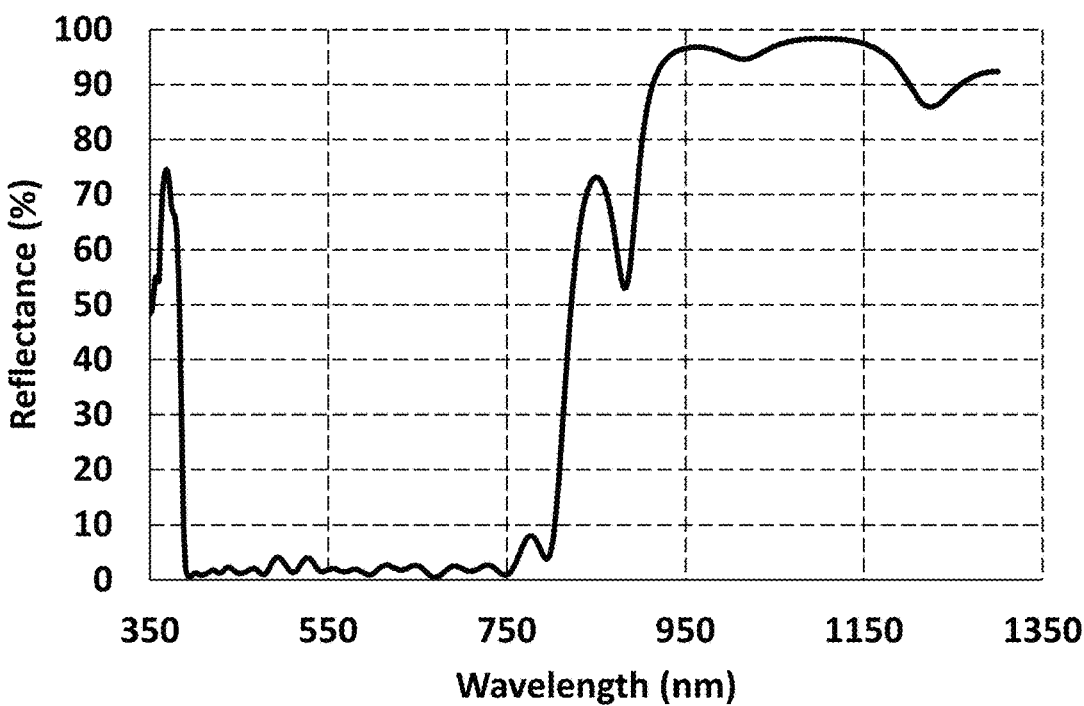
Figure 6D:
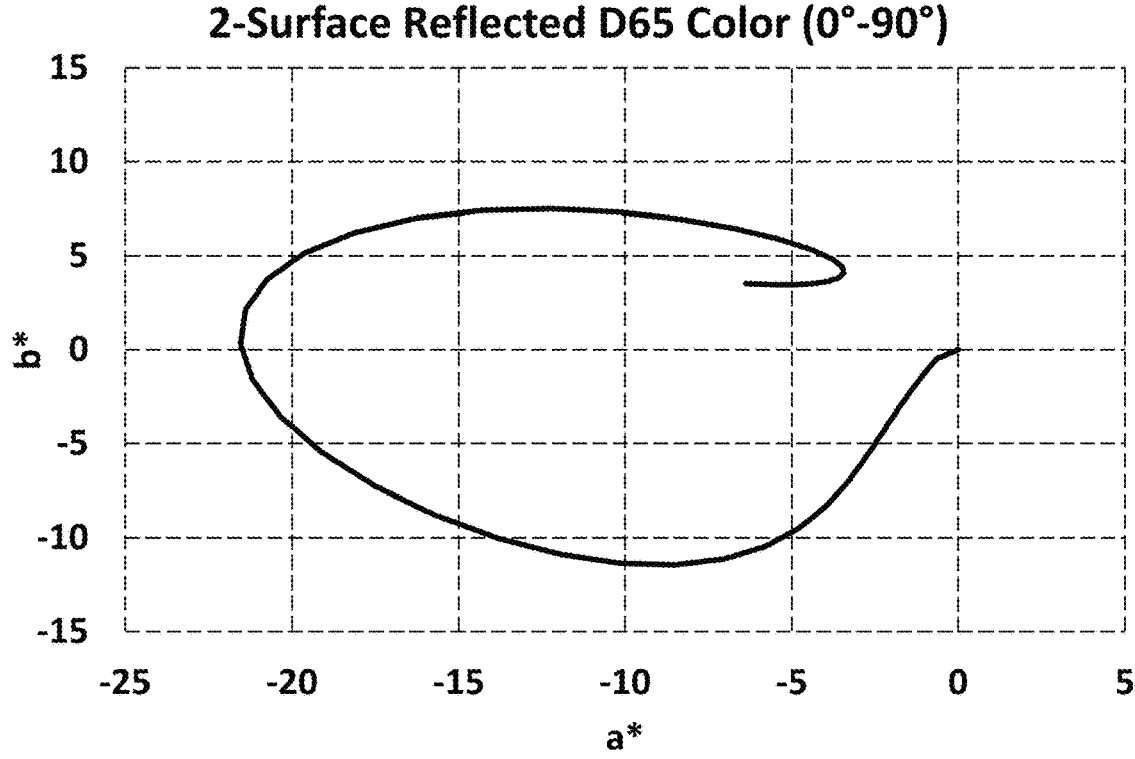

As shown in FIGS. 6A and 6C, plots are provided of modeled, two-surface transmittance and reflectance, respectively, vs. wavelength at normal incidence of the cover glass article according to this example. Further, as shown in FIGS. 6B and 6D, plots are provided of modeled, two-surface transmitted and reflected color, respectively, for all incidence angles from 0-90 degrees of the cover glass article according to this example. As is evident from FIG. 6B, the cover glass article of this example has low transmitted color, where $\sqrt{(a^{*2}+b^{*2})}$ is less than 0.9 at one or more incident angles (e.g., at all incident angles) from 0-30 degrees, and less than 9.0 at all incidence angles from 0 to 90 degrees.

In Example 3, the first plurality of the outer optical film structure has a sum total physical thickness of high and low RI layers of 624 nm; a sum total physical thickness of high RI layers of 292 nm; a sum total physical thickness of low RI layers of 332 nm; and a sum total physical thickness of the high refractive index layers is 47% of a sum total physical thickness of the high refractive index layers and the low refractive index layers in the first plurality.

In Example 3, the second plurality of the inner optical film structure has a sum total physical thickness of high and low RI layers of 2715 nm; a sum total physical thickness of high RI layers of 1064 nm; a sum total physical thickness of low RI layers of 1651 nm; and a sum total physical thickness of the high refractive index layers is 39% of a sum total physical thickness of the high refractive index layers and the low refractive index layers in the second plurality.

In Example 3, the second plurality of the inner optical film structure comprises 7 individual layers selected from the high and low refractive index layers of the second plurality each having a physical thickness of at least 100 nm (e.g., between 100-200 nm). Six of these 7 layers has a refractive index of 1.45, and one of these 7 layers has a refractive index of 2.41.

In Example 3, the second plurality of the inner optical film structure comprises 8 individual high refractive index layers each having a physical thickness of at least 80 nm and a refractive index of 2.4.

TABLE 3

Example 3—Two-Side Coated Cover Glass Article Design

| Medium Type | Layer | Material | Refractive Index @550 nm | Extinction Coefficient @550 nm | Physical Thickness (nm) |
|---|---|---|---|---|---|
| Incident | | Air | 1 | 0 | |
| Front | 1 | SiO$_2$ | 1.461 | 0 | 88.22 |
| Coating | 2 | SiN$_x$ | 2.040 | 0 | 127.26 |
| | 3 | SiO$_2$ | 1.461 | 0 | 72 |
| | 4 | SiN$_x$ | 2.040 | 0 | 12.12 |
| | 5 | SiO$_2$ | 1.461 | 0 | 62.16 |
| | 6 | SiN$_x$ | 2.040 | 0 | 138.44 |
| | 7 | SiO$_2$ | 1.461 | 0 | 39.83 |
| | 8 | SiN$_x$ | 2.040 | 0 | 14.05 |
| | 9 | SiO$_2$ | 1.461 | 0 | 69.85 |
| Substrate | 10 | Glass A | 1.508 | 0 | 0.6 mm |
| Rear | 11 | SiO$_2$ | 1.446 | 0 | 25 |
| Coating | 12 | TiO$_2$ | 2.408 | 0.00001 | 11.71 |
| | 13 | SiO$_2$ | 1.446 | 0 | 30.58 |
| | 14 | TiO$_2$ | 2.408 | 0.00001 | 90.44 |
| | 15 | SiO$_2$ | 1.446 | 0 | 10.76 |
| | 16 | TiO$_2$ | 2.408 | 0.00001 | 13.84 |
| | 17 | SiO$_2$ | 1.446 | 0 | 164.99 |
| | 18 | TiO$_2$ | 2.408 | 0.00001 | 8.46 |
| | 19 | SiO$_2$ | 1.446 | 0 | 10.65 |
| | 20 | TiO$_2$ | 2.408 | 0.00001 | 96.67 |
| | 21 | SiO$_2$ | 1.446 | 0 | 54.94 |
| | 22 | TiO$_2$ | 2.408 | 0.00001 | 12.35 |
| | 23 | SiO$_2$ | 1.446 | 0 | 56.22 |
| | 24 | TiO$_2$ | 2.408 | 0.00001 | 11.2 |
| | 25 | SiO$_2$ | 1.446 | 0 | 8.21 |
| | 26 | TiO$_2$ | 2.408 | 0.00001 | 84.47 |
| | 27 | SiO$_2$ | 1.446 | 0 | 13.58 |
| | 28 | TiO$_2$ | 2.408 | 0.00001 | 11.96 |
| | 29 | SiO$_2$ | 1.446 | 0 | 98.84 |
| | 30 | TiO$_2$ | 2.408 | 0.00001 | 8.18 |
| | 31 | SiO$_2$ | 1.446 | 0 | 45.71 |
| | 32 | TiO$_2$ | 2.408 | 0.00001 | 96.8 |
| | 33 | SiO$_2$ | 1.446 | 0 | 11.1 |
| | 34 | TiO$_2$ | 2.408 | 0.00001 | 8.08 |
| | 35 | SiO$_2$ | 1.446 | 0 | 156.19 |
| | 36 | TiO$_2$ | 2.408 | 0.00001 | 8.11 |
| | 37 | SiO$_2$ | 1.446 | 0 | 16.66 |
| | 38 | TiO$_2$ | 2.408 | 0.00001 | 86.2 |
| | 39 | SiO$_2$ | 1.446 | 0 | 8.02 |
| | 40 | TiO$_2$ | 2.408 | 0.00001 | 8.14 |
| | 41 | SiO$_2$ | 1.446 | 0 | 9.83 |
| | 42 | TiO$_2$ | 2.408 | 0.00001 | 8.07 |
| | 43 | SiO$_2$ | 1.446 | 0 | 175.33 |
| | 44 | TiO$_2$ | 2.408 | 0.00001 | 20.52 |
| | 45 | SiO$_2$ | 1.446 | 0 | 14.83 |
| | 46 | TiO$_2$ | 2.408 | 0.00001 | 70.61 |
| | 47 | SiO$_2$ | 1.446 | 0 | 8.02 |
| | 48 | TiO$_2$ | 2.408 | 0.00001 | 8.2 |
| | 49 | SiO$_2$ | 1.446 | 0 | 8.06 |
| | 50 | TiO$_2$ | 2.408 | 0.00001 | 8.01 |
| | 51 | SiO$_2$ | 1.446 | 0 | 14.58 |
| | 52 | TiO$_2$ | 2.408 | 0.00001 | 8.02 |
| | 53 | SiO$_2$ | 1.446 | 0 | 145.38 |
| | 54 | TiO$_2$ | 2.408 | 0.00001 | 8.04 |
| | 55 | SiO$_2$ | 1.446 | 0 | 16.95 |
| | 56 | TiO$_2$ | 2.408 | 0.00001 | 8.36 |
| | 57 | SiO$_2$ | 1.446 | 0 | 8.07 |
| | 58 | TiO$_2$ | 2.408 | 0.00001 | 86.88 |
| | 59 | SiO$_2$ | 1.446 | 0 | 21.16 |
| | 60 | TiO$_2$ | 2.408 | 0.00001 | 13.33 |
| | 61 | SiO$_2$ | 1.446 | 0 | 174.02 |
| | 62 | TiO$_2$ | 2.408 | 0.00001 | 12.95 |
| | 63 | SiO$_2$ | 1.446 | 0 | 21.02 |
| | 64 | TiO$_2$ | 2.408 | 0.00001 | 10.5 |
| | 65 | SiO$_2$ | 1.446 | 0 | 8.09 |
| | 66 | TiO$_2$ | 2.408 | 0.00001 | 117.47 |
| | 67 | SiO$_2$ | 1.446 | 0 | 25.18 |
| | 68 | TiO$_2$ | 2.408 | 0.00001 | 17.5 |
| | 69 | SiO$_2$ | 1.446 | 0 | 180.43 |
| | 70 | TiO$_2$ | 2.408 | 0.00001 | 12.13 |
| | 71 | SiO$_2$ | 1.446 | 0 | 20.73 |
| | 72 | TiO$_2$ | 2.408 | 0.00001 | 81.13 |
| | 73 | SiO$_2$ | 1.446 | 0 | 8.02 |

TABLE 3-continued

| Example 3—Two-Side Coated Cover Glass Article Design | | | | | |
|---|---|---|---|---|---|
| Medium Type | Layer | Material | Refractive Index @550 nm | Extinction Coefficient @550 nm | Physical Thickness (nm) |
| | 74 | TiO$_2$ | 2.408 | 0.00001 | 15.23 |
| | 75 | SiO$_2$ | 1.446 | 0 | 80.28 |
| Emergent | | Air | 1 | 0 | |

TABLE 3A

| Optical Properties of Example 3 | | | | | | | | | |
|---|---|---|---|---|---|---|---|---|---|
| (values in %) | Tx0° | Tx10° | Tx20° | Tx30° | Tx40° | Tx50° | Tx60° | Tx70° | Tx80° |
| Tx(400-700 nm) | 97.12 | 97.19 | 97.28 | 97.08 | 96.06 | 93.00 | 86.73 | 71.81 | 43.95 |
| Tx(930-950 nm) | 4.09 | 3.74 | 3.28 | 3.87 | 6.12 | 5.14 | 5.20 | 9.58 | 14.40 |
| Tx(800-1300 nm) | 13.6 | | | | | | | | |
| Tx(850-1250 nm) | 9.28 | | | | | | | | |
| Tx(900-1200 nm) | 4.33 | | | | | | | | |
| Tx(900-1100 nm) | 4.69 | | | | | | | | |

Example 4

A cover glass article was prepared for this example with the structure delineated below in Table 4. The outer optical film structure ("Front Coating") has 9 layers (Layers 1-9), and the inner optical film structure ("Rear Coating") has 9 layers (Layers 12-20) plus one organic layer disposed between the inner primary surface of the substrate and the inner optical film structure.

Optical properties measured for this example are summarized in Table 4A below. In particular, optical transmission vs. wavelength range data are reported. As is evident from Table 4A, the cover glass article of this example has a 2-surface average transmission (Tx) of at least 98.5% as measured from 400 to 700 nm at incidence angles of 0 to 30 degrees, and a Tx of 41% or less as measured from 930-950 nm at incidence angles of 0 to 50 degrees. Although not shown in Table 4A, the cover glass article of this example has a visible photopic average transmittance of 98.8% at one or more incident angles (e.g., at all incident angles) from 0-10 degrees. Each transmittance in this example is measured through the outer and inner primary surfaces of the substrate and the inner and outer optical film structures (including the organic layer). For clarity, average transmission (Tx) values in Table 4A are calculated for the indicated incident angle (e.g. at) 0° by summing the transmission at each wavelength in the indicated wavelength range (e.g., 400-700 nm) and dividing the sum by the total number of wavelengths in this range.

Figure 7A:
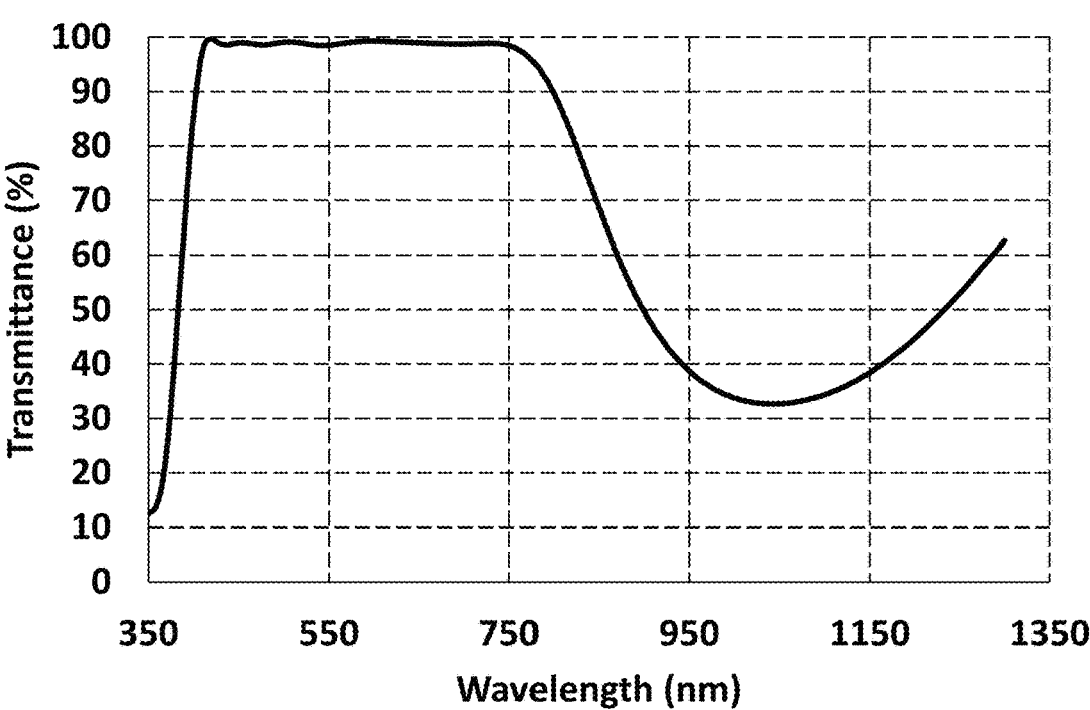
FIGS. 7A and 7C are plots of modeled, two-surface transmittance and reflectance, respectively, vs. wavelength at normal incidence of a cover glass article according to Example 4 of the disclosure.
Figure 7B:
FIGS. 7B and 7D are plots of modeled, two-surface transmitted and reflected color, respectively, for all incidence angles from 0-90 degrees according to Example 4 of the disclosure.
Figure 7C:
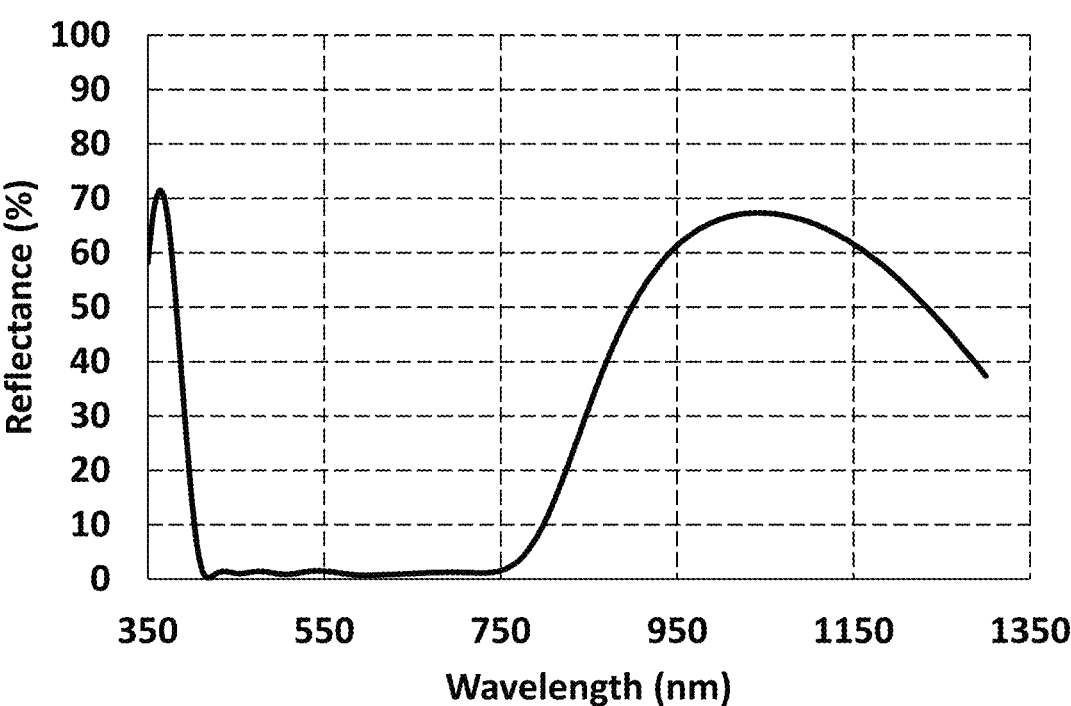
Figure 7D:
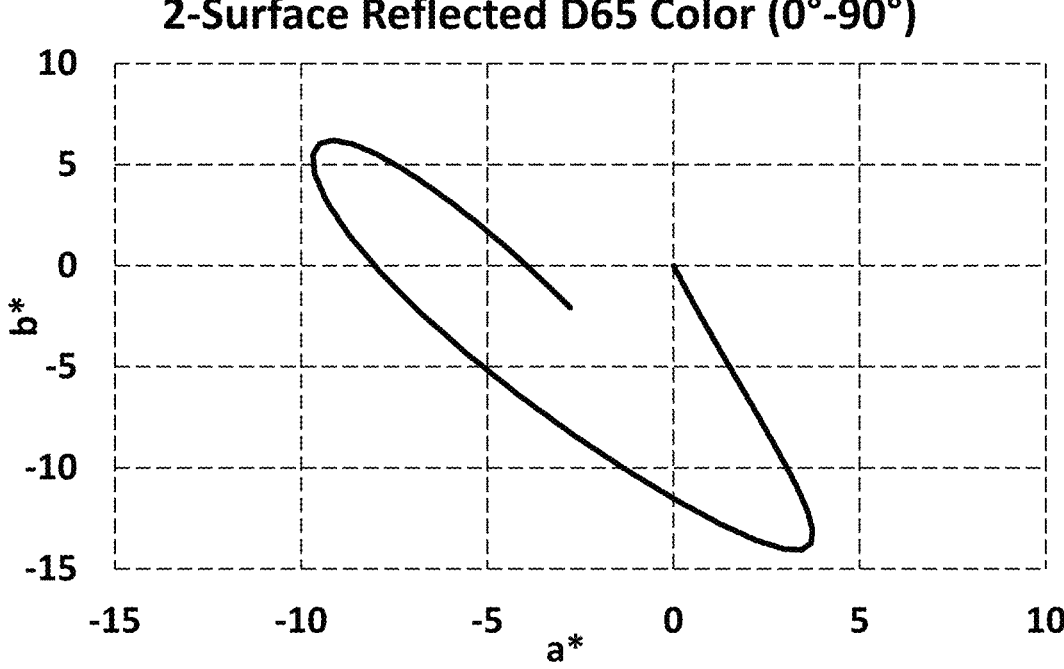

As shown in FIGS. 7A and 7C, plots are provided of modeled, two-surface transmittance and reflectance, respectively, vs. wavelength at normal incidence of the cover glass article according to this example. Further, as shown in FIGS. 7B and 7D, plots are provided of modeled, two-surface transmitted and reflected color, respectively, for all incidence angles from 0-90 degrees of the cover glass article according to this example. As is evident from FIG. 7B, the cover glass article of this example has low transmitted color, where $\sqrt{(a^{*2}+b^{*2})}$ is less than 0.2 at all incidence angles of 0-10 degrees, less than 1.3 at all incidence angles from 0-50 degrees, and less than 5.5 at all incidence angles from 0 to 90 degrees.

In Example 4, the first plurality of the outer optical film structure has a sum total physical thickness of high and low RI layers of 495 nm; a sum total physical thickness of high RI layers of 207 nm; a sum total physical thickness of low RI layers of 288 nm; and a sum total physical thickness of the high refractive index layers is 42% of a sum total physical thickness of the high refractive index layers and the low refractive index layers in the first plurality.

In Example 4, the second plurality of the inner optical film structure has a sum total physical thickness of high and low RI layers of 859 nm; a sum total physical thickness of high RI layers of 365 nm; a sum total physical thickness of low RI layers of 494 nm; and a sum total physical thickness of the high refractive index layers is 42% of a sum total physical thickness of the high refractive index layers and the low refractive index layers in the second plurality.

In Example 4, the second plurality of the inner optical film structure comprises 5 individual layers selected from the high and low refractive index layers of the second plurality each having a physical thickness of at least 80 nm and at least 100 nm (e.g., between 100-200 nm). Three of these layers has a refractive index of 2.17, and two of these layers has a refractive index of 1.46. All 5 of these layers are adjacent to one another.

TABLE 4

| Example 4—Two-Side Coated Cover Glass Article Design | | | | | |
|---|---|---|---|---|---|
| Medium Type | Layer | Material | Refractive Index @550 nm | Extinction Coefficient @550 nm | Physical Thickness (nm) |
| Incident | | Air | 1 | 0 | |
| Front Coating | 1 | SiO$_2$ | 1.477 | 0 | 91.36 |
| | 2 | SiN$_x$ | 2.068 | 0 | 145.72 |
| | 3 | SiO$_2$ | 1.477 | 0 | 39.25 |
| | 4 | SiN$_x$ | 2.068 | 0 | 30.88 |
| | 5 | SiO$_2$ | 1.477 | 0 | 62.22 |
| | 6 | SiN$_x$ | 2.068 | 0 | 21.34 |
| | 7 | SiO$_2$ | 1.477 | 0 | 70.36 |
| | 8 | SiN$_x$ | 2.068 | 0 | 8.79 |
| | 9 | SiO$_2$ | 1.477 | 0 | 25 |
| Substrate | 10 | Glass B | 1.510 | 0 | 0.5 mm |
| Rear Coating | 11 | Organic Buffer layer | 1.461 | 0 | 51.49 |
| | 12 | SiO$_2$ | 1.462 | 0 | 25 |
| | 13 | TiO$_2$ | 2.172 | 0 | 15 |
| | 14 | SiO$_2$ | 1.462 | 0 | 41.24 |
| | 15 | TiO$_2$ | 2.172 | 0 | 128.88 |
| | 16 | SiO$_2$ | 1.462 | 0 | 178.7 |
| | 17 | TiO$_2$ | 2.172 | 0 | 118.74 |
| | 18 | SiO$_2$ | 1.462 | 0 | 170.92 |
| | 19 | TiO$_2$ | 2.172 | 0 | 102.44 |
| | 20 | SiO$_2$ | 1.462 | 0 | 78.55 |
| Emergent | | Air | 1 | 0 | |

TABLE 4A

| (values in %) | Tx0° | Tx10° | Tx20° | Tx30° | Tx40° | Tx50° | Tx60° | Tx70° | Tx80° |
|---|---|---|---|---|---|---|---|---|---|
| Optical Properties of Example 4 | | | | | | | | | |
| Tx(400-700 nm) | 98.65 | 98.72 | 98.80 | 98.59 | 97.73 | 95.33 | 89.07 | 74.67 | 45.74 |
| Tx(930-950 nm) | 40.37 | 39.53 | 37.44 | 35.24 | 34.46 | 36.61 | 42.32 | 48.28 | 40.06 |
| Tx(800-1300 nm) | 46.9 | | | | | | | | |
| Tx(850-1250 nm) | 41.4 | | | | | | | | |
| Tx(900-1200 nm) | 37.3 | | | | | | | | |
| Tx(900-1100 nm) | 36.5 | | | | | | | | |

Example 5

A cover glass article was prepared for this example with the structure delineated below in Table 5. The inner optical film structure ("Rear Coating") has 18 layers (Layers 2-19), including one organic layer disposed between the inner primary surface of the substrate and the inner optical film structure.

Optical properties measured for this example are summarized in Table 5A below. In particular, optical transmission vs. wavelength range data are reported. As is evident from Table 5A, the cover glass article of this example has a 2-surface average transmission (Tx) of at least 94.5% as measured from 400 to 700 nm at incidence angles of 0 to 20 degrees, and a Tx of 1% or less as measured from 930-950 nm at incidence angles of 0-30 degrees. Although not shown in Table 5A, the cover glass article of this example has a visible photopic average transmittance of 95.1% at one or more incident angles (e.g., at all incident angles) from 0-10 degrees. Each transmittance in this example is measured through the outer and inner primary surfaces of the substrate and the inner optical film structure (including the organic layer). For clarity, average transmission (Tx) values in Table 5A are calculated for the indicated incident angle (e.g. at) 0° by summing the transmission at each wavelength in the indicated wavelength range (e.g., 400-700 nm) and dividing the sum by the total number of wavelengths in this range.

Figure 8A:
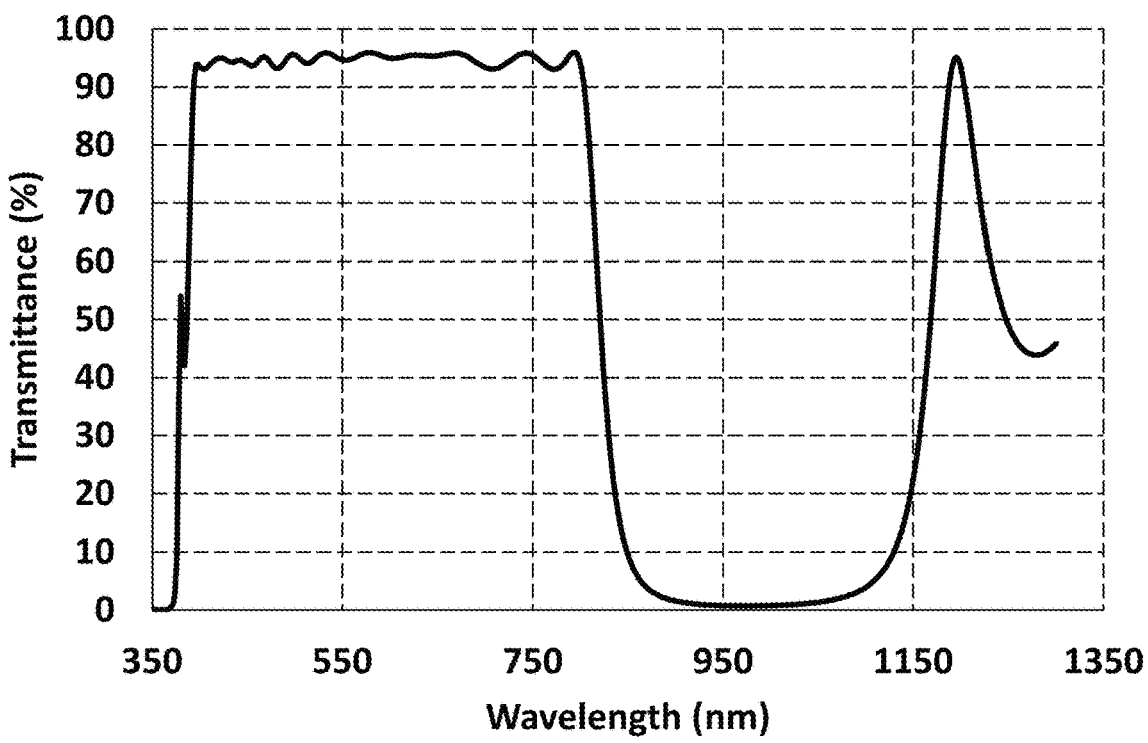
FIGS. 8A and 8C are plots of modeled, two-surface transmittance and reflectance, respectively, vs. wavelength at normal incidence of a cover glass article according to Example 5 of the disclosure.
Figure 8B:
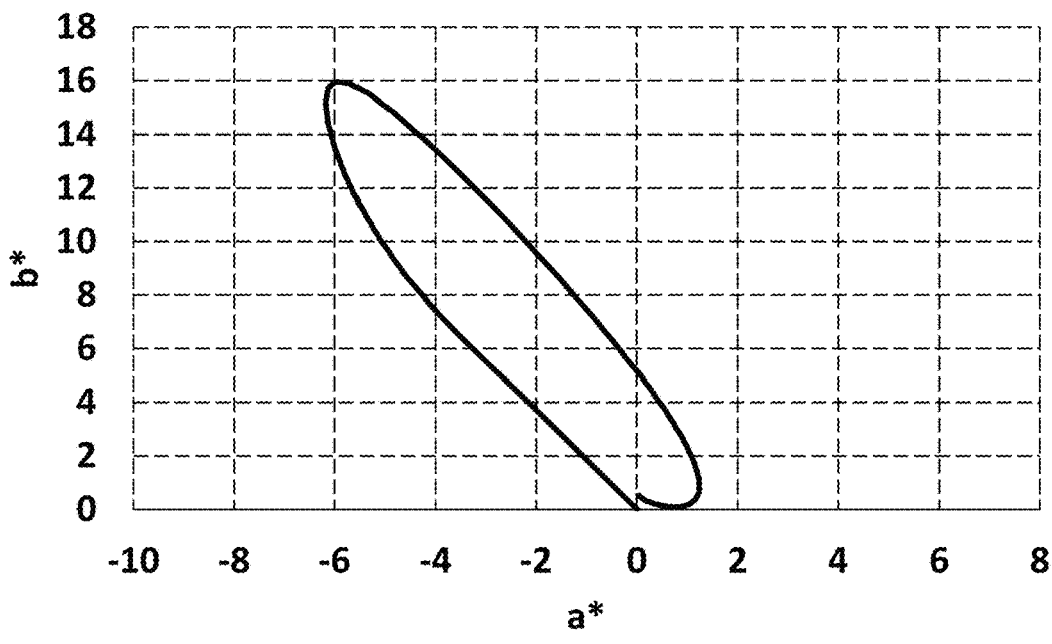
FIGS. 8B and 8D are plots of modeled, two-surface transmitted and reflected color, respectively, for all incidence angles from 0-90 degrees according to Example 5 of the disclosure.
Figure 8C:
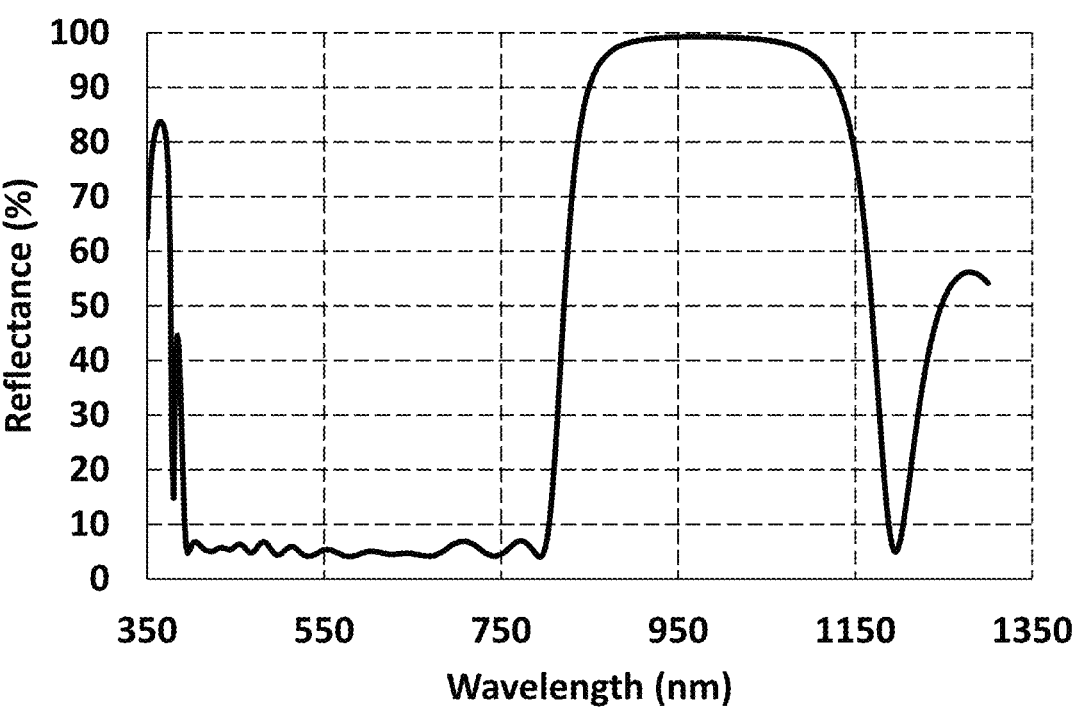
Figure 8D:
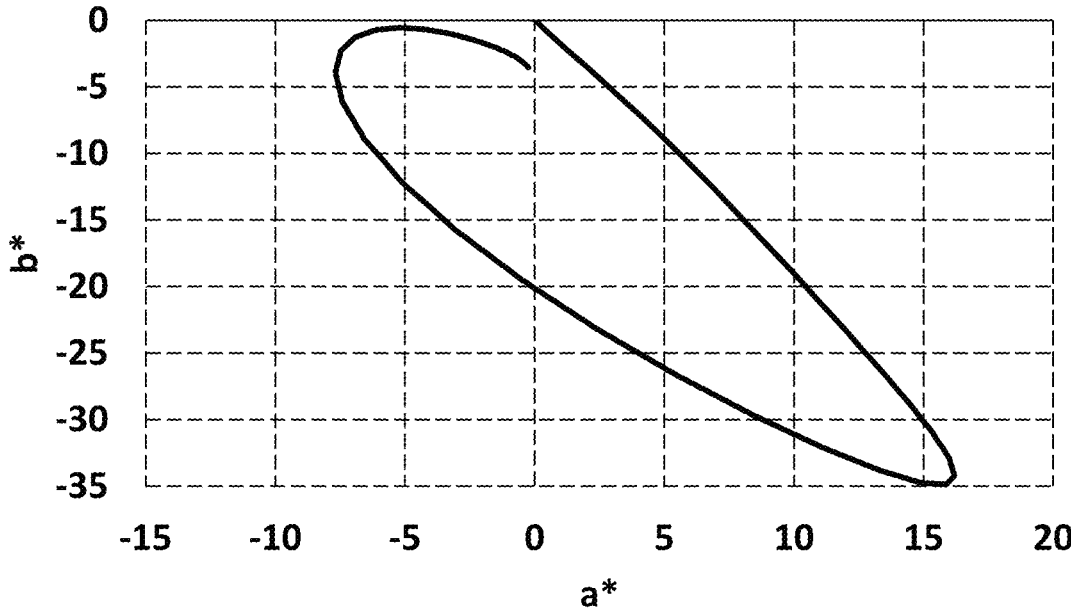

As shown in FIGS. 8A and 8C, plots are provided of modeled, two-surface transmittance and reflectance, respectively, vs. wavelength at normal incidence of the cover glass article according to this example. Further, as shown in FIGS. 8B and 8D, plots are provided of modeled, two-surface transmitted and reflected color, respectively, for all incidence angles from 0-90 degrees of the cover glass article according to this example. As is evident from FIG. 8B, the cover glass article of this example has low transmitted color, where $\sqrt{(a^{*2}+b^{*2})}$ is less than 0.6 at one or more incident angles (e.g., at all incident angles) from 0-20 degrees, and less than 2 at one or more incident angles (e.g., at all incident angles) from 0-30 degrees.

In Example 5, the second plurality of the inner optical film structure has a sum total physical thickness of high and low RI layers of 2273 nm; a sum total physical thickness of high RI layers of 744 nm; a sum total physical thickness of low RI layers of 1529 nm; and a sum total physical thickness of the high refractive index layers is 33% of a sum total physical thickness of the high refractive index layers and the low refractive index layers in the second plurality.

In Example 5, the second plurality of the inner optical film structure comprises 14 individual layers selected from the high and low refractive index layers of the second plurality each having a physical thickness of at least 100 nm, all of which are between 100-200 nm except for Layer 3, which is a low RI layer having a thickness of 381 nm. Seven of these layers have a refractive index of 1.45 and seven of these layers have a refractive index of 2.36. Of the 14 layers, 13 of these are adjacent to one another. Seven layers each have a physical thickness of at least 80 nm and a refractive index of 2.37.

TABLE 5

Example 5—One-Side Coated Cover Glass Article Design

| Medium Type | Layer | Material | Refractive Index @550 nm | Extinction Coefficient @550 nm | Physical Thickness (nm) |
|---|---|---|---|---|---|
| Incident | | Air | 1 | 0 | |
| Substrate | 1 | Glass A | 1.508 | 0 | 0.6 mm |
| Rear | 2 | Organic | 1.461 | 0 | 48 |
| Coating | | Buffer layer | | | |
| | 3 | SiO₂ | 1.446 | 0 | 380.53 |
| | 4 | TiO₂ | 2.364 | 0 | 15.35 |
| | 5 | SiO₂ | 1.446 | 0 | 32.21 |
| | 6 | TiO₂ | 2.364 | 0 | 106.89 |
| | 7 | SiO₂ | 1.446 | 0 | 176.37 |
| | 8 | TiO₂ | 2.364 | 0 | 105.54 |
| | 9 | SiO₂ | 1.446 | 0 | 173.05 |
| | 10 | TiO₂ | 2.364 | 0 | 103.25 |
| | 11 | SiO₂ | 1.446 | 0 | 170.62 |
| | 12 | TiO₂ | 2.364 | 0 | 101.58 |
| | 13 | SiO₂ | 1.446 | 0 | 168.13 |
| | 14 | TiO₂ | 2.364 | 0 | 100.94 |
| | 15 | SiO₂ | 1.446 | 0 | 172.34 |
| | 16 | TiO₂ | 2.364 | 0 | 106.1 |
| | 17 | SiO₂ | 1.446 | 0 | 172.78 |
| | 18 | TiO₂ | 2.364 | 0 | 104.17 |
| | 19 | SiO₂ | 1.446 | 0 | 82.91 |
| Emergent | | Air | 1 | 0 | |

TABLE 5A

| (values in %) | Tx0° | Tx10° | Tx20° | Tx30° | Tx40° | Tx50° | Tx60° | Tx70° | Tx80° |
|---|---|---|---|---|---|---|---|---|---|
| Optical Properties of Example 5 | | | | | | | | | |
| Tx(400-700 nm) | 94.89 | 94.87 | 94.67 | 93.98 | 92.27 | 88.69 | 80.69 | 65.89 | 40.29 |
| Tx(930-950 nm) | 0.85 | 0.81 | 0.77 | 0.84 | 1.36 | 3.87 | 18.77 | 43.54 | 29.70 |
| Tx(800-1300 nm) | 24.3 | | | | | | | | |
| Tx(850-1250 nm) | 18.8 | | | | | | | | |

TABLE 5A-continued

| | Optical Properties of Example 5 | | | | | | | | |
|---|---|---|---|---|---|---|---|---|---|
| (values in %) | Tx0° | Tx10° | Tx20° | Tx30° | Tx40° | Tx50° | Tx60° | Tx70° | Tx80° |
| Tx(900-1200 nm) | 13.2 | | | | | | | | |
| Tx(900-1100 nm) | 1.28 | | | | | | | | |

Example 6

A cover glass article was prepared for this example with the structure delineated below in Table 6. The outer optical film structure ("Front Coating") has 23 layers (Layers 1-23), and the inner optical film structure ("Rear Coating") has 6 layers (Layers 26-31) plus one organic layer disposed between the inner primary surface of the substrate and the inner optical film structure.

Optical properties measured for this example are summarized in Table 6A below. In particular, optical transmission vs. wavelength range data are reported. As is evident from Table 6A, the cover glass article of this example has a 2-surface average transmission (Tx) of at least 98.9% as measured from 400 to 700 nm at incidence angles of 0 to 30 degrees, and a Tx of 39.5% or less as measured from 930-950 nm at incidence angles of 0 to 60 degrees. Although not shown in Table 6A, the cover glass article of this example has a visible photopic average transmittance of 98.9% at one or more incident angles (e.g., at all incident angles) from 0-10 degrees. Each transmittance in this example is measured through the outer and inner primary surfaces of the substrate and the inner and outer optical film structures (including the organic layer). For clarity, average transmission (Tx) values in Table 6A are calculated for the indicated incident angle (e.g. at) 0° by summing the transmission at each wavelength in the indicated wavelength range (e.g., 400-700 nm) and dividing the sum by the total number of wavelengths in this range.

Figure 9A:
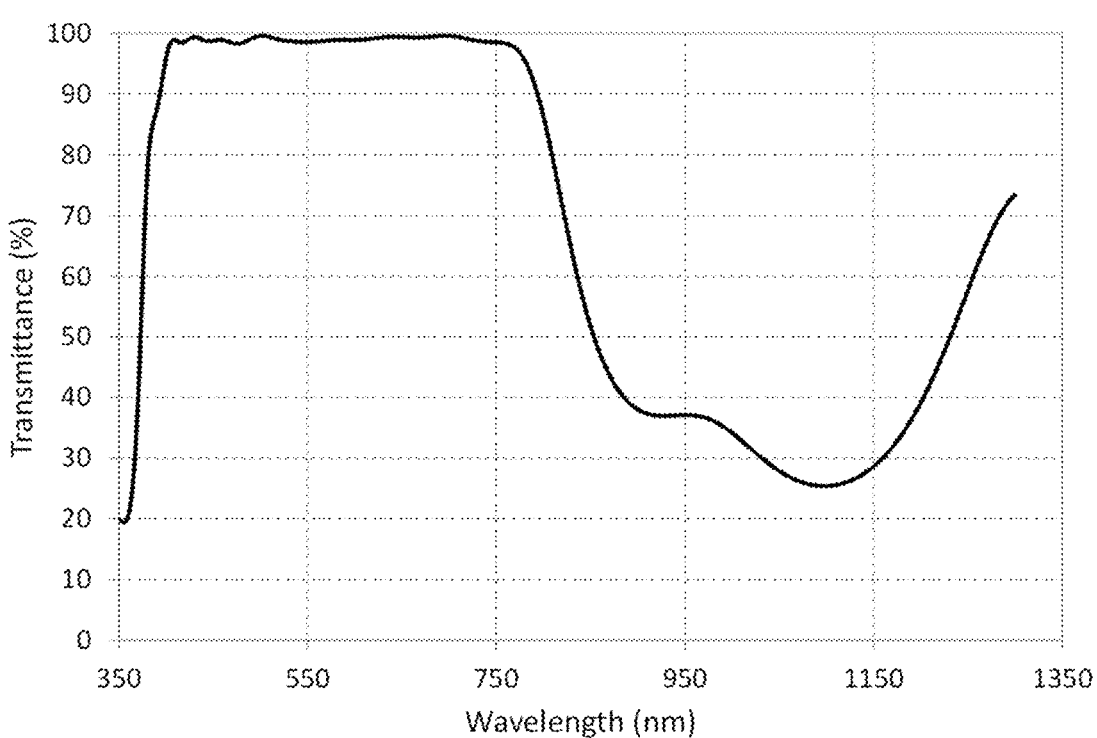
FIGS. 9A and 9C are plots of modeled, two-surface transmittance and reflectance, respectively, vs. wavelength at normal incidence of a cover glass article according to Example 6 of the disclosure.
Figure 9B:
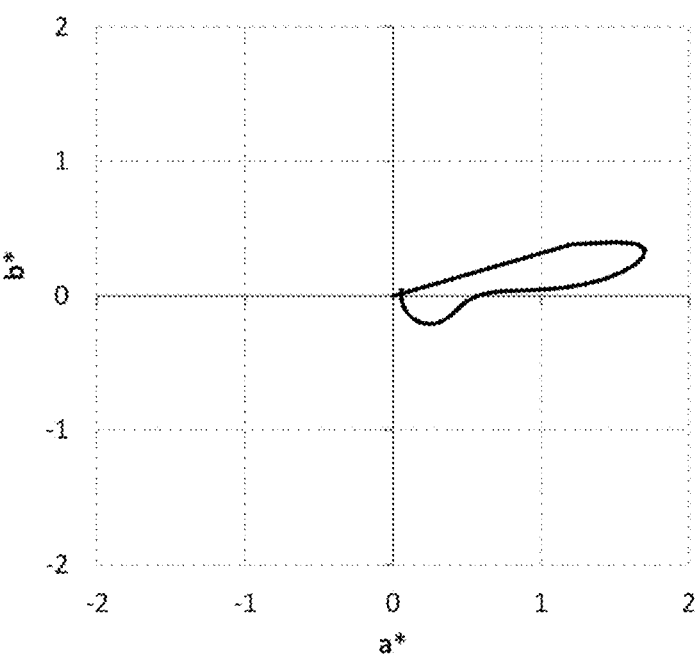
FIGS. 9B and 9D are plots of modeled, two-surface transmitted and reflected color, respectively, for all incidence angles from 0-90 degrees according to Example 6 of the disclosure.
Figure 9C:
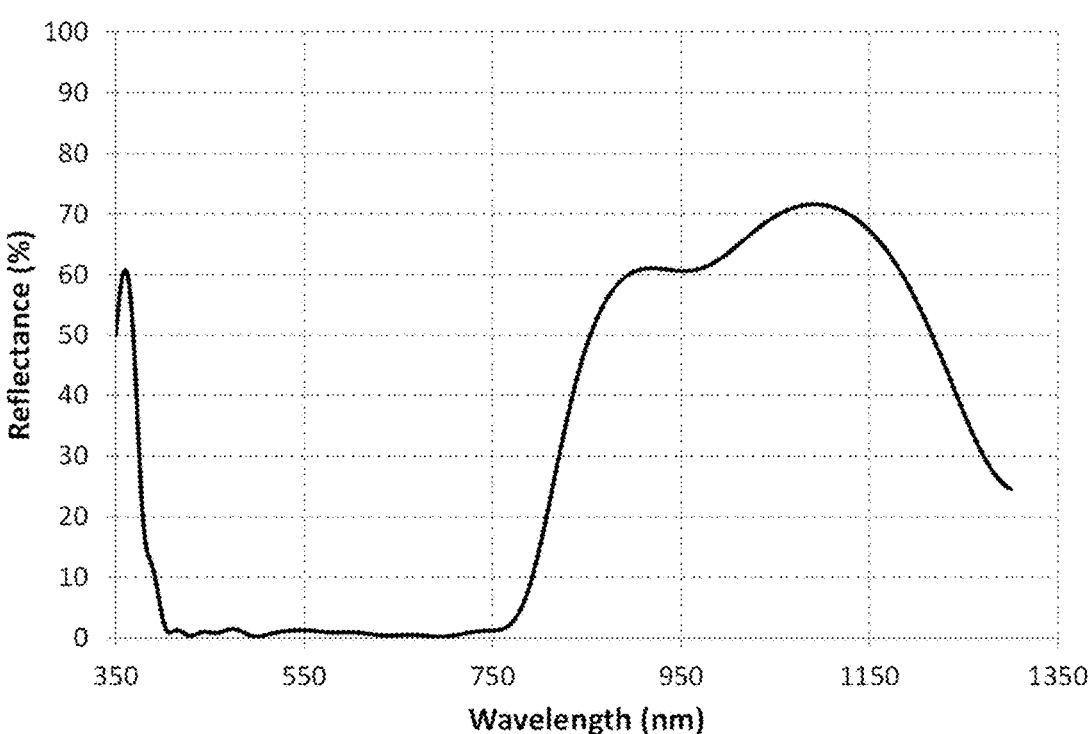
Figure 9D:
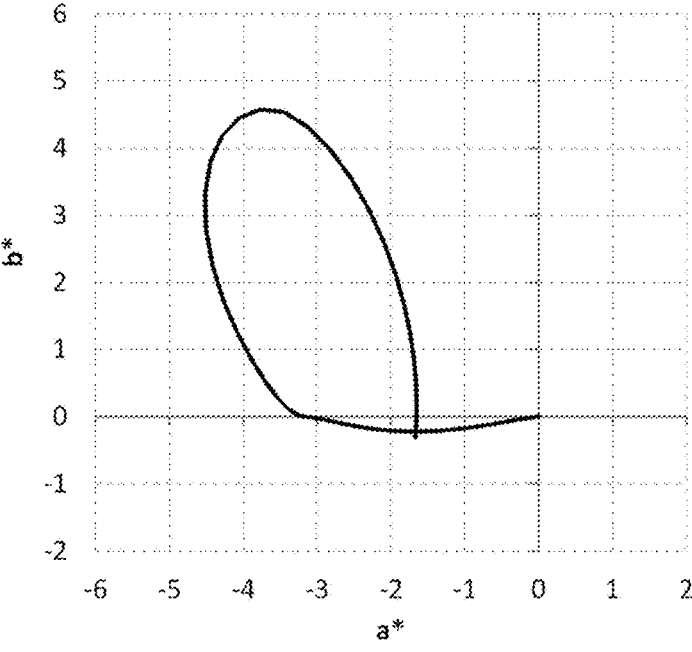

As shown in FIGS. 9A and 9C, plots are provided of modeled, two-surface transmittance and reflectance, respectively, vs. wavelength at normal incidence of the cover glass article according to this example. Further, as shown in FIGS. 9B and 9D, plots are provided of modeled, two-surface transmitted and reflected color, respectively, for all incidence angles from 0-90 degrees of the cover glass article according to this example. As can be discerned from the data underlying FIG. 9B, the cover glass article of this example has low transmitted color, where $\sqrt{(a^{*2}+b^{*2})}$ is less than 0.1 at all incidence angles of 0-10 degrees, less than 0.5 at all incidence angles from 0-50 degrees, and less than 2.0 at all incidence angles from 0 to 90 degrees.

In Example 6, the first plurality of the outer optical film structure has a sum total physical thickness of high and low RI layers of 1566 nm; a sum total physical thickness of high RI layers of 644 nm; a sum total physical thickness of low RI layers of 922 nm; and a sum total physical thickness of the high refractive index layers is 41% of a sum total physical thickness of the high refractive index layers and the low refractive index layers in the first plurality.

In Example 6, the second plurality of the inner optical film structure has a sum total physical thickness of high and low RI layers of 253 nm; a sum total physical thickness of high RI layers of 116 nm; a sum total physical thickness of low RI layers of 137 nm; and a sum total physical thickness of the high refractive index layers is 46% of a sum total physical thickness of the high refractive index layers and the low refractive index layers in the second plurality.

In Example 6, the first plurality of the outer optical film structure, which accomplishes the majority of the infrared blocking function in this example, comprises 8 individual layers selected from the high and low refractive index layers of the first plurality each having a physical thickness of at least 100 nm (e.g., between 100-220 nm). Four of these layers have a refractive index of 2.07, and four of these layers have a refractive index of 1.48. Four of these 8 layers are adjacent to one another.

In some aspects, the design of Example 6 may be preferred because the majority of the optical control layers are present in the front coating. These front coating layers can be deposited under high energy conditions (e.g. high sputtering power), allowing high film density or high hardness, without significantly degrading the organic buffer layer which is present on the rear side of the substrate for strength retention purposes.

TABLE 6

| Example 6—Two-Side Coated Cover Glass Article Design | | | | | |
|---|---|---|---|---|---|
| Medium Type | Layer | Material | Refractive Index @550 nm | Extinction Coefficient @550 nm | Physical Thickness (nm) |
| Incident | | Air | 1 | 0 | |
| Front | 1 | SiO$_2$ | 1.477 | 0 | 84.2 |
| Coating | 2 | SiN$_x$ | 2.068 | 0 | 70.8 |
| | 3 | SiO$_2$ | 1.477 | 0 | 17.2 |
| | 4 | SiN$_x$ | 2.068 | 0 | 22.1 |
| | 5 | SiO$_2$ | 1.477 | 0 | 138.3 |
| | 6 | SiN$_x$ | 2.068 | 0 | 10.4 |
| | 7 | SiO$_2$ | 1.477 | 0 | 11.6 |
| | 8 | SiN$_x$ | 2.068 | 0 | 102.5 |
| | 9 | SiO$_2$ | 1.477 | 0 | 169.2 |
| | 10 | SiN$_x$ | 2.068 | 0 | 117.4 |
| | 11 | SiO$_2$ | 1.477 | 0 | 172.8 |
| | 12 | SiN$_x$ | 2.068 | 0 | 17.1 |
| | 13 | SiO$_2$ | 1.477 | 0 | 10.8 |
| | 14 | SiN$_x$ | 2.068 | 0 | 117.8 |
| | 15 | SiO$_2$ | 1.477 | 0 | 33.3 |
| | 16 | SiN$_x$ | 2.068 | 0 | 20.7 |
| | 17 | SiO$_2$ | 1.477 | 0 | 200.1 |
| | 18 | SiN$_x$ | 2.068 | 0 | 17.0 |
| | 19 | SiO$_2$ | 1.477 | 0 | 26.9 |
| | 20 | SiN$_x$ | 2.068 | 0 | 129.9 |
| | 21 | SiO$_2$ | 1.477 | 0 | 33.0 |
| | 22 | SiN$_x$ | 2.068 | 0 | 18.0 |
| | 23 | SiO$_2$ | 1.477 | 0 | 25.0 |
| Substrate | 24 | Glass A | 1.508 | 0 | 0.6 mm |
| Rear | 25 | Organic Buffer layer | 1.461 | 0 | 54.8 |
| Coating | 26 | TiO$_2$ | 2.322 | 0 | 15.2 |
| | 27 | SiO$_2$ | 1.462 | 0 | 34.9 |
| | 28 | TiO$_2$ | 2.322 | 0 | 62.5 |
| | 29 | SiO$_2$ | 1.462 | 0 | 8.0 |
| | 30 | TiO$_2$ | 2.322 | 0 | 38.7 |
| | 31 | SiO$_2$ | 1.462 | 0 | 93.7 |
| Emergent | | Air | 1 | 0 | |

TABLE 6A

| Optical Transmission Properties of Example 6 | | | | | | | | |
|---|---|---|---|---|---|---|---|---|
| (values in %) | Tx0° | Tx10° | Tx20° | Tx30° | Tx40° | Tx50° | Tx60° | Tx70° | Tx80° |
| Tx(400-700 nm) | 98.99 | 99.03 | 99.07 | 98.96 | 98.38 | 96.35 | 89.96 | 74.95 | 45.70 |
| Tx(930-950 nm) | 39.08 | 39.13 | 39.15 | 38.25 | 35.68 | 34.47 | 38.51 | 43.54 | 32.70 |
| Tx(800-1300 nm) | 44.2 | | | | | | | | |
| Tx(850-1250 nm) | 37.95 | | | | | | | | |
| Tx(900-1200 nm) | 34.49 | | | | | | | | |
| Tx(900-1100 nm) | 35.05 | | | | | | | | |

Example 7

A cover glass article was prepared for this example with the structure delineated below in Table 7. The outer optical film structure ("Front Coating") has 17 layers (Layers 1-17), and the inner optical film structure ("Rear Coating") has 17 layers (Layers 19-35). A distinct feature of Example 7 is that the Front Coating has a substantially identical structure as the Rear Coating, meaning the total thickness, average modulus, and warp of the Front Coating and the Rear Coating can be in balance, even if high intrinsic stress is imparted to both the Front and Rear Coating.

Optical properties measured for this example are summarized in Table 7A below. In particular, optical transmission vs. wavelength range data are reported. As is evident from Table 7A, the cover glass article of this example has a 2-surface average transmission (Tx) of at least 98.8% as measured from 400 to 700 nm at incidence angles of 0 to 30 degrees, and a Tx of 36.5% or less as measured from 930-950 nm at incidence angles of 0 to 50 degrees. Although not shown in Table 7A, the cover glass article of this example has a visible photopic average transmittance of 98.8% at one or more incident angles (e.g., at all incident angles) from 0-10 degrees. Each transmittance in this example is measured through the outer and inner primary surfaces of the substrate and the inner and outer optical film structures (including the organic layer). For clarity, average transmission (Tx) values in Table 7A are calculated for the indicated incident angle (e.g. at) 0° by summing the transmission at each wavelength in the indicated wavelength range (e.g., 400-700 nm) and dividing the sum by the total number of wavelengths in this range.

Figure 10A:
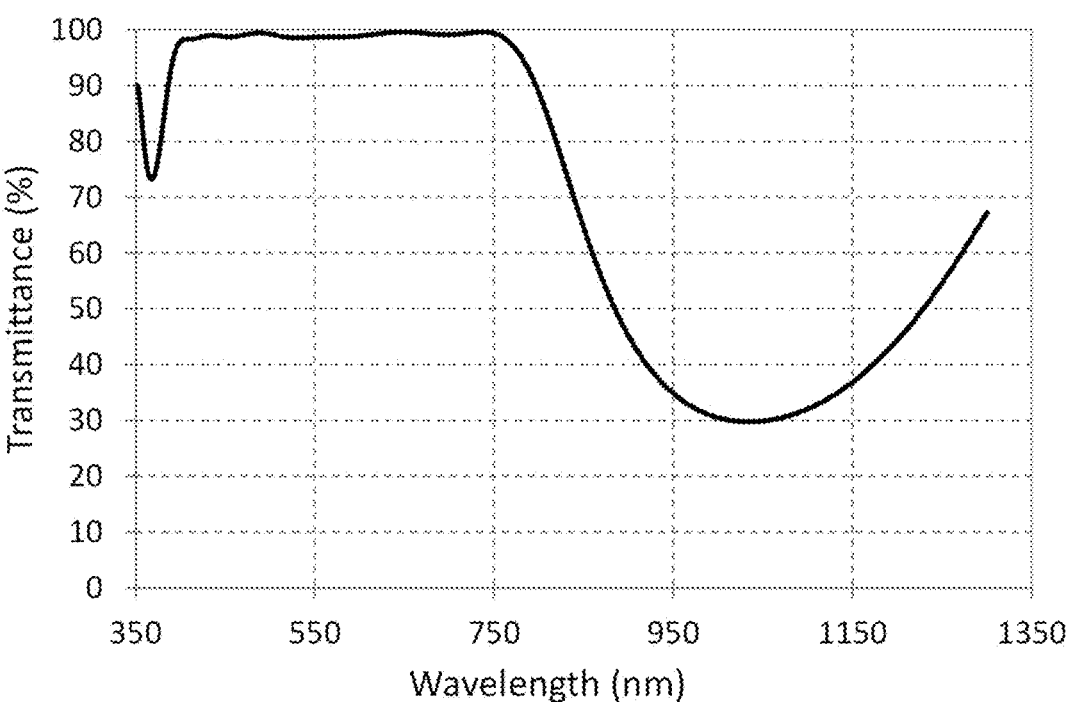
FIGS. 10A and 10C are plots of modeled, two-surface transmittance and reflectance, respectively, vs. wavelength at normal incidence of a cover glass article according to Example 7 of the disclosure.
Figure 10B:
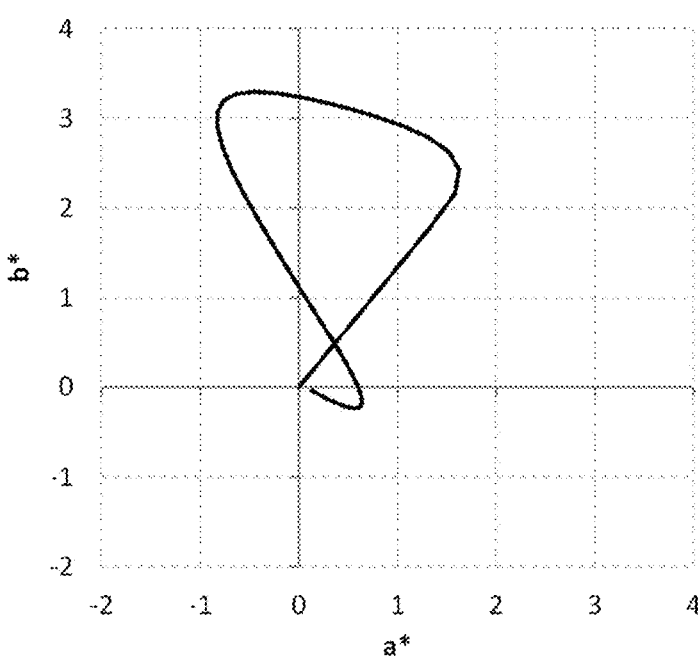
FIGS. 10B and 10D are plots of modeled, two-surface transmitted and reflected color, respectively, for all incidence angles from 0-90 degrees according to Example 7 of the disclosure.
Figure 10C:
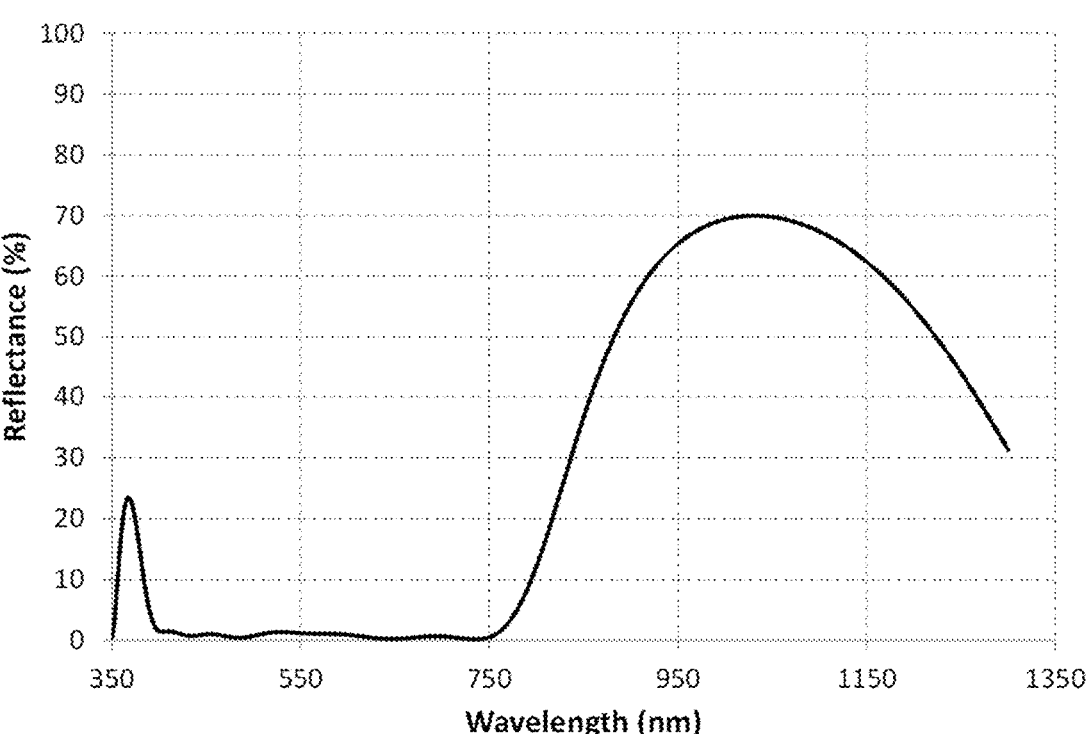
Figure 10D:
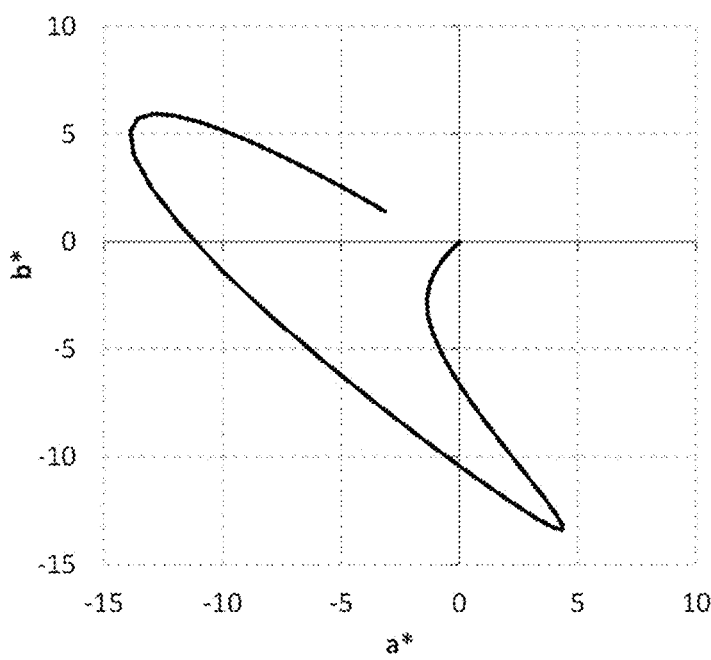

As shown in FIGS. 10A and 10C, plots are provided of modeled, two-surface transmittance and reflectance, respectively, vs. wavelength at normal incidence of the cover glass article according to this example. Further, as shown in FIGS. 10B and 10D, plots are provided of modeled, two-surface transmitted and reflected color, respectively, for all incidence angles from 0-90 degrees of the cover glass article according to this example. As can be discerned from the data underlying FIG. 10B, the cover glass article of this example has low transmitted color, where $\sqrt{(a^{*2}+b^{*2})}$ is less than 0.25 at all incidence angles of 0-10 degrees, less than 1.6 at all incidence angles from 0-50 degrees, and less than 3.5 at all incidence angles from 0 to 90 degrees.

In Example 7, the first plurality of the outer optical film structure has a sum total physical thickness of high and low RI layers of 845 nm; a sum total physical thickness of high RI layers of 345 nm; a sum total physical thickness of low RI layers of 500 nm; and a sum total physical thickness of the high refractive index layers is 41% of a sum total physical thickness of the high refractive index layers and the low refractive index layers in the first plurality.

In Example 7, the second plurality of the inner optical film structure has a sum total physical thickness of high and low RI layers of 845 nm; a sum total physical thickness of high RI layers of 345 nm; a sum total physical thickness of low RI layers of 500 nm; and a sum total physical thickness of the high refractive index layers is 41% of a sum total physical thickness of the high refractive index layers and the low refractive index layers in the second plurality.

In some aspects, the design of Example 7 may be preferred because the balanced design (similar or identical total coating thickness and average modulus for the Front Coating and the Rear Coating) allows for high compressive stress coatings to be applied on both the front and the rear sides of the substrate, without inducing unacceptable levels of warp to the coated article. High compressive stress coatings have been recently shown to enable improved strength of hard-coated glasses and glass-ceramics (see, e.g., U.S. Pat. No. 11,927,722, incorporated herein by reference). In some applications, this improved strength through the use of high stress coatings may enable removal of the organic buffer layer that is present in other Examples, which removal can provide improvements in durability, hardness, and manufacturability. The designs of Example 7 were fabricated through reactive metal-mode sputtering on ion-exchange strengthened glass substrates, with 1060 MPa compressive stress created during deposition in both the Front and Rear Coatings. These coated samples were strength tested in ring-on-ring strength testing and found to have a mean flexural strength of 726 MPa.

TABLE 7

| Example 7—Two-Side Coated Cover Glass Article Design | | | | | |
|---|---|---|---|---|---|
| Medium Type | Layer | Material | Refractive Index @550 nm | Extinction Coefficient @550 nm | Physical Thickness (nm) |
| Incident | | Air | 1 | 0 | |
| Front | 1 | SiO$_2$ | 1.477 | 0 | 86.8 |
| Coating | 2 | SiN$_x$ | 2.068 | 0 | 69.5 |
| | 3 | SiO$_2$ | 1.477 | 0 | 14.9 |
| | 4 | SiN$_x$ | 2.068 | 0 | 27.1 |
| | 5 | SiO$_2$ | 1.477 | 0 | 126.1 |
| | 6 | SiN$_x$ | 2.068 | 0 | 8.0 |
| | 7 | SiO$_2$ | 1.477 | 0 | 25.1 |
| | 8 | SiN$_x$ | 2.068 | 0 | 92.1 |
| | 9 | SiO$_2$ | 1.477 | 0 | 8.2 |
| | 10 | SiN$_x$ | 2.068 | 0 | 18.4 |
| | 11 | SiO$_2$ | 1.477 | 0 | 170.9 |
| | 12 | SiN$_x$ | 2.068 | 0 | 37.0 |
| | 13 | SiO$_2$ | 1.477 | 0 | 10.1 |
| | 14 | SiN$_x$ | 2.068 | 0 | 75.9 |
| | 15 | SiO$_2$ | 1.477 | 0 | 33.2 |
| | 16 | SiN$_x$ | 2.068 | 0 | 17.0 |
| | 17 | SiO$_2$ | 1.477 | 0 | 25.0 |

TABLE 7-continued

| | | | Refractive Index @550 nm | Extinction Coefficient @550 nm | Physical Thickness (nm) |
|---|---|---|---|---|---|
| Medium Type | Layer | Material | | | |
| Substrate | 18 | Glass A | 1.508 | 0 | 0.6 mm |
| Rear | 19 | $SiO_2$ | 1.477 | 0 | 25.0 |
| Coating | 20 | $SiN_x$ | 2.068 | 0 | 17.0 |
| | 21 | $SiO_2$ | 1.477 | 0 | 33.2 |
| | 22 | $SiN_x$ | 2.068 | 0 | 75.9 |
| | 23 | $SiO_2$ | 1.477 | 0 | 10.1 |
| | 24 | $SiN_x$ | 2.068 | 0 | 37.02 |
| | 25 | $SiO_2$ | 1.477 | 0 | 170.9 |
| | 26 | $SiN_x$ | 2.068 | 0 | 18.4 |
| | 27 | $SiO_2$ | 1.477 | 0 | 8.2 |
| | 28 | $SiN_x$ | 2.068 | 0 | 92.1 |
| | 29 | $SiO_2$ | 1.477 | 0 | 25.1 |
| | 30 | $SiN_x$ | 2.068 | 0 | 8.0 |
| | 31 | $SiO_2$ | 1.477 | 0 | 126.1 |
| | 32 | $SiN_x$ | 2.068 | 0 | 27.1 |
| | 33 | $SiO_2$ | 1.477 | 0 | 14.9 |
| | 34 | $SiN_x$ | 2.068 | 0 | 69.5 |
| | 35 | $SiO_2$ | 1.477 | 0 | 86.8 |
| Emergent | | Air | 1 | 0 | |

TABLE 7A

Optical Transmission Properties of Example 7

| (values in %) | Tx0° | Tx10° | Tx20° | Tx30° | Tx40° | Tx50° | Tx60° | Tx70° | Tx80° |
|---|---|---|---|---|---|---|---|---|---|
| Tx(400-700 nm) | 98.99 | 98.99 | 98.98 | 98.84 | 98.26 | 96.30 | 90.56 | 76.59 | 47.40 |
| Tx(930-950 nm) | 36.35 | 35.55 | 33.60 | 31.67 | 31.32 | 34.28 | 41.89 | 51.56 | 45.87 |
| Tx(800-1300 nm) | 44.9 | | | | | | | | |
| Tx(850-1250 nm) | 38.90 | | | | | | | | |
| Tx(900-1200 nm) | 34.58 | | | | | | | | |
| Tx(900-1100 nm) | 33.14 | | | | | | | | |

Example 8

A cover glass article was prepared for this example with the structure delineated below in Table 8. The outer optical film structure ("Front Coating") has 12 layers (Layers 1-12), and the inner optical film structure ("Rear Coating") has 13 layers (Layers 14-26).

The Front and Rear Coatings for this example have different optical properties and different thickness. The Front Coating is designed to have low (<1%) average visible reflectance in air, while the Rear Coating is designed to have low reflectance (designed to be optically impedance matched) with an adhesive with refractive index=1.5. This example is designed such that the Front Coating has a total thickness of 2470 nm, and the thickest front side layer (layer 6) has a thickness of 2000 nm. The stress of layer 6 can be tuned to 500 MPa compressive stress, while the other front side layers can be made with neutral (near zero) stress. In order to balance the warp created by layer 6, the stress of the thickest rear side layer (layer 20), which has a thickness of 1000 nm, can be tuned to 1000 MPa compressive stress (with other layers having neutral stress). This construction effectively balances stress×thickness, which also balances the bending moment of each coating (the modulus of layers 6 and 20 are the same). This results in a flat final article with minimal warpage, although the coatings possess high stress, which improves the article flexural strength. In alternate aspects of this example, more than one layer of the front and rear coating can have high intrinsic stress, and/or the stressed layers can have different modulus—in these cases, it will be apparent according to the equations described elsewhere herein that the bending moments can be balanced, and warpage minimized with high stress layers, through consideration of the average modulus, average stress, and total thickness of the Front and Rear Coatings. Thus the general condition for minimizing article warpage when high stress coatings are applied to the front and rear of a substrate, is for the front and rear coatings to have the same or similar effective bending moments, or to have the same or similar stress×thickness values, as described in the equations set forth elsewhere herein.

Figure 11A:
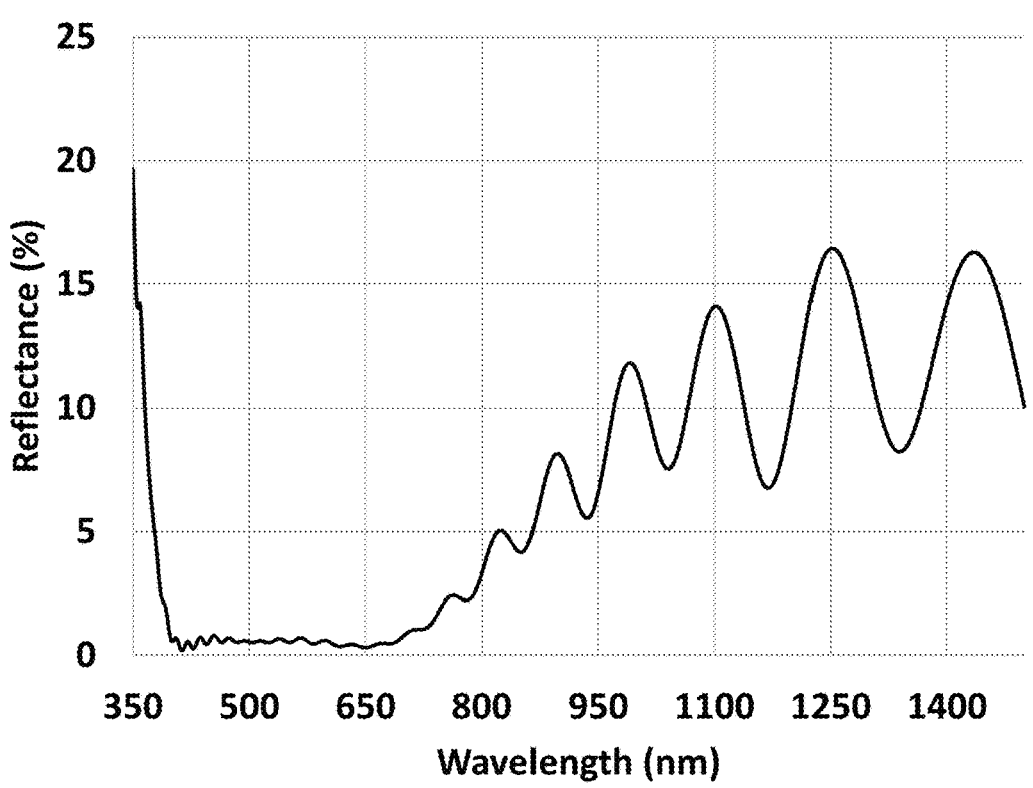
FIGS. 11A and 11B are plots of modeled, two-surface transmittance and reflectance, respectively, vs. wavelength at normal incidence of a cover glass article according to Example 8 of the disclosure.
Figure 11B:
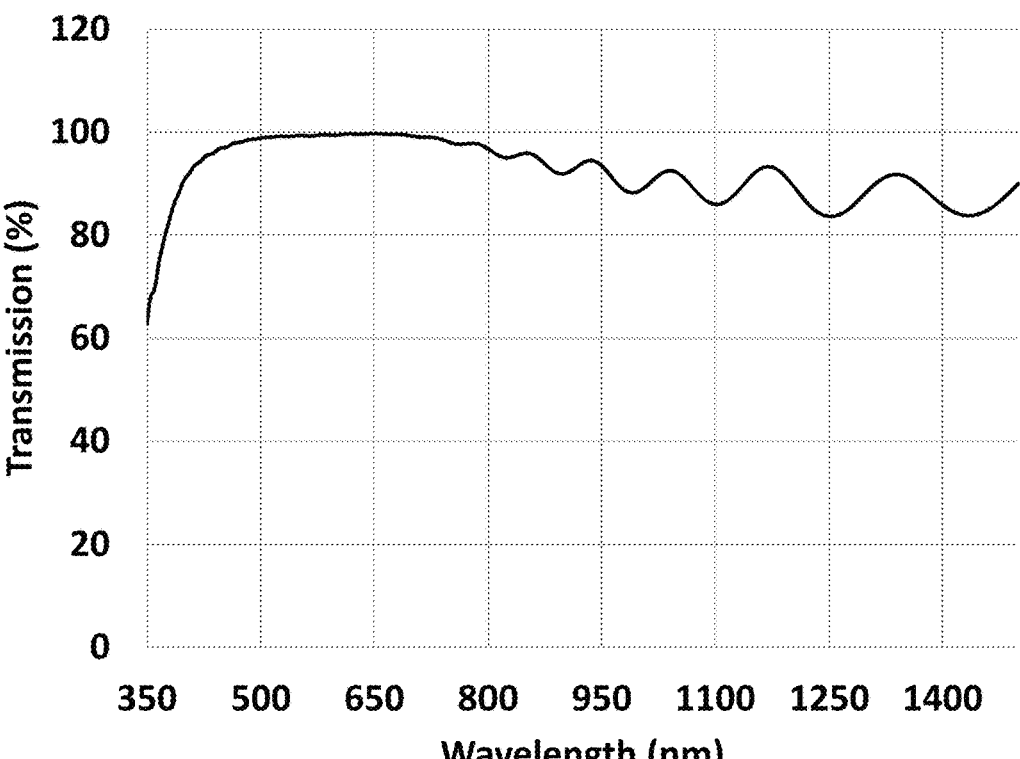

As shown in FIGS. 11A and 11B, plots are provided of modeled, two-surface reflectance and transmission, respectively, vs. wavelength at normal incidence of the cover glass article according to this example.

In this Example 8, the first plurality of the outer optical film structure has a sum total physical thickness of high and low RI layers of 2470 nm; a sum total physical thickness of high RI layers of 2270 nm; a sum total physical thickness of low RI layers of 200 nm; and a sum total physical thickness of the high refractive index layers is 92% of a sum total physical thickness of the high refractive index layers and the low refractive index layers in the first plurality.

In this Example 8, the second plurality of the inner optical film structure has a sum total physical thickness of high and low RI layers of 1332 nm; a sum total physical thickness of high RI layers of 1152 nm; a sum total physical thickness of low RI layers of 180 nm; and a sum total physical thickness of the high refractive index layers is 86% of a sum total physical thickness of the high refractive index layers and the low refractive index layers in the second plurality.

TABLE 8

Example 8—High Stress Front Coating and High Stress Rear Coating

| Medium Type | Layer | Material | Refractive Index @550 nm | Physical Thickness (nm) |
|---|---|---|---|---|
| Incident | | Air | 1 | |
| Front | 1 | $SiO_2$ | 1.47812 | 87.73 |
| Coating | 2 | $Si_3N_4$ | 2.06662 | 145.46 |
| | 3 | $SiO_2$ | 1.47812 | 18.96 |
| | 4 | $Si_3N_4$ | 2.06662 | 48.24 |
| | 5 | $SiO_2$ | 1.47812 | 11.32 |
| | 6 | $Si_3N_4$ | 2.06662 | 2000 |
| | 7 | $SiO_2$ | 1.47812 | 8.32 |
| | 8 | $Si_3N_4$ | 2.06662 | 42.05 |
| | 9 | $SiO_2$ | 1.47812 | 26.77 |
| | 10 | $Si_3N_4$ | 2.06662 | 24.92 |
| | 11 | $SiO_2$ | 1.47812 | 47.38 |
| | 12 | $Si_3N_4$ | 2.06662 | 8.98 |

TABLE 8-continued

Example 8—High Stress Front
Coating and High Stress Rear Coating

| Medium Type | Layer | Material | Refractive Index @550 nm | Physical Thickness (nm) |
|---|---|---|---|---|
| Substrate | 13 | Glass A | 1.50972 | 0.4 mm |
| Rear | 14 | $Si_3N_4$ | 2.06662 | 8.03 |
| Coating | 15 | $SiO_2$ | 1.47812 | 51.21 |
| | 16 | $Si_3N_4$ | 2.06662 | 24.74 |
| | 17 | $SiO_2$ | 1.47812 | 29.17 |
| | 18 | $Si_3N_4$ | 2.06662 | 42.6 |
| | 19 | $SiO_2$ | 1.47812 | 8.38 |
| | 20 | $Si_3N_4$ | 2.06662 | 1000 |
| | 21 | $SiO_2$ | 1.47812 | 8.6 |
| | 22 | $Si_3N_4$ | 2.06662 | 43.15 |
| | 23 | $SiO_2$ | 1.47812 | 29.64 |
| | 24 | $Si_3N_4$ | 2.06662 | 25.16 |
| | 25 | $SiO_2$ | 1.47812 | 53.25 |
| | 26 | $Si_3N_4$ | 2.06662 | 8.17 |
| Emergent | | | n = 1.50 | 1.5 |

Many variations and modifications may be made to the above-described aspects of the disclosure without departing substantially from the spirit and various principles of the disclosure. All such modifications and variations are intended to be included herein within the scope of this disclosure and protected by the following claims.

What is claimed is:

1. A cover glass article, comprising:

at least one substrate comprising an outer primary surface and an inner primary surface opposite the outer primary surface; and at least one of:

an outer optical film structure disposed on the outer primary surface, the outer optical film structure comprising a first plurality of alternating high refractive index and low refractive index layers; and an inner optical film structure disposed on the inner primary surface, the inner optical film structure comprising a second plurality of alternating high refractive index and low refractive index layers;

wherein at least a portion of the high refractive index layers of the first and second pluralities, if present, independently is an oxide, a nitride, an oxynitride, or any combination thereof;

wherein at least a portion of the low refractive index layers of the first and second pluralities, if present, independently is an oxide, a nitride, an oxynitride, a metal fluoride, or any combination thereof;

wherein each high refractive index layer of the first and second pluralities, if present, can be the same or different, and each low refractive index layer of the first and second pluralities, if present, can be the same or different;

wherein the cover glass article exhibits:

(1) an average transmittance of at least 92%, as measured from 400-700 nm at all incident angles from 0 to 30 degrees; and (2) at least one of:

an average transmittance of less than 50%, as measured from 930-950 nm at an incident angle of 0 degrees or at all incident angles from 0 to 10 degrees; and an average transmittance of less than 50%, as measured from 900-1200 nm at an incident angle of 0 degrees or at all incident angles from 0 to 10 degrees;

wherein each transmittance is measured through the outer and inner primary surfaces of the at least one substrate and the inner and outer optical film structures, if present.

2. The cover glass article of claim 1, wherein the cover glass article exhibits at least one of:

an average transmittance of at least 94%, as measured from 400-700 nm at all incident angles from 0-20 degrees;

an average transmittance of less than 42%, as measured from 930-950 nm at all incident angles from 0 to 50 degrees; and an average transmittance of less than 40%, as measured from 900-1200 nm at an incident angle of 0 degrees or at all incident angles from 0 to 10 degrees;

wherein each transmittance is measured through the outer and inner primary surfaces of the at least one substrate and the inner and outer optical film structures, if present.

3. The cover glass article of claim 1, wherein the cover glass article exhibits at least one of:

an average transmittance of at least 97%, as measured from 400-700 nm at all incident angles from 0 to 20 degrees;

an average transmittance of less than 8%, as measured from 930-950 nm at an incident angle of 0 degrees or at all incident angles from 0 to 10 degrees; and an average transmittance of less than 12%, as measured from 900-1200 nm at an incident angle of 0 degrees or at all incident angles from 0 to 10 degrees;

wherein each transmittance is measured through the outer and inner primary surfaces of the at least one substrate and the inner and outer optical film structures, if present.

4. The cover glass article of claim 1, wherein the cover glass article exhibits at least one of:

a transmitted color $\sqrt{(a^{*2}+b^{*2})}$ with a D65 illuminant of less than 4 at all incident angles from 0 degrees to 40 degrees; and a transmitted color $\sqrt{(a^{*2}+b^{*2})}$ with a D65 illuminant of less than 0.5 at all incident angles from 0 degrees to 20 degrees;

wherein each transmitted color is measured through the outer and inner primary surfaces of the at least one substrate and the inner and outer optical film structures, if present.

5. The cover glass article of claim 1, wherein the cover glass article exhibits an average reflectance of less than 8%, as measured from 400-700 nm at an incident angle of 0 degrees or at all incident angles from 0 to 10 degrees, wherein the reflectance is measured through the outer and inner primary surfaces of the at least one substrate and the inner and outer optical film structures, if present.

6. The cover glass article of claim 1, wherein the cover glass article exhibits a maximum hardness of at least 8 GPa, as measured by a Berkovich Hardness Test over an indentation depth range from about 100 nm to about 500 nm in at least one of the outer optical film structure and the inner optical film structure, if present.

7. The cover glass article of claim 1, wherein:

at least a portion of the high refractive index layers of the first and second pluralities, if present, independently is $SiAl_xO_yN_z$, $Ta_2O_5$, $Nb_2O_5$, AlN, $AlN_x$, $SiAl_xN_y$, $AlN_x/SiAl_xN_y$, $Si_3N_4$, $AlO_xN_y$, $SiO_xN_y$, $SiN_x$, $SiN_x:H_y$, $HfO_2$, $TiO_2$, $ZrO_2$, $Y_2O_3$, $Al_2O_3$, $MoO_3$, diamond-like carbon, or any combination thereof; and at least a portion of the low refractive index layers of the first and second pluralities, if present, independently is $SiO_2$, doped $SiO_2$, $Al_2O_3$, $SiAl_xO_y$, $GeO_2$, SiO, $AlO_xN_y$, $SiO_xN_y$, $SiAl_xO_yN_z$, MgO, $MgAl_xO_y$, $MgF_2$, $BaF_2$, $CaF_2$, $DyF_3$, $YbF_3$, $YF_3$, $CeF_3$, or any combination thereof.

8. The cover glass article of claim 1, wherein the outer optical film structure is present and at least a portion of the first plurality is $SiO_2$, $SiN_x$, $SiO_xN_y$, or any combination thereof.

9. The cover glass article of claim 1, wherein the inner optical film structure is present and at least a portion of the second plurality is $SiO_2$, $TiO_2$, $Nb_2O_5$, $MgF_2$, or any combination thereof.

10. The cover glass article of claim 1, wherein at least one of:

the outer optical film structure is present and the first plurality comprises at least 3 individual layers selected from the high and low refractive index layers of the first plurality each having a physical thickness of at least 100 nm, optionally wherein the at least 3 individual layers are adjacent to one another; and the inner optical film structure is present and the second plurality comprises at least 3 individual layers selected from the high and low refractive index layers of the second plurality each having a physical thickness of at least 100 nm, optionally wherein the at least 3 individual layers are adjacent to one another.

11. The cover glass article of claim 1, wherein at least one of:

the outer optical film structure is present and the first plurality comprises at least 2 individual low refractive index layers each having a physical thickness of 100-200 nm and a refractive index of less than 1.55; and the inner optical film structure is present and the second plurality comprises at least 2 individual low refractive index layers each having a physical thickness of 100-200 nm and a refractive index of less than 1.55.

12. The cover glass article of claim 1, wherein at least one of:

the outer optical film structure is present and the first plurality comprises at least 2 individual high refractive index layers each having a physical thickness of at least 80 nm and a refractive index of at least 2.1; and the inner optical film structure is present and the second plurality comprises at least 2 individual high refractive index layers each having a physical thickness of at least 80 nm and a refractive index of at least 2.1.

13. The cover glass article of claim 1, wherein at least one of:

the outer optical film structure is present and the first plurality comprises: (a) at least 4 individual layers selected from high and low refractive index layers of the first plurality each having a physical thickness of 100-200 nm; (b) at least 2 individual low refractive index layers each having a physical thickness of 100-200 nm; and (c) at least 2 individual high refractive index layers each having a physical thickness of at least 80 nm and a refractive index of at least 2.1; and the inner optical film structure is present and the second plurality comprises: (a) at least 4 individual layers selected from high and low refractive index layers of the second plurality each having a physical thickness of 100-200 nm; (b) at least 2 individual low refractive index layers each having a physical thickness of 100-200 nm; and (c) at least 2 individual high refractive index layers each having a physical thickness of at least 80 nm and a refractive index of at least 2.1.

14. The cover glass article of claim 13, wherein, in the first plurality, the second plurality, or both, each of the (c) at least 2 individual high refractive index layers independently is $TiO_2$ or $Nb_2O_5$.

15. The cover glass article of claim 1, wherein the inner optical film structure is present.

16. The cover glass article of claim 1, wherein the outer optical film structure is present.

17. The cover glass article of claim 1, wherein both the inner and outer optical film structures are present.

18. The cover glass article of claim 1, wherein at least one of:

the outer optical film structure is present and a sum total physical thickness of the high refractive index layers in the first plurality is less than 50% of a sum total physical thickness of the high refractive index layers and the low refractive index layers in the first plurality; and the inner optical film structure is present and a sum total physical thickness of the high refractive index layers in the second plurality is less than 50% of a sum total physical thickness of the high refractive index layers and the low refractive index layers in the second plurality.

19. The cover glass article of claim 1, wherein at least one of:

the outer optical film structure is present and the first plurality comprises a low refractive index layer in direct contact with the outer primary surface; and the inner optical film structure is present and the second plurality comprises a low refractive index layer in direct contact with the inner primary surface.

20. The cover glass article of claim 1, wherein at least one of the first and second pluralities has a sum total of the high refractive index and low refractive index layers of at least 5 layers.

* * * * *